United States Patent
Katz

(10) Patent No.: US 6,570,967 B2
(45) Date of Patent: *May 27, 2003

(54) VOICE-DATA TELEPHONIC INTERFACE CONTROL SYSTEM

(75) Inventor: Ronald A. Katz, Los Angeles, CA (US)

(73) Assignee: Ronald A. Katz Technology Licensing, L.P., Los Angeles, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 38 days.

This patent is subject to a terminal disclaimer.

(21) Appl. No.: 08/482,218

(22) Filed: Jun. 7, 1995

(65) Prior Publication Data

US 2003/0068022 A1 Apr. 10, 2003

Related U.S. Application Data

(63) Continuation of application No. 08/306,456, filed on Sep. 4, 1994, which is a continuation of application No. 08/058,452, filed on May 7, 1993, now Pat. No. 5,359,645, which is a continuation of application No. 07/680,879, filed on May 5, 1991, now Pat. No. 5,224,153, which is a continuation-in-part of application No. 07/481,403, filed on Feb. 20, 1990, now Pat. No. 5,014,298, which is a continuation-in-part of application No. 07/312,792, filed on Feb. 21, 1989, now Pat. No. 5,073,929, which is a continuation-in-part of application No. 07/194,258, filed on May 16, 1998, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned, application No. 08/482,218, which is a continuation-in-part of application No. 08/306,751, filed on Sep. 14, 1994, which is a continuation of application No. 08/047,241, filed on Apr. 13, 1993, now Pat. No. 5,351,285, which is a continuation of application No. 07/509,691, filed on Apr. 16, 1990, now abandoned, which is a continuation-in-part of application No. 07/260,104, filed on Oct. 20, 1988, now Pat. No. 4,930,150, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned, said application No. 08/047,241, is a continuation-in-part of application No. 07/640,337, filed on Jan. 11, 1991, which is a continuation of application No. 07/335,923, filed on Apr. 10, 1989, which is a continuation of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned.

(51) Int. Cl.[7] .............................................. H04M 11/00
(52) U.S. Cl. ................................ 379/93.12; 379/93.02
(58) Field of Search ............................. 379/92, 91, 97, 379/93, 94, 89, 88, 91.01, 91.02, 93.12, 93.13, 93.14, 93.28, 67.1, 88.08

(56) References Cited

U.S. PATENT DOCUMENTS 2,902,541 A    9/1959   Singleton (List continued on next page.)

FOREIGN PATENT DOCUMENTS

AU    66113/81    7/1981

(List continued on next page.)

OTHER PUBLICATIONS

Basinger, R. G., et al., "Calling Card Service—Overall Description and Operational Characteristics", The Bell System Technical Journal, Sep., 1982.

(List continued on next page.)

*Primary Examiner*—Stella Woo
(74) *Attorney, Agent, or Firm*—Reena Kuyper; B. G. Nilsson

(57) ABSTRACT

In an audio-digital telephone interface system, selective operation prompts a caller with oral instructions to provide: digital control signals, digital data signals (numeric) or audio signals. Inbound and outbound operations are involved and inbound callers are qualified as by automatic number identification (ANI) signals and consumable key operation. A data cell is loaded in accordance with an operating program and the resulting data packet is flagged depending on the presence of audio signals. Data packets are returned to storage, as for subsequent addressing to call up, as to process or cue a caller. The illustrative format receives and organizes order data for goods or services or to isolate a subset or a sub-subset of callers.

41 Claims, 3 Drawing Sheets

U.S. PATENT DOCUMENTS

| | | | |
|---|---|---|---|
| 2,941,161 A | 6/1960 | Scantlin | |
| 3,060,275 A | 10/1962 | Meacham et al. | |
| 3,076,059 A | 1/1963 | Meacham et al. | |
| 3,082,402 A | 3/1963 | Scantlin | |
| 3,128,349 A | 4/1964 | Boesch et al. | |
| 3,159,818 A | 12/1964 | Scantlin | |
| 3,246,082 A | 4/1966 | Levy | |
| 3,249,919 A | 5/1966 | Scantlin | |
| 3,299,210 A | 1/1967 | Bandy | |
| 3,337,847 A | 8/1967 | Olsson et al. | |
| 3,347,988 A | 10/1967 | Marill | |
| 3,371,162 A * | 2/1968 | Scantlin | |
| 3,381,276 A * | 4/1968 | James | |
| 3,393,272 A | 7/1968 | Hanson | |
| 3,394,246 A | 7/1968 | Goldman | |
| 3,482,057 A * | 12/1969 | Abbott et al. | |
| 3,515,814 A * | 6/1970 | Morgan | |
| 3,544,769 A | 12/1970 | Hedin | |
| 3,553,378 A | 1/1971 | Solomon et al. | |
| 3,556,530 A | 1/1971 | Barr | |
| 3,557,311 A * | 1/1971 | Goldstein | |
| 3,568,157 A * | 3/1971 | Downing | |
| 3,569,939 A * | 3/1971 | Doblmaier et al. | |
| 3,571,799 A * | 3/1971 | Coker, Jr. et al. | |
| 3,573,747 A * | 4/1971 | Adams et al. | |
| 3,581,072 A * | 5/1971 | Nymeyer | |
| 3,594,004 A | 7/1971 | Barr | |
| 3,617,638 A | 11/1971 | Jochimsen et al. | |
| 3,618,038 A | 11/1971 | Stein | |
| 3,624,292 A | 11/1971 | Guzak, Jr. | |
| 3,644,675 A | 2/1972 | Waltington | |
| 3,647,973 A | 3/1972 | James et al. | |
| 3,651,480 A | 3/1972 | Downing et al. | |
| 3,658,113 A | 4/1972 | Lince | |
| 3,665,107 A | 5/1972 | Kopec et al. | |
| 3,675,513 A | 7/1972 | Flanagan et al. | |
| 3,688,126 A | 8/1972 | Klein | |
| 3,696,335 A | 10/1972 | Lemelson | |
| 3,697,702 A | 10/1972 | Buonsante et al. | |
| 3,727,186 A | 4/1973 | Stephenson | |
| 3,781,810 A | 12/1973 | Downing | |
| 3,787,632 A | 1/1974 | Male et al. | |
| 3,792,446 A | 2/1974 | McFiggins et al. | |
| 3,794,774 A | 2/1974 | Kemmerly et al. | |
| 3,800,283 A | 3/1974 | Gropper | |
| 3,829,628 A | 8/1974 | Tripsas | |
| 3,858,032 A | 12/1974 | Scantlin | |
| 3,870,821 A | 3/1975 | Steury | |
| 3,881,160 A | 4/1975 | Ross | |
| 3,889,050 A | 6/1975 | Thompson | |
| 3,909,553 A | 9/1975 | Marshall | |
| 3,912,874 A | 10/1975 | Botterell et al. | |
| 3,914,747 A | 10/1975 | Barnes et al. | |
| 3,918,174 A | 11/1975 | Miller et al. | |
| 3,920,908 A | 11/1975 | Kraus | |
| 3,928,724 A | 12/1975 | Byram et al. | |
| 3,934,095 A | 1/1976 | Matthews et al. | |
| 3,940,569 A | 2/1976 | Schonbrun | |
| 3,947,972 A | 4/1976 | Freeman | |
| 3,950,618 A | 4/1976 | Bloisi | |
| 3,974,338 A | 8/1976 | Luzier et al. | |
| 3,982,103 A | 9/1976 | Goldman | |
| 3,987,252 A | 10/1976 | Vicari | |
| 3,989,899 A | 11/1976 | Norwich | |
| 3,991,406 A | 11/1976 | Downing et al. | |
| 3,998,465 A | 12/1976 | Mascola | |
| 4,009,342 A | 2/1977 | Fahrenschon et al. | |
| 4,012,599 A | 3/1977 | Meyer | |
| 4,017,835 A | 4/1977 | Randolph | |
| 4,024,345 A | 5/1977 | Kochem | |
| 4,054,756 A * | 10/1977 | Comella et al. | 379/89 |
| 4,068,099 A | 1/1978 | Mikkola | |
| 4,071,698 A * | 1/1978 | Barger, Jr. et al. | 379/92 |
| 4,078,316 A | 3/1978 | Freeman | |
| 4,087,638 A | 5/1978 | Hayes et al. | |
| 4,088,838 A | 5/1978 | Nakata et al. | |
| 4,090,034 A | 5/1978 | Moylan | |
| 4,090,038 A | 5/1978 | Biggs | |
| 4,108,361 A | 8/1978 | Krause | |
| 4,117,278 A | 9/1978 | Ehrlich et al. | |
| 4,121,052 A | 10/1978 | Richard | |
| 4,145,578 A | 3/1979 | Orriss | |
| 4,150,255 A | 4/1979 | Theis et al. | |
| 4,152,547 A | 5/1979 | Theis | |
| 4,160,125 A | 7/1979 | Bower et al. | |
| 4,160,129 A | 7/1979 | Peyser et al. | |
| 4,162,377 A * | 7/1979 | Mearns | 379/127 |
| 4,187,498 A | 2/1980 | Creekmore | |
| 4,191,376 A | 3/1980 | Goldman | |
| 4,191,860 A | 3/1980 | Weber | |
| 4,192,972 A | 3/1980 | Bertoglio et al. | |
| 4,194,089 A | 3/1980 | Hashimoto | |
| 4,200,770 A | 4/1980 | Hellman et al. | |
| 4,201,887 A | 5/1980 | Burns | |
| 4,221,933 A | 9/1980 | Cornell et al. | |
| 4,223,183 A | 9/1980 | Peters, Jr. | |
| 4,232,199 A | 11/1980 | Boatwright et al. | |
| 4,241,942 A | 12/1980 | Bachman | |
| 4,242,539 A | 12/1980 | Hashimoto | |
| 4,243,844 A | 1/1981 | Waldman | |
| 4,255,618 A | 3/1981 | Danner et al. | |
| 4,255,619 A | 3/1981 | Saito | |
| 4,260,854 A | 4/1981 | Kolodny et al. | |
| 4,264,924 A | 4/1981 | Freeman | |
| 4,264,925 A | 4/1981 | Freeman et al. | |
| 4,270,024 A | 5/1981 | Theis et al. | |
| 4,277,649 A | 7/1981 | Sheinbein | |
| 4,290,141 A | 9/1981 | Anderson et al. | |
| 4,299,637 A | 11/1981 | Oberdeck et al. | |
| 4,302,810 A | 11/1981 | Bouricius et al. | |
| 4,303,804 A | 12/1981 | Johnson et al. | |
| 4,307,266 A | 12/1981 | Messina | |
| 4,313,035 A | 1/1982 | Schlafly | |
| 4,314,103 A | 2/1982 | Wilson | |
| 4,317,961 A | 3/1982 | Johnson | |
| 4,320,256 A | 3/1982 | Freeman | |
| 4,323,770 A | 4/1982 | Dieulot et al. | |
| 4,328,396 A | 5/1982 | Theis | |
| 4,338,494 A | 7/1982 | Theis | |
| 4,339,798 A | 7/1982 | Hedges et al. | |
| 4,345,315 A | 8/1982 | Cadotte et al. | |
| 4,348,554 A | 9/1982 | Asmuth | |
| 4,355,207 A | 10/1982 | Curtin | |
| 4,355,372 A | 10/1982 | Johnson et al. | |
| 4,360,827 A | 11/1982 | Braun | |
| 4,360,875 A | 11/1982 | Behnke | |
| 4,371,752 A | 2/1983 | Matthews et al. | |
| 4,376,875 A | 3/1983 | Beirne | |
| 4,389,546 A | 6/1983 | Glisson et al. | |
| 4,393,277 A | 7/1983 | Besen et al. | |
| 4,398,708 A | 8/1983 | Goldman et al. | |
| 4,401,856 A | 8/1983 | Curtin et al. | |
| 4,405,829 A | 9/1983 | Rivest et al. | |
| 4,420,656 A | 12/1983 | Freeman | |
| 4,427,848 A | 1/1984 | Tsakanikas | |
| 4,428,296 A | 1/1984 | Scheuchzer et al. | |
| 4,439,635 A | 3/1984 | Theis et al. | |
| 4,439,636 A | 3/1984 | Newkirk et al. | |
| 4,445,001 A | 4/1984 | Bertoglio | |
| 4,451,700 A | 5/1984 | Kempner et al. | |
| 4,468,528 A | 8/1984 | Reece et al. | |

| Patent No. | Date | Inventor |
|---|---|---|
| 4,475,189 A | 10/1984 | Herr et al. |
| 4,489,438 A | 12/1984 | Hughes |
| 4,490,583 A | 12/1984 | Bednarz et al. |
| 4,494,197 A | 1/1985 | Troy et al. |
| 4,511,764 A | 4/1985 | Nakayama et al. |
| 4,517,410 A | 5/1985 | Williams et al. |
| 4,517,412 A | 5/1985 | Newkirk et al. |
| 4,518,824 A | 5/1985 | Mondardini |
| 4,518,827 A | 5/1985 | Sagara |
| 4,521,643 A | 6/1985 | Dupuis et al. |
| 4,523,055 A | 6/1985 | Hohl et al. |
| 4,532,378 A | 7/1985 | Nakayama et al. |
| 4,539,435 A | 9/1985 | Eckmann |
| 4,539,436 A | 9/1985 | Theis |
| 4,541,087 A | 9/1985 | Comstock |
| 4,544,804 A | 10/1985 | Herr et al. |
| 4,547,851 A | 10/1985 | Kurland |
| 4,549,047 A | 10/1985 | Brian et al. |
| 4,549,291 A | 10/1985 | Renoulin |
| 4,555,594 A | 11/1985 | Friedes et al. |
| 4,559,415 A | 12/1985 | Bernard et al. |
| 4,559,416 A | 12/1985 | Theis et al. |
| 4,562,342 A | 12/1985 | Solo |
| 4,565,903 A | 1/1986 | Riley |
| 4,566,030 A | 1/1986 | Nickerson et al. |
| 4,567,359 A | 1/1986 | Lockwood |
| 4,570,930 A | 2/1986 | Matheson |
| 4,577,062 A | 3/1986 | Hilleary et al. |
| 4,577,067 A | 3/1986 | Levy et al. |
| 4,578,700 A | 3/1986 | Roberts et al. |
| 4,580,012 A | 4/1986 | Matthews et al. |
| 4,581,486 A | 4/1986 | Matthews et al. |
| 4,582,956 A | 4/1986 | Doughty |
| 4,584,602 A | 4/1986 | Nakagawa |
| 4,585,903 A | 4/1986 | Schiller et al. |
| 4,585,906 A | 4/1986 | Matthews et al. |
| 4,586,707 A | 5/1986 | McNeight et al. |
| 4,587,379 A | 5/1986 | Masuda |
| 4,591,190 A | 5/1986 | Clark |
| 4,591,664 A | 5/1986 | Freeman |
| 4,591,665 A | 5/1986 | Foster et al. |
| 4,592,546 A | 6/1986 | Fascenda et al. |
| 4,594,476 A | 6/1986 | Freeman |
| 4,598,367 A | 7/1986 | DeFrancesco et al. |
| 4,599,493 A | 7/1986 | Cave |
| 4,600,809 A | 7/1986 | Tatsumi et al. |
| 4,603,232 A | 7/1986 | Kurland et al. |
| 4,611,094 A | 9/1986 | Asmuth et al. |
| 4,611,096 A | 9/1986 | Asmuth et al. |
| 4,614,367 A | 9/1986 | Breen |
| 4,625,079 A | 11/1986 | Castro et al. |
| 4,625,081 A | 11/1986 | Lotito et al. |
| 4,625,276 A | 11/1986 | Benton et al. |
| 4,630,200 A | 12/1986 | Ohmae et al. |
| 4,630,201 A | 12/1986 | White |
| 4,634,809 A | 1/1987 | Paulsson et al. |
| 4,635,251 A | 1/1987 | Stanley et al. |
| 4,640,991 A | 2/1987 | Matthews et al. |
| 4,645,873 A | 2/1987 | Chomet |
| 4,649,563 A | 3/1987 | Riskin |
| 4,652,998 A | 3/1987 | Koza |
| 4,654,482 A | 3/1987 | DeAngelis |
| 4,658,417 A | 4/1987 | Hashimoto et al. |
| 4,663,777 A | 5/1987 | Szeto |
| 4,665,502 A | 5/1987 | Kreisner |
| 4,669,730 A | 6/1987 | Small |
| 4,671,512 A | 6/1987 | Bachman et al. |
| 4,672,660 A | 6/1987 | Curtin |
| 4,674,044 A | 6/1987 | Kalmus et al. |
| 4,677,552 A | 6/1987 | Sibley, Jr. |
| 4,677,553 A | 6/1987 | Roberts et al. |
| 4,685,123 A | 8/1987 | Hsia et al. |
| 4,685,127 A | 8/1987 | Miller et al. |
| 4,688,170 A | 8/1987 | Waite et al. |
| 4,689,742 A | 8/1987 | Troy et al. |
| 4,692,817 A | 9/1987 | Theis |
| 4,694,490 A | 9/1987 | Harvey et al. |
| 4,696,028 A | 9/1987 | Morganstein et al. |
| 4,696,029 A | 9/1987 | Cohen |
| 4,697,282 A | 9/1987 | Winter et al. |
| 4,704,725 A | 11/1987 | Harvey et al. |
| 4,706,275 A | 11/1987 | Kamil |
| 4,710,955 A * | 12/1987 | Kauffman .................... 379/92 |
| 4,715,061 A | 12/1987 | Norwich |
| 4,716,583 A | 12/1987 | Groner et al. |
| 4,719,647 A | 1/1988 | Theis et al. |
| 4,722,526 A | 2/1988 | Tovar et al. |
| 4,734,858 A | 3/1988 | Jordan et al. |
| 4,745,468 A | 5/1988 | Von Kohorn |
| 4,747,124 A | 5/1988 | Ladd |
| 4,748,668 A | 5/1988 | Shamir et al. |
| 4,750,199 A | 6/1988 | Norwich |
| 4,756,020 A | 7/1988 | Fodale |
| 4,757,267 A | 7/1988 | Riskin |
| 4,759,056 A | 7/1988 | Akiyama |
| 4,761,684 A | 8/1988 | Clark et al. |
| 4,761,807 A | 8/1988 | Matthews et al. |
| 4,761,808 A | 8/1988 | Howard |
| 4,763,191 A | 8/1988 | Gordon et al. |
| 4,764,666 A | 8/1988 | Bergeron |
| 4,766,604 A | 8/1988 | Axberg |
| 4,769,834 A | 9/1988 | Billinger et al. |
| 4,774,655 A | 9/1988 | Kollin et al. |
| 4,781,377 A | 11/1988 | McVean et al. |
| 4,782,510 A | 11/1988 | Szlam |
| 4,782,519 A | 11/1988 | Patel et al. |
| 4,783,796 A | 11/1988 | Ladd |
| 4,783,800 A | 11/1988 | Levine |
| 4,785,408 A | 11/1988 | Britton et al. |
| 4,785,473 A | 11/1988 | Pfeiffer et al. |
| 4,788,682 A | 11/1988 | Vij et al. |
| 4,788,715 A | 11/1988 | Lee |
| 4,788,716 A | 11/1988 | Zebe |
| 4,788,718 A | 11/1988 | McNabb et al. |
| 4,789,928 A | 12/1988 | Fujisaki |
| 4,791,664 A | 12/1988 | Lutz et al. |
| 4,791,666 A | 12/1988 | Cobb et al. |
| 4,792,968 A | 12/1988 | Katz |
| 4,796,293 A | 1/1989 | Blinken et al. |
| 4,797,818 A | 1/1989 | Cotter |
| 4,797,910 A | 1/1989 | Daudelin |
| 4,797,911 A * | 1/1989 | Szlam et al. .................. 379/92 |
| 4,797,913 A | 1/1989 | Kaplan et al. |
| 4,799,156 A | 1/1989 | Shavit et al. |
| 4,799,255 A | 1/1989 | Billinger et al. |
| 4,800,583 A | 1/1989 | Theis |
| 4,805,207 A | 2/1989 | McNutt et al. |
| 4,805,209 A | 2/1989 | Baker, Jr. et al. |
| 4,812,843 A | 3/1989 | Champion, III et al. |
| 4,815,031 A | 3/1989 | Furukawa |
| 4,815,121 A | 3/1989 | Yoshida |
| 4,815,741 A | 3/1989 | Small |
| 4,827,500 A | 5/1989 | Binkerd et al. |
| 4,829,563 A | 5/1989 | Crockett et al. |
| 4,832,341 A | 5/1989 | Muller |
| 4,835,630 A | 5/1989 | Freer |
| 4,842,278 A | 6/1989 | Markowicz |
| 4,845,739 A | 7/1989 | Katz |
| 4,847,890 A | 7/1989 | Solomon et al. |
| 4,850,007 A | 7/1989 | Marino et al. |
| 4,852,154 A | 7/1989 | Lewis et al. |
| 4,853,882 A | 8/1989 | Marshall |

| Patent No. | Date | Inventor |
|---|---|---|
| 4,856,050 A | 8/1989 | Theis et al. |
| 4,856,066 A | 8/1989 | Lemelson |
| 4,866,756 A | 9/1989 | Crane et al. |
| 4,876,592 A | 10/1989 | Von Kohorn |
| 4,876,717 A | 10/1989 | Barron et al. |
| 4,878,240 A | 10/1989 | Lin et al. |
| 4,881,261 A | 11/1989 | Oliphant et al. |
| 4,882,473 A | 11/1989 | Bergeron et al. |
| 4,893,325 A | 1/1990 | Pankonen et al. |
| 4,893,328 A | 1/1990 | Peacock |
| 4,893,330 A | 1/1990 | Franco |
| 4,894,857 A | 1/1990 | Szlam et al. |
| 4,896,345 A | 1/1990 | Thorne |
| 4,896,346 A | 1/1990 | Belfield et al. |
| 4,897,867 A | 1/1990 | Foster et al. |
| 4,899,373 A | 2/1990 | Lee et al. |
| 4,899,375 A | 2/1990 | Bauer et al. |
| 4,907,079 A | 3/1990 | Turner et al. |
| 4,908,761 A | 3/1990 | Tai |
| 4,908,850 A * | 3/1990 | Masson et al. ............... 379/91 |
| 4,908,852 A | 3/1990 | Hird et al. |
| 4,916,726 A | 4/1990 | Morley, Jr. et al. |
| 4,922,519 A | 5/1990 | Daudelin |
| 4,922,520 A | 5/1990 | Bernard et al. |
| 4,922,522 A | 5/1990 | Scanlon |
| 4,926,462 A | 5/1990 | Ladd et al. |
| 4,932,021 A | 6/1990 | Moody |
| 4,933,965 A | 6/1990 | Hird |
| 4,937,853 A | 6/1990 | Brule et al. |
| 4,942,598 A | 7/1990 | Davis |
| 4,942,599 A | 7/1990 | Gordon et al. |
| 4,942,616 A | 7/1990 | Linstroth et al. |
| 4,943,995 A | 7/1990 | Daudelin et al. |
| 4,951,307 A | 8/1990 | Willard |
| 4,955,047 A | 9/1990 | Morganstein et al. |
| 4,959,783 A | 9/1990 | Scott et al. |
| 4,959,855 A | 9/1990 | Daudelin |
| 4,961,217 A | 10/1990 | Akiyama |
| 4,964,157 A | 10/1990 | Aoshima |
| 4,965,825 A | 10/1990 | Harvey et al. |
| 4,969,183 A | 11/1990 | Reese |
| 4,969,185 A | 11/1990 | Dorst et al. |
| 4,972,461 A | 11/1990 | Brown et al. |
| 4,974,252 A | 11/1990 | Osborne |
| 4,975,945 A | 12/1990 | Carbullido |
| 4,989,233 A | 1/1991 | Schakowsky et al. |
| 4,989,234 A | 1/1991 | Schakowsky et al. |
| 4,992,940 A | 2/1991 | Dworkin |
| 4,996,705 A | 2/1991 | Entenmann et al. |
| 5,000,486 A | 3/1991 | Rua, Jr. et al. |
| 5,001,710 A | 3/1991 | Gawrys et al. |
| 5,003,574 A | 3/1991 | Denq et al. |
| 5,003,595 A | 3/1991 | Collins et al. |
| 5,014,298 A | 5/1991 | Katz |
| 5,017,917 A | 5/1991 | Fisher et al. |
| 5,018,736 A | 5/1991 | Pearson et al. |
| 5,023,904 A | 6/1991 | Kaplan et al. |
| 5,033,076 A | 7/1991 | Jones et al. |
| 5,033,088 A | 7/1991 | Shipman |
| 5,036,535 A | 7/1991 | Gechter et al. |
| 5,046,183 A | 9/1991 | Dorst et al. |
| 5,054,059 A | 10/1991 | Stern et al. |
| 5,083,272 A | 1/1992 | Walker et al. |
| 5,097,528 A | 3/1992 | Gursahaney et al. |
| 5,109,414 A | 4/1992 | Harvey et al. |
| 5,125,024 A | 6/1992 | Gokcen et al. |
| 5,127,003 A | 6/1992 | Doll, Jr. et al. |
| 5,128,984 A | 7/1992 | Katz |
| 5,146,491 A | 9/1992 | Silver et al. |
| 5,148,474 A | 9/1992 | Haralambopoulos et al. |
| 5,164,981 A | 11/1992 | Mitchell et al. |
| 5,168,548 A | 12/1992 | Kaufman et al. |
| 5,179,585 A | 1/1993 | MacMillan, Jr. et al. |
| 5,181,236 A | 1/1993 | LaVallee et al. |
| 5,181,238 A | 1/1993 | Medamana et al. |
| 5,186,471 A | 2/1993 | Vancraeynest |
| 5,199,062 A | 3/1993 | Von Meister et al. |
| 5,214,689 A | 5/1993 | O'Sullivan |
| 5,222,120 A | 6/1993 | McLeod et al. |
| 5,233,654 A | 8/1993 | Harvey et al. |
| 5,236,199 A | 8/1993 | Thompson, Jr. |
| 5,255,183 A | 10/1993 | Katz |
| 5,263,723 A | 11/1993 | Pearson et al. |
| 5,289,531 A | 2/1994 | Levine |
| 5,299,260 A | 3/1994 | Shaio |
| 5,303,298 A | 4/1994 | Morganstein |
| 5,303,299 A | 4/1994 | Hunt et al. |
| 5,327,554 A | 7/1994 | Palazzi, III et al. |
| 5,333,185 A | 7/1994 | Burke et al. |
| 5,335,277 A | 8/1994 | Harvey et al. |
| 5,351,276 A | 9/1994 | Doll, Jr. et al. |
| 5,351,285 A | 9/1994 | Katz |
| 5,353,335 A | 10/1994 | D'Urso et al. |
| 5,354,069 A | 10/1994 | Guttman et al. |
| 5,361,295 A | 11/1994 | Solomon et al. |
| 5,369,685 A | 11/1994 | Kero |
| 5,403,999 A | 4/1995 | Entenmann et al. |
| 5,415,416 A | 5/1995 | Scagnelli et al. |
| 5,416,830 A | 5/1995 | MacMillan, Jr. et al. |
| 5,418,844 A | 5/1995 | Morrisey et al. |
| 5,475,205 A | 12/1995 | Behm et al. |
| 5,490,207 A | 2/1996 | Schorr |
| 5,511,112 A | 4/1996 | Szlam |
| 5,537,143 A | 7/1996 | Steingold et al. |
| 5,561,710 A | 10/1996 | Helms |
| 5,599,046 A | 2/1997 | Behm et al. |
| 5,623,536 A | 4/1997 | Solomon et al. |
| 5,651,048 A | 7/1997 | Leeuw |
| 5,709,603 A | 1/1998 | Kaye |
| 5,768,348 A | 6/1998 | Solomon et al. |
| 5,787,156 A | 7/1998 | Katz |
| 5,790,636 A | 8/1998 | Marshall |
| 5,815,551 A | 9/1998 | Katz |
| 5,835,576 A | 11/1998 | Katz |
| 6,335,965 B1 * | 1/2002 | Katz ..................... 379/93.12 |

FOREIGN PATENT DOCUMENTS

| | | |
|---|---|---|
| CA | 1022674 | 12/1977 |
| CA | 1025118 | 1/1978 |
| CA | 1056500 | 6/1979 |
| CA | 1059621 | 7/1979 |
| CA | 1162336 | 2/1984 |
| CA | 1225759 | 8/1987 |
| CA | 2009937-2 | 8/1990 |
| DE | OS 2929416 | 2/1981 |
| DE | 32 25 562 | 1/1984 |
| DE | OS 3726366 | 2/1988 |
| DE | 4005365 A1 | 8/1990 |
| EP | 0 120 322 | 2/1984 |
| EP | 0 217 308 A2 | 4/1987 |
| EP | 0 229 170 A | 7/1987 |
| EP | 0249575 | 12/1987 |
| EP | 0 249 795 | 12/1987 |
| EP | 0295837 | 12/1988 |
| EP | 0342295 | 11/1989 |
| EP | 0434181 | 6/1991 |
| EP | 0 451 693 A2 | 10/1991 |
| EP | 0 451 695 A2 | 10/1991 |
| EP | 0 453 831 A2 | 10/1991 |
| EP | 0 454 363 A2 | 10/1991 |
| EP | 0 568 114 A | 11/1993 |
| EP | 0 620 669 A | 10/1994 |

| | | |
|---|---|---|
| EP | 0 438 860 B1 | 9/1996 |
| EP | 0 382 670 B1 | 4/1997 |
| EP | 0 382 212 B1 | 7/1998 |
| EP | 0 917 335 A2 | 5/1999 |
| FR | 2 575 016 | 7/1986 |
| FR | 9002131 | 8/1990 |
| GB | 1162484 | 4/1967 |
| GB | 2184327 A | 6/1987 |
| GB | 2 230 403 A | 10/1990 |
| GB | 2 252 270 B | 8/1992 |
| GB | 2253542 | 9/1992 |
| JP | 52-17739 | 2/1977 |
| JP | 52-17740 | 9/1977 |
| JP | 54-62708 | 5/1979 |
| JP | 56-152365 | 11/1981 |
| JP | 59-83270 | 5/1984 |
| JP | 62-92654 | 4/1987 |
| JP | 62-98848 | 5/1987 |
| JP | 62-239757 | 10/1987 |
| JP | 500138/88 | 1/1988 |
| JP | 009353/1988 | 1/1988 |
| JP | 63-114442 | 5/1988 |
| JP | 246067/1988 | 10/1988 |
| JP | 117436/1989 | 5/1989 |
| JP | 298158/90 | 12/1990 |
| JP | 41855/91 | 2/1991 |
| WO | WO 82/02132 | 6/1982 |
| WO | 00370/87 | 1/1987 |
| WO | WO 87/00375 | 1/1987 |
| WO | WO88/02966 | 4/1988 |
| WO | WO88/05985 | 8/1988 |
| WO | WO89/02139 | 3/1989 |
| WO | WO 89/09530 | 10/1989 |
| WO | WO 89/11768 | 11/1989 |
| WO | WO 90/10989 | 9/1990 |
| WO | WO 90/11661 | 10/1990 |
| WO | WO 91/15818 | 10/1991 |
| WO | WO 92/06548 | 4/1992 |
| WO | WO 92/09164 | 5/1992 |
| WO | WO 92/15166 | 9/1992 |
| WO | WO93/05483 | 3/1993 |

OTHER PUBLICATIONS

Confalone, D. E., et al, "Calling Card Service—TSPS Hardware, Software, and Signaling Implementation", The Bell System Technical Journal, Sep., 1982.

Eigen, D.J., et al., "Calling Card Service—Human Factors Studies", The Bell Technical Journal, Sep., 1982.

Lexis Search, Nov. 1, 1984, re: System 85 Computer Process.

Lexis Search, Jan. 28, 1985, re: Rolm Releases Four–Channel Phonemail Voice Message Unit.

Kroemer, F., "Telebox", Unterrichtsblätter, year 38/1985, No. 4, pp. 131–141 (Article)—no translation.

Kroemer, F., "Telebox", Unterrichtsblätter, year 41/1988, No. 2, pp. 67–83 (Article)—no translation.

C.R. Newson, "Merlin Voice Mail VM600," British Telecommunications Engineering, vol. 4, Apr. 1985, pp. 32–35.

A.S. Yatagai, "Telephonic Voice Synthesis Systems," Telecommunications, Aug. 1985, pp. 56h–I, 68.

A.J. Waite, "Getting Personal With New Technologies For Telemarketers," DM News, Feb. 15, 1987 at 50.

"Shopping via a network is no longer just talk," Data Communications, Aug. 1981 at 43.

"Growth–Oriented Systems," Restaurant Technology, Nation's Restaurant News Newspaper, Jul. 1, 1985 at 51.

"Let your fingers do the tapping . . . and the computer the talking," Modern Office Tech., May 1984 at 80.

"American Software unveils systems for IBM mainframes," Computerworld, Mar. 26, 1984 at 59.

"Business Units Get Order Entry," Computerworld, Jul. 12, 1982 at 36.

Lexis Search Results (Great American Potato–Chip giveaway/Raisin Bran Game/Giants Baseball Trivia—Dial Info): "In the Chips" AdWeek, Jul. 22, 1985 "In The Chips" AdWeek, Jul. 22, 1985 "San–Fran–Police–League", Business Wire, Aug. 2, 1985 "Phone Offers Action At Push Of Button", Advertising Age, Feb. 6, 1986.

Boies, Stephen J., "A Computer Based Audio Communication System", *Computer Sciences Department,* Thomas J. Watson Research Center, Yorktown Heights, New York, USA, pp. 701–704—(Article).

Winckelmann, W.A., "Automatic Intercept Service", *Bell Laboratories Record,* May 1968, vol. 46, No. 5, pp. 138–143—(Article).

"Proposed Agreement Between National Enterprises Board (N.E.B.) and Delphi", Jan. 30, 1979 Voysey, Hedley, "Nexos wins rights to comms engine", *Computing,* Sep. 6, ??, vol. 7, No. 36—(Article) "Appraisal Of The Fair Market Value Of Delphi Communications", Apr. 30, 1990—(Study) Delphi Communications—Charts and Exhibits).

"Voice–Response System Improves Order Entry, Inventory Control", *Communication News,* Aug. 1976—(Article) "Periphonics VoicePak"—(Brochure) "The Voice Response Peripheral That Turns Every Touch–Tone Telephone Into A Computer Terminal", Periphonics Corporation—(Brochure).

Rabin, Jeff, "Minorities Seek 30% Share of All Lottery Operations", *Sacramento Bee,* Apr. 12, 1995—(Article)

Advertisements (Dial Giants Baseball Trivia Game): *San Francisco Chronicle,* Jul. 3, 1984 Curtis, Cathy, "(976 numbers let you dial–a–whatever", *San Francisco Business Journal,* Nov. 26, 1984—(Article) Ferrell, Jane, "Three little numbers for instant information", *San Francisco Chronicle,* Aug. 15, 1984—(Article).

Dallas Telephone Call–in Game Uses Computer Voice Interface, Sep. 24, 1984—(Press Release).

Rivest, R.L., et al., "A Method for Obtaining Digital Signatures and Public–Key Cryptosystems", *Communications of the ACM,* Feb. 1978, vol, 21, No. 2, pp. 120–126—(Article).

Finnigan, Paul F, "Audiotex: The telephone as data–access equipment", *Data Communications,* 1987, pp. 155–161 (Article).

Ozawa, Y., et al., "Voice Response System and Its Applications", *Hitachi Review,* Dec. 1979, vol. 28, No. 6, pp. 301–305—(Article).

"AT&T 2: Reaches agreement with Rockwell (ROK)", Aug. 26, 1986—(Press Release) AT&T: "Expands Computer speech system product line", Apr. 14, 1986—(Press Release).

Adams, Cynthia, "Conversing With Computers", *Computerworld on Communications,* May 18, 1983, vol. 17, No. 20A, pp. 36–44—(Article).

Hester, S.D., et al., "The AT&T Multi–Mode Voice Systems—Full Spectrum Solutions For Speech Processing Applications", Sep. 1985, pp. 1–10—(Proceedings Of The 1985 AVIOS Conference).

Davidson, Leon, "A Pushbutton Telephone For Alphanumeric Input", *Datamation,* Apr. 1966, pp. 27–30—(Article).

Advertisement: Cuervo Gold Beach Chair, VoiceMail Int'l, '83.

"Digital's All–In–1 Voice Messaging", Digital—(Brochure)
"Access Voice and Mail Messages From One Familiar Source", *Insight,*—(Article).
"Get The Message . . . !" "New VoiceMail Features", *Voicemail International, Inc.,* Oct. 1984—(Article).
Brochures (TWA Crew Scheduling/PSA's Reservation System/Universal Studios Program/Dow Phone): "AVIAR The communication system that keeps you flying", VoiceMail Int'l,—(Brochure). "TWA VoiceMail, Flight Attendants Users Guide" Aug. 1986,—(Brochure).
Holtzman, Henry, "Voice Mail Soars At TWA", *Modern Office Technology* (Reprint), Mar. 1986,—(Article) "Bid Results via VOICEMAIL—Flight Deck Crew Members", May 1, 1985 (Script).
Borden, W.S., "Flight Attendant Self Input Of Monthly Bids Via Touch Tone Telephone", *In–Flight Services Bulletin,* Sep. 15, 1985—(Memo).
"Look Ma, no operators! Automatic voice system doesmany airline jobs", *Air Transport World,* Oct. 1986—(Article).
"1,000,000 Shares of Common Stock" *Voicemail International, Inc.,*. Jan. 10, 1984—(Public Offering Summary).
Levinson, S.E., et al., "A Conversational–Mode Airline Information and ReservationSystem Using Speech Input and Output", *The Bell System Technical Journal,* Jan. 1980, vol. 59, No. 1, pp. 119–137—(Chapter from a Book).
Emerson, S.T., "Voice Response Systems—Technology to the Rescue for Business Users", *Speech Technology,* Jan./Feb. '93, pp. 99–103—(Article).
Moslow, Jim, "Emergency reporting system for small communities", *Telephony,* Feb. 11, 1985, pp. 30–32, 34—(Article).
Rabiner, L.R., et al., "Digital Techniques for Computer Voice Response: Implementation and Applications", *Proceedings Of The IEEE,* Apr. 1976, vol. 64, No. 4, pp. 416–432—(Article).
Moosemiller, J.P., "AT&T's Conversant™ I Voice System" *Speech Technology,* Mar./Apr. 1986, pp. 88–93—(Article).
Frank, R.J., et al., "No. 4 ESS: Mass Announcement Capability", *The Bell System Technical Journal,* Jul./Aug. 1981, vol. 60, No. 6, Part 2, pp. 1049–1081—(Chapter from a Book).
"Chapter I General Description" *D.I.A.L. PRM/Releases 3—Version 2* Mar. 1987 (Product Reference Manual) "Announcing Release 3.3" *D–A–S–H– D.I.A.L. Application and Support Hints,* Jan./Feb. Mar. 1987, vol. 3, No. 1—(Brochure) "D.I.A.L. Software Release 4", *OPCOM,* Jan. 1988, Version 1—(Product Reference Manual).
Brady, R.L., et al., "Telephone Identifier Interface", *IBM Technical Disclosure Bulletin,* Oct. 1976, vol. 19, No. 5, pp. 1569–1571—(Article).
Corbett, A.J., "Telephone Enquiry System Using Synthetic Speech", University of Essex, Dec. 1974, (Thesis).
Yoshizawa, K., et al., "Voice Response System for Telephone Betting", *Hitachi Review,* Jun. 1977, vol. 26, No. 6—(Article).
Sagawa, S., et al., "Automatic Seat Reservation By Touch–Tone Telephone", *Second USA Japan Computer Conference,* 1975, vol. 2, pp. 290–294—(Article).
Smith, S.L., "Computer–Generated Speech and Man—Computer Interaction", *Human Factors,* 1970, 12(2), pp. 215–223—(Article).
Newhouse, A., et al., "On The Use Of Very Low Cost Terminals", University of Houston, pp. 240–249—(Paper).

Mullen, R.W., "Telephone—home's 'friendliest' Computer", *Inside Telephone Engineer And Management,* May 15, 1985, vol. 89, No. 10,—(Article).
"Telephone Computing Entering Service Bureau Business", *American Banker,* Jul. 5, 1979—(Article) Kutler, Jeffrey, "Technology, System Sharing Improve Phone Banking Outlook", *American Banker,* Dec. 7. 1979, vol. CXLIV, No. 237—(Article) Kutler, Jeffrey, "Phone Bill Paying Accessed by Pioneer", *American Banker,* Dec. 7. 1979, vol. CXLIV, No. 237—(Article).
"User's Guide", *Dowphone* "Audiotex Information From Dow Jones", *The Computer Review,* Nov. 1984, vol. 2, No. 1—(Article) "Dow Phone Adds Innovest Systems' Technical Analysis Reports" *IDP Report,* Jan. 3, 1986—(Report).
Perdue, R.J., et al., "Conversant 1 Voice System: Architecture and Applications", *AT&T Technical Journal,* Sep./Oct. 1986—(Article).
Martin, James, "Design of Man—Computer Dialogues", *IBM System Research Institute,* Chapter 16, pp. 283–306—(Chapter from a Book).
Kaiserman, D.B., "The Role Of Audio Response In Data Collection Systems", *Proceedings of the Technical Sessions,* Paleis des Expositions, Geneva, Switzerland, Jun. 17–19, 1980, pp. 247–251—(Article).
Boles, S.J., et al., "User Interface for Audio Communications System", *IBM Technical Disclosure Bulletin,* Dec. 1982, vol. 25, No. 7A, pp. 3371–3377—(Article).
Kramer, J.J., "Human Factors Problems in the Use of Pushbutton Telephones for Data Entry", *Bell Telephone Laboratories,* Holmdel, N.J., Apr. 74, pp. 241–258—(Paper).
Cox, Jr., Floyd, "Flora Fax", Jan. 22, 1986—(Letter and Advertisements).
Isayama, Tetsuya, "Automatic Response Processing Equipment as a Multi–media Communication Node", *Japan Telecommunications Review,* 1987, vol. 29, No. 1, pp. 29–36—(Article).
Imai, Y., et al., "Shared Information System Using New Audio Response Unit" *Japan Telecommunications Review,* Oct. 1981, vol. 23, No. 4, pp. 383–390—(Article).
"Distrust of computer kills home service plan".
"Automatic Call Distributor/Management Information System: Interface between 1/1AESS™ Switch Central Office and Customer Premises Equipment", *Bell Communications Research,* Dec. 1986, Technical Reference TR–TSY–000306, Issue 1—(Article) "Comparison Of ACD Systems", *Connection,* Feb. 1990—(Chart) "ACD Comparison", *Aspect,* Feb. 2, 1990—(Final Report).
Borison, V.S., "Transaction—telephone gets the fact at the point of sale", *Bell Laboratories Record,* Oct. 1975, pp. 377–383—(Article).
Demeautis, M., et al., "The TV 200 A Transactional Telephone", *Commutation & Transmission* n° 5, 1995, pp. 71–82—(Article).
Eriksson, G., et al., "Voice and Data Workstations and Services in the ISDN", *Ericsson Review.,* May 1984, pp. 14–19—(Article).
Schrage, Michael, "A Game Von Meister in Pursuit of Profits", *Washington Post,* Sep. 23, 1985—(Article).
Svigals, J., "Low Cost Point–Of–Sale Terminal", *IBM Technical Disclosure Bulletin,* Sep. 1982, vol. 25, No. 4, p. 1835.
Turbat, A., "Telepayment And Electronic Money The Smart Card", *Commutation & Transmission* n° 5, 1982, pp. 11–20—(Article).

"Voice Mail", *Sound & Communications,* Apr. 1983, vol. 28, No. 12, pp. 84–85—(Article).

Aso, Satoshi, "Trends and Applications of Voice Output Devices", *2209 J.E.E. Journal of Electronic Engineering,* Feb. 1982, vol. 19, No. 182, pp. 102–107—(Article).

Lanzeter, Ygal, "Automatic Number Identification System For Step–By–Step Exchanges", The Ninth Convention of Electrical and Electronics Engineers In Israel, Apr. 1975—(Paper).

Flanagan, J.L., et al., "Speech Synthesis", Chapters 1, 39, 42, 45 and 46—(Chapter from a Book).

"Bell Atlantic's Bolger Wants To Be Free", *Telephony,* Jul. 14, 1986—(Article).

"Advanced New Cable TV Technology Developed For Impulse–Pay–Per–View", Jun. 3, 1985—(Search).

Noll, M.A., "Introduction to Telephones & Telephone Systems", Second Edition, Chapter 9—(Chapter from a Book).

"Proposal for Kome Mediavoice Interactive Phone/Database Marketing System", "Mediavoice Startup Software Package For Kome" "Optional Mediavoice Software Packages For Kome" "Why ATI Mediavoice Is The Choice For Success"—(Proposal).

Meade, Jim, Dec. 29, 1992—(Letter).*

"All About Voice Response", *Datapro Research Corporation,* Delran, N.J., Mar. 1972 and Sep. 1974—(Article).*

"Voice Response in Banking Applications", *Datapro Research Corporation,* Delran, N.J., Oct. 1974 and Feb. 1983—(Article).*

Schiller, T.R., "Field Craft Technician Communication With A Host Computer Synthesized Voice", *Proceedings AVIOS '86 Voice I/O Systems Applications Conference,* Sep. 16–18, 1986.*

Rabin, Richard, "Telephone Access Applications: The Growth Market For Voice Processing", *Proceedings AVIOS '86 Voice I/O Systems Applications Conference,* Oct. 6–8, 1987. Schuster, E.R., "B.R.U.T.U.S. Better Registration Using Touch–Tone phones for University Studies", *Proceedings AVIOS §Voice I/O Systems Applications Conference,* Oct. 4–6, 1988.*

"Exxon's Next Prey, IBM and Xerox", *BusinessWeek,* Apr. 26, 1980, pp. 92–96 and 103—(Article).*

Weinstein, S.B., "Emerging Telecommunications Needs of the Card Industry", *IEEE Communications Magazine,* Jul. 1984, vol. 22, No. 7, pp. 26–31—(Article).*

"Riding Gain", *Broadcasting,* Mar. 7, 1983—(Article).

Pickup, Mike, "Bank from home, by screen or phone", *Building Society Gazette,* Jul. 1988—(Article).

Pickup, Mike, "Voice Response", *Computer Systems,* Sep. 1986—(Article).

Rabiner, L.R., et al., "Isolated and Connected Word Recognition—Therapy and Selected Applications", *IEEE Transaction Communications,* May 1981, Com. 29, No. 5, pp. 621, 622, 633, 644–646, 655–659—(Article).

Takahashi, K.,5 et al., "The Audio Response System for Telephone Reservation", *U.D.C.* Oka, Y., et al., "Development of Ventilating Equipment for Shinkansan Train", *U.D.C.*—(Articles in Japanese).

Pagones, M.J., et al., "New services follow increased digitization on the long–haul transmission network", *AT&T Bell Laboratories Record,* 1983, vol. 61, pp. 26–33—(Article).

"New phone service tells customer who's calling", *Bell Laboratories Record,* 1984, vol. 62, p. 9—(Article).

Hirschman, C.B., et al., "LASS: Putting the telephone customer in charge", *Bell Laboratories Record,* 1985, vol. 63, pp. 10–16—(Article).

"AT&T building communications network for Defense Department" and "AT&T inaugurates pay–per–view TV", *Bell Laboratories Record,* 1986, vol. 64, p. 2—(Article).

"Power To . . . ", Dialogic Corporation, Littleton Road,—(unidentifiable Article).

"Representative Customer List For Interface Technology's Total Entry System", "Toes Solutions—Pharmaceutical Manufacturer", "The Voice Response Solution For Answering Customer/Sales Calls", "Toes Solutions—Orthopedic Equipment" and "Toes Solutions—Convenience Store"—(Articles).

Lummis, R.C., "Speaker Verification: A Step Toward the "Checkless" Society", *Bell Laboratories Record,* pp. 254–259—(Article).

Flanagan, J.L., et al., "Synthetic voices for computers", *IEEE Spectrum,* Oct. 1970, vol. 7, No. 10, pp. 22–45—(Article).

Rabiner, L.R., et al., "Computer Synthesis of Speech by Concatenation of Formant–Coded Words", *The Bell System Technical Journal,* May/Jun. 1971, pp. 1541–1558—(Chapter from a Book).

Flanagan, J.L., "Wiring Telephone Apparatus from Computer–Generated Speech", *The Bell System Technical Journal,* Feb. 1972, pp. 391–397—(Chapter from a Book).

Hornsby, Jr., Thomas G., "Voice Response Systems", *Modern Data,* Nov. 1972, pp. 46–50—(Article).

Diffie, W., et al., "New Directions in Cryptography", *IEEE Transactions On Information Theory,* Nov. 1976, vol. IT–22, No. 6, pp. 644–654—(Article).

Rosenthal, L.H., ,et al., "Automatic voice response: interfacing man with machine", *IEEE Spectrum,* Jul. 1974, vol. 11, No. 7—(Article).

Rosenthal, L.H., et al., "A Multiline Computer Voice Response System Utilizing ADPCM Coded Speech", *IEEE Transactions on Acoustics, Speech, and Signal Processing,* Oct. 1974, vol. ASSP–22, No. 5, pp. 339–352—(Article).

Flanagan, James L., "Computers that Talk and Listen: Man—Machine Communication by Voice", *Proceedings for the IEEE,* Apr. 1976, vol. 64, No. 4, pp. 405–415—(Article).

Maisel, Ivan, "To Put Your Baseball Savvy On The Line, Pick Up The Phone And Call", *Sports Illustrated,* Sep. 3, 1984—(Script). Brown, Merrill, "Hollywood Saga: Who Bought J.R.?", *The Washington Post* Final Edition, Oct. 14, 1984—(Script) "Special–Olympics; Teams with baseball trivia expert Brad Curtis", *Business Wire,* Sep. 30, 1985—(Script).

Lucas, W.A., et al., "The Spartanburg Interactive Cable Experiments In Home Education", Rand Corp., U.S. Department of Commerce, National Technical Information Service, Feb., 1979—(Publication).

Martin, James, "Viewdata And The Information Society",—(Book).

Gawrys, G.W., "Ushering In The Era Of ISDN", *AT&T Technology,* 1986, vol. 1, No. 1, pp. 2–9—(Article).

Cummings, J.L., et al., "AT&T Network Architecture Evolution", *AT& T Technical Journal,* May/Jun. 1987, vol. 66, Issue 3, pp. 2–12—(Article).

Yates, C.E., "Telemarketing And Technology: Perfect Business Partners", *AT&T Technology,* 1987, vol. 1, No. 3, pp. 48–55—(Article).

Herr, T.J., "ISDN Applications In Public Switched Networks", *AT&T Technology*, 1987, vol. 2, No. 3, pp. 56–65—(Article).

"Only the best, Only from Florafax", Florafax—(Advertisement).

Aldefeld, B., et al., "Automated Directory Listing Retrieval System Based on Isolated Word Recognition", *Proceedings of the IEEE*, Nov. 1980, vol. 68, No. 11, pp. 1364–1379—(Article).

Rabiner, L.R., et al., "On the Application of Embedded Training to Connected Letter Recognition for Directory Listing Retrieval", *AT&T Bell Laboratories Technical Journal*, Mar. 1984, vol. 63, No. 3, pp. 459–477—(Chapter from a Book).

Rosenberg, A.E., et al., "Recognition of Spoken Spelled Names for Directory Assistance Using Speaker–Independent Templates", *The Bell System Technical Journal*, Apr. 1980, vol. 59, No. 4, pp. 571–592—(Chapter from a Book).

"The Voicestar Series By Periphonics", Periphonics, Jan. 1986—Publication) "Bank–From–Home system by Periphonics Corporation" "Bill Payment Success Story", Periphonics Corporation "A History of Imagination", Periphonics "Banking Success Story", Periphonics Corporation "Data-Voice and the PDT II", Periphonics Corporation "Banking Success Story", Periphonics Corporation—(Brochure).

Schulman, Roger, "TeleLearning: The Computer Brings the Classroom Home", *Family Computing*, Sep. 1984, pp. 50–53—(Article).

"ICS launches new ?–home interactive video service package", *Cable Vision*, Sep. 3, 1984, pp. 71/73—(Article).

"The Remarketing of Prestel", *Which Computer?*, Aug. 1984, pp. 106, 107 and ?—(Article).

"Four–Line TeleClerk Calls, Answers, Stores, Surveys", *Hardcopy*, Jan. 1985, vol. 14, No. 1—(Article).

"Peripheral Speaks On Phone", *Hardcopy*, Dec. 1984—(Article).

Page from *What's new in Computing*, Apr. 1985—(Article).

Page from *Today*, A Compuserve Publication, Jun. 1985—(Article).

Page from *Computer Communications*, Feb. 1984, Vol. 7, No. 1—(Article).

Gits, Victoria, "Interactive device doesn't interrupt telephone calls", *Cable Vision*, Jun. 17, 1985, p. 20—(Article).

Cuilwik, Tony, "Reach Out & Touch The Unix System", *Unix Review*, Jun. 1985, pp. 50, 52, 53, 56—(Article).

Blackwell, Gerry, "Dial–a–Quote: first Canadian commercial audiotex service", *Computing Canada*—(Article).

Applebaum, Simon, "Two–way television" *Cable Vision*, Aug. 8, 1983, p. 66—(Article).

Sw??ne, Michael, "Fiber-optic TV network lets viewers talk back", *Info World*—(Article).

Morrill, C.S., et al., "User Input Mode and Computer–Aided Instruction", *Human Factors*, 1968, 10(3), pp. 225–232—(Chapter from a Book).

Results of Lexis Search Request for "Dial Info or Dialinfo", Date of Search Apr. 13, 1992, pp. 1–38.

Results of Lexis Search Request for "Phone Programs or International Information Network", Date of Search Apr. 15, 1992, pp. 1–35.

Van Gieson, Jr. W.D., et al., "Machine–Generated Speech For Use With Computers, and the problem of fitting a spoken word into one half second", *Computers and Automation*, Nov. 1968, pp. 31–34—(Article).

Patel, Jay, "Utility of voice response system depends on its flexibility", *Bank Systems & Equipment*, Dec. 1988, pp. 101/103—(Article).

Buron, R.H., "Generation of a 1000–Word Vocabulary for a Pulse–Excited Vocoder Operating as an Audio Response Unit", *IEEE Transactions On Audio And Electroacoustics*, Mar. 1986, vol. AU–16, No. 1, pp. 21–25—(Article).

Gaines, B.R., et al., "Some Experiments in Interactive System Development and Application", *Proceedings of the IEEE*, Jun. 1975, vol. 63, No. 6, pp. 894–911—(Article).

"Application For Registration Of Equipment To Be Connected To The Telephone Network", Federal Communication Commission, FCC Form 730.

Dudley, Homer, "The Vocoder", Circuit Research Department, Dec. 1939, pp. 122–128—(Chapter from a Book).

"Voice Response System Order Entry, Inventory Control".

"Vendor Index", *Audiotex Directory & Buyer's Guide*, Fall/Winter 1989/90, pp. 114–156.

Frances, M., et al., "Input Devices For Public Videotex Services", *Human—Computer Interaction—Interact '84*, 1985, pp. 171–175—(Paper).

Labrador, C., et al., "Experiments In Speech Interaction With Conventional Data Services", *Human—Computer Interaction—Interact '84*, pp. 225–229—(Paper).

Long, J., et al., "Transaction Processing Video Using Videotex or: Shopping on Prestel", *Human—Computer Interaction—Interact '84*, 1985, pp. 251–255—(Paper).

*Electrical Communication*, 1981, vol. 56, Nos. 1–4, pp. 1–110—(Paper).

Conway, R.W., et al., "Tele–CUPL: A Telephone Time Sharing System", *Communication of the ACM*, Sep. 1967, vol. 10, No. 9, pp. 538–542—(Article).

Merill, T., et al., "Data–Dial: Two–Way Communication with Computers From Ordinary Dial Telephones", *Communications of the ACM*, Oct. 1963, vol. 6, No. 10, pp. 622–624—(Article).

Witten, I.H., "Communicating With Microcomputers", pp. 121–158—(Chapter from a Book).

"Call–It–Co. Hangs Up On Dial–It In Four Markets", *The 976 Exchange*, 1984, vol. 2, pp. 1–6 (Article).

"DECtalk Boston's Shawmut Bank Cut Costs and Improve Service", *Digital*—(Article).

"VTK 81 Voice Computer", Voicetek, 1987 (Brochure).

"How a Computerized "Voice" Answers Customers' Inquiries", *Bank Automation Newsletter*, Feb. 1985, vol. 19, No. 2 (Article).

Rickman, J., et al., "Speech Synthesizers—Communications Interface—Implementing A Touch Tone Telephone Talker With DECtalk", *The DEC Professional*, May 1985, pp. 38, 39, 42–44 (Article).

"DECtalk Delivers", *Digital Review*, Sep. 1985—(Article) "DECtalk turns a telephone into a terminal",—"Unix and Digital",—"Legal protection for semiconductor chips",—"Product Safety",—*DECworld*, Apr. 1985, vol. 9, No. 2, pp. 1, 3, 5, 6–8—(Article).

"DECtalk: A New Text–to–Speech Product" *Digital Guideline*, Mar. 1984, vol. 8, No. 3, pp. 1–8—(Article).

*Straight Talk,* A Newsletter about the DECtalk Speech Synthesizer from Digital Equipment Corporation, vol. 1, No. 1, pp. 1–6. *Straight Talk,* A Newsletter about the DECtalk Speech Synthesizer from Digital Equipment Corporation, vol. 1, No. 2, pp. 1–7 *Straight Talk,* A Newsletter about the DECtalk Speech Synthesizer from Digital Equipment Corporation, vol. 1, No. 3, pp. 1–8 *Straight Talk,* A Newsletter about the DECtalk Speech Synthesizer from Digital Equipment Corporation, vol. 1, No. 4, pp. 1–8 *Straight Talk,* A Newsletter about the DECtalk Speech Synthesizer from Digital Equipment Corporation, vol. 2, No. 2, pp. 1–8 *Straight Talk,* A Newsletter about the DECtalk Speech Synthesizer from Digital Equipment Corporation, vol. 1, No. 4, pp. 1–8.

Various References/Articles attached with a letter from Smithwin Associates, dated Apr. 22, 1992: Riley, A.A., "Latest: 2–way communication by computer and telephone" ??evens, W.?., "Computer Helps Children to Add", *The New York Times,* Apr. 20, 1970 Harvey, R.W., *Times,* The Kiplinger Magazine "A Computerized System ???", Nov. 23, 1970, p. 14, (unidentifiable Article) "Hardware for the 'cashless society'", *Electronic Design 3,* Feb. 4, 1971, p. 26 Tennant, R.P., "Advanced credit system smooths operation and hastens payout", *Data Processing Magazine,* Jun. 1971, vol. 13, No. 6, pp. 34–35. "Computers that talk back to you", *Business Week,* Date ?? Smith, Gene, "Chatting Via Computer", *New York Times,* Sep. 12, 1971 *EDP Weekly,* (unidentifiable Article) "Did Anybody Here Call a Computer", *Data Management,* Feb. 196?

Skala, Martin, "Straight talk from a computer", *Christian Science Monitor,* Jun. 14, 1973 "Computer for Watergate Probe", *Science,* Jun. 15, 1973.

"Tapping AT&T for a $50–million refund", *Business Week,* Jun. 9, 1973.

"Distrust of computer kills home service plan".

Scherer, Ron, "Chitchat with a computer", *Christian Science Monitor,* Apr. 16, 1975, p. 2.

"Trying Out the Pay–by–Phone Service", *Technology Review,* Mar./Apr. 1976, p. 15.

"Pentagon seeks more control", *Electronics,* Apr. 5, 1976, p. 39.

"Everyman's Computer Terminal", *Industrial Research,* Mar./Apr. 1976, p. 14.

"DOD could save on test equipment".

"Talking computer speeds Ford parts", Apr. 25, 1976 "Customers of Ten Banks Paying Bills by Phone", *Computer World,* 1976, p. 12 "FAA to test computerized voice response to queries from pilots", *Electronics,* Nov. 25, 1976, p. 43 Miller, F.W., "Voice Response Comes to Life with Order Entry", *Infosystems,* Oct. 1981, pp. 62/64 Suppes, Patrick, "University–Level Computer–Assisted Instruction At Stanford: 1968–1980", *Institute for Mathematical Studies In The Social Sciences, Stanford University,* 1981, pp. 589–716 Lerner, E.J., "Products that talk", *IEEE spectrum,* Jul. 1982, pp. 32–37 Carlsen, Clifford, "Megaphone plans to blare message on national scale", *Times,* Mar. 2, 1987 Michelson, Marlene, "All kinds of information at your fingertips by phone", *Business Times,* Sep. 8, 1986, vol. 3, No. 19 Lacter, Mark, "At Megaphone, It's Always Show Time", *San Francisco Chronicle,* Ju "The 976 Telelease Co.", *Business Opportunities Journal,* Dec. 1985 "One–time refund for '976' charges", *San Francisco Examiner,* Nov. 7, 1985 Kent, Debra, "Interactive phone network stretches for calls", *Advertising Age,* Oct. 17, 1987 "Making Your Phone Talk To Computers", *U.S. News,* Sep. 23, 1985 Mulqueen, John, "Int'l Information Network Eyes Contact With British Telecom", *Communications Week,* Sep. ?? Moorhead, Derrol, "Humor, romance: just a call away", *Rocky Mountain Collegian,* Sep. 19, 1985, vol. 94, Iss. 32 Keppel, Bruce, "Move Under Way to Curb Abuse of Popular Dial–It Service", *Los Angeles Times,* Sep. 1, 1985 "Dial–a–stock", *Forbes,* Aug. 1985 Sowa, Tom, "Games people play now include phone trivia", *Spokesman–Review,* Jul. 1985 Dougherty, P.H., "Advertising Telephone Is Growing As Medium", *The New York Times,* Jul. 17, 1985 Larso News briefs, Feb. 1966.

Martin, J., et al., "The Computerized Society—An apprisal of the impact of computers on society over the next fifteen years", Chapter 10, pp. 211–226—(Chapter from a Book).

New products, *Datamation,* Jul. 1966, vol. 12, No. 7, pp. 7/89—(Article).

Meacham, L.A., et al., "Tone Ringing and Pushbutton Calling", *The Bell System Technical Journal,* 1958, pp. 339–360—(Book).

Suppes, Patrick, "The Uses of Computers in Education", *Scientific American,* Sep. 1, 1966, vol. 215, No. 3, pp.—(Article).

Bruckert, E., et al., "Three–tiered software and VLSI aid developmental system to read text aloud", *Electronics,* Apr. 21, 1983, pp. 133–138—(Article).

Hockman, David, "Implementing Automatic Number Identification", *Telecommunications,* Dec., 1978, vol. 12, No. 12—(Article).

Martin, James, "Telecommunications and the Computer", 2nd Edition, Introduction, pp. 20–23, Chapter 5, pp. 94–95, Chapter 18—(Chapter from a Book).

Martin, James, "Telematic Society", Chapter 6, pp. 45–48, Chapter 9, pp. 67–69, Chapter 20, pp. 181–188—(Chapters from a Book).

Martin, James, "The Wired Society", pp. 53–55, 71–79, 99–100, 204–205, 229–231—(Chapters from a Book).

Martin, James, "Future Developments in Tele–Communications", 2nd Edition, Box A, Chapter 1, p. 5, Chapter 7, pp. 95–111, Chapter 9, pp. 149–105, Chapter 12, pp. 207–209, Chapter 18, pp. 310–311, Chapter 19, pp. 314–317, 320, Chapter 20, pp. 330, Chapter 23, pp. 379–401—(Chapters from a Book).

Ferrarini, E.M., "Infomania", pp. 59–61, 176–177, 191, 213–214, 223, 245, 250, 257, 285, 286—(Book).

Kimura, Y., et al., "Audio Response System", Vol. 55, No. 19, pp. 49–54—(Article in Japanese).

Takano, H., "Characteristics of Multipair Exchange Area Telephone Cable with Cellular Polyethylene Insulation by Gas Injection Blouing", p. 55—(Article in Japanese).

Takahashi, T., et al., "SR–2000 Voice Processor and its Application", *NEC Research and Development,* 1984, No. 73, pp. 98–105—(Paper).

"Concept Diagram Voicemail International System" "Voicemail Instruction Manual", Televoice International, Jun. 1981, Index.

Eckhouse, John, "Voice mail spells relief for phone frustration", *San Francisco Examiner,* Feb. 7, 1982—(Article).

Meade, Jim, "Throw away those pink Call–back slips", *InterOffice,* Jan./Feb. 1984, vol. 3, No. 1—(Article).

Welsh, Jack, "Everybody's Talking About Bouquets", *Design for Profit,* Spring 1986, pp. 7–10—(Article).
Mosco, Vincent, "Pushbutton Fantasies", Contents, Chapter 3 and 4, pp. 67–118—(Chapters from a Book).
Bretz, Rudy, "Media for Interactive Communication", Chapter 5, pp. 110–116, Chapter 7, pp. 143–153—(Chapters from a Book).
Robinson, G., et al., ""Touch–Tone" Teletext A Combined Teletext–Viewdata System", *IEEE Transactions on Consumer Electronics,* Jul. 1979, vol. CE–25, No. 3, pp. 298–303—(Article).
Voice News, Mar. 1982 Voice News, Jun. 1982, William W. Creitz Voice News, Oct. 1982, p. 5 Voice News, Nov./Dec. 1983.
"Consultant Report 28?", *AIS American Bell Advanced Information Systems,* Apr. 1983, pp. 27, 118–119, 123–124—(Report).
"T–1 Board Sets Delivery High Performance All Digital T–1 Solutions", *NMS Natural MicroSystems*—(Product Bulletin).
"VBX Product Family Overview", *NMS Natural MicroSystems,* pp. 1–20—(Brochure).
"Machine Operation Manual", May 12, 1978, Issue 1, pp. 1–3, 9–10—(Manual).
Davey, J.P., "Dytel Western Region Sales Training Manual", 1985—(Manual).
Gutcho, Lynette, "DECtalk—A Year Later", *Speech Technology,* Aug./Sep. 1985, pp. 98–102—(Article).
Daniels, Richard, "Automating Customer Service", *Insurance Software Review,* Aug./Sep. 1989, pp. 60–62—(Article).
Golbey, S.B., "Fingertip Flight Service", Oct. 1985—(Article).
"ARO Goes Pushbutton", Newsletter, Nov. 1985, p. 9—(Article).
"ROLM Centralized Attendant Service", ROLM Corporation, 1979.
"AIS, Versatile Efficient Information Service", Fujitsu Limited, 1972, pp. 153–162—(Brochure).
Smith, S.L., et al., "Alphabetic Data Entry Via the Touch–Tone Pad: A Comment", *Human Factors,* 1971, 13(2), pp. 189–190—(Book).
Holtzman, Henry, "Still an Infant Technology Voice Mail", *Modern Office Technology,* Jun. 1985, pp. 78–80, 82, 84–90—(Article).
Leander, Monica, "Voice Response—A Technology for Solving Management Problems", *Speech Technology,* Mar./Apr. 1986, pp. 50–52—(Article).
Stolker, Bud, "CompuCorder speech storage and output device. (evaluation)", *Creative Computing,* Jul. 1983, pp. 1–7.
Witten, I.H., et al., "The Telephone Enquiry Service: a man—machine system using synthetic speech", *Int. J. Man—Machine Studies,* Jul. 1977, 9, pp. 449–464—(Book).
Gould, R.L., "Fidelity's Automated Voice Response System", *Telecommunications,* Jan. 1981, pp. 27–28—(Article)
"Fidelity Automated Service Telephone", *Fidelity Group,* 4 pages—(Manual).
"Data Set 407 Interface Specification", *Manager—Data Systems & Operations,* Jun. 1975, Issue 2, pp. 1–69 plus Table of Contents—(Manual).
Fitzwilliam, J.W., et al., "Transaction Network, Telephones, and Terminals", *The Bell System Technical Journal,* Dec. 1978, vol. 57, No. 10, pp. 3325–3537—(Book).

*Inbound Outbound,* May 1988, complete issue.
Koch, Helmut, "Concord Design Services, Inc. Corporate Description", Exacom Federal Communications Commission, FDC Form 484, Registration, Registrant: Concord Design Services, Inc. Exacom Telecommunications Systems—Brochure General Description Installation and Operation Manual for Direct Inward Dial (DID) Trunk Interface Unit, Exacom Telecommunications Systems, Nov. 21, 1989, Issue 3—(Manual) General Description Installation and Operation Manual for Answering Service Monitor System, Concord Design Services, Inc., Dec. 19, 1986, Issue 1—Manual.
"Dialogic Voice Solutions", Dialogic Corporation, pp. 1–72 "Why Is T–1 Important And How Can It Be Used", Dialogic Corporation, Application Note, pp. 1–6 "Use of Dialogic T–1 for Telemarketing Applications", Dialogic Corporation Application Note, pp. 1–6 "Use of Dialogic T–1 In Operator Service Applications", Dialogic Corporation, Application Note, pp. 1–6 "Use of Dialogic T–1 In Telephone Company Networks", Dialogic Corporation, Application Note, pp. 1–10 "Use of Dialogic T–1 Equipment in CPE Gateways", Dialogic Corporation, Application Note, pp. 1–4 "Integrating Analog Devices into Dialogic–Based T–1 Voice Processing Systems", Dialogic Corporation, Application Note, pp. 1–16 "Use of Dialogic Components in Automatic Number Identification (ANI) Systems", Dialogic Corporation, Application Note, pp. 1–16 "Dialogic Unit Pricing", pp. 1–6.
"Voice '92 Spring Conference & Exposition", 1992, pp. 1–24—(Brochure).
"Telecom Developers '92", Jan. 1992—(Advertisement).
Newton, Henry, "The Sheer Thrill Of It All", *Teleconnect,* May 1991.
"AFIPS Conference Proceedings", 1987 National Computer Conference, Jun. 15–18, 1987, Chicago, Illinois "Dynamic Network Allocation".
"Calling your computer is as easy as calling your broker, says AT&T", *Record,* Nov. 1985.
Singleton, L.A., "Telecommunications in the Information Age", Chapter 12, pp. 115–125—(Chapter from a Book).
Weitzen, H.S., "Telephone Magic", pp. 28–31, 38–39, 54–55, 62–67, 70–79, 82–85, 88–91, 106–115, 118–121, 126–127, 134–137, 176–177, Index—(Chapters from a Book).
Weitzen, H.S., et al., "Infopreneurs", pp. 18–19, 138–145, 206–209, Index—(Chapters from a Book).
Sullivan, Kathleen, "Paper firm relies on voice–based inventory system", IDG Communications, Inc., Sep. 10, 1984—(Script).
"VTK Training Section" and "Disk Initialization Procedures for VTK–30/60", Voicetek Corporation—(Manual).
"VoiceStor Systems Integration Guide", Voicetek Corporation, May 2, 1983—(Manual).
"VTK 60 Voice Computer—Technical Description", Voicetek Corporation, Oct. 1986—(Manual).
"Voicetek VS–50 Telephone Interface System", Apr. 25, 1984, System Integration Guide—(Manual).
"VTK Voice System—Programmers Guide", Voicetek—(Manual).
"Disk Initialization Procedures for VTK–30/60", Voicetek Corporation—(Manual).
"VTK81 Voice Computer—Technical Description", Voicetek Corporation, Oct. 1986—(Manual).

"VTK Voice System—VTK/CE Guide", Voicetek, Jul. 6, 1987—(Manual).

Newton, Harry, "Newton's Telecom dictionary", Telecom Library Inc., 1991—(Advertisement).

"1987 Buyers Guide", Teleconnect, Jul. 1987, pp. 194, 197–210—(Brochure).

Syntellect Inc.—Advertisements.

Various copies of Business cards.

Guncheon, M.C., "The Incredible Dial–A–Message Directory", *Contemporary Books, Inc.*, 1985—(Directory).

"Voice Box Maintenance Manual", Periphonics, 1986—(Manual).

"Voicepac Maintenance Manual", Periphonics, 1984—(Manual).

Dyer, Ellen, "Wichita Firm Sells 25% Share", Dec. 14, 1987, and "Spectrum Carving Role In Volatile Businesses", Jul. 7, 1986, Search Results.

"Don't Miss The Unique Gift Idea Of The Year", Yam Educational Software, 1987—(Advertisement).

"Welcome to the future of advertising.", Teleline, Inc., 1990—(Presentation).

"Greeting Card Project", Teleline, Inc., Nov. 7, 1988—(Flow Chart).

Sharkey, Betsy, "Dialing for Dollars and Data", *Adweek*, Nov. 16, 1987, pp. 6–8—(Article).

Gay, Verne, "CBS may tie rates to buying p?", 1988—(Article).

Flanagan, J.L., et al., "Synthetic Voices For Computers", *IEEE International Conference on Communications*, 1970, pp. 45–9–45–10—(Conference Record).

Rabiner, L.R., et al., "Computer Voice Response Using Low Bit Rate Synthetic Speech", *Digest IEEE 71 International Convention*, Mar. 22–25, 1971, p. 1–2, Fig. 1–2—(Paper).

"DT1000 Digitalker Speech Synthesis Evaluation Board", National Semiconductor Corp., Oct. 1980—(Manual).

"Data Set 407C Interface Specifications Nov. 1977", *Bell System Technical Reference*, Nov. 1977, pp. 1–50—(Paper).

Broomfield, R.A., et al., "Making a data terminal out of the Touch–Tone telephone", *Electronics*, Jul. 3, 1990, pp. 124–129—(Paper).

Godfrey, D., et al., "The Telidon Book—Designing and Using Videotex Systems", pp. 1–103—(Book).

"Industry Marketing Bulletin", Honeywell EDP Wellesley Hills, Aug. 9, 1967.

"Honeywell Communications Configuration Charts And Aids In Designing", *Data Communications*, pp. 3–1–3–7 and A.

"Burroughs Audio Response System", Reference Information for Sales Representatives, pp. 1–6 "New Product Announcement", Burroughs Corporation, Feb. 5, 1968.

"Stand–Alone Lockbox Application Voice Response (Slave) Communication System Functional Specification", Cognitronics Corporation, Feb. 19, 1982, p. 21 "Unlock lockbox reporting. with Cognitronics Voice Response Communications System/Banking.", Speech–maker a division of Cognitronics Corporation "Voice Response for Banking", Cognitronics Corporation (Brochure) "voice response application brief", Speech–maker—(Brochure) "Instant credit authorization is an easy touch when any telephone is a voice response computer terminal", Speech–maker a division of Cognitronics Corporation—(Article).

Slutsker, Gary, "Relationship marketing", *Forbes*, Apr. 3, 1989—(Article).

Finnigan, P.F., "To Our Shareholders", Jun. 1985, Apr. 7, 1986, Apr. 10, 1987—(Letters) "International Programs" (Voicemail).

Finnigan, P.F., "Our guest", *Radio–Schweiz AG Telekommunikation und Flugsicherung*, Jan. 1983, pp. 12–14—(Bulletin).

Finnigan, P.F., "Voice mail", *1983 National Computer Conference*, May 16–19, 1983, Anaheim, CA, pp. 375–377 and Abstract.

"Conversations in Your Mailbox", *Software News*, Jan. 1985—(Article).

Fredric, Paul, "Voicemail Int'l, Radio Page America To Offer a 'Pocket News Network'", *Communications Week*, Jul. 8, 1985—(Article).

"Voice Messaging System: Use It While You're In, Not Out", *Information Week*—(Article).

"Corporate Performance—Companies To Watch", *Fortune*, Sep. 30, 1985—(Article).

"Dream Weaver", Jon Lindy, Aug. 1986, pp. 32–35, 37—(Article).

"Turn any telephone into a complete electronic message service", Voicemail—(Brochure).

Pages from Company Brochure, Televoice International, Inc.

"VMI Big Talker", Voicemail International, Inc.—(Newsletter).

"Newsline", Voicemail International, Inc., Oct. 1984 and Nov. 1984, "Voiceletter No. 1", Voicemail International, Inc., Dec. 1985.

"A New, More Productive Way to Use the Telephone", Voicemail International, Inc.—(Brochure). "While You Were Out . . . "—(Brochure) "?For People Who Can't Afford To Miss Messages", Voicemail International, Inc.—(Brochure) "Voicemail The electronic news service saves time, money and nerves", Radio–Suisse Ltd., (Voicemail Agent for Europe)—(Brochure) "Are You Being Robbed of Your Time . . . ?", Voicemail International, Inc.—(Brochure).

"Voicemail Instruction Manual B—85", Televoice International, Nov. 1980—(Manual) "Local Telephone Numbers" (for Voicemail) and "Televoice Is As Easy As 1, 2, 3!", Televoice International—(Manual) "Voicemail Instruction Manual C—25", Televoice International, Jun. 1981—(Manual) "Telephone Numbers" (for Voicemail) and "How To Use Voicemail", Televoice International—(Manual) "Message Receiving/Sending" (and others), Voicemail International, Inc.—(Manual) "You Can Use Voicemail To Send And Receive Messages At Anytime Anywhere In The World", Voicemail International, Inc., 1981—(Brochure) "Advanced User Guide", Voicemail International, Inc.—(Manual) "Voicemail's Basic User's Guide", Voicemail International, Inc.—(Manual).

"Welcome To Dowphone", Dowphone, Jan. 1986—(Manual).

"Telephone 1–800 Check–PDR", Officers of Medical Economics Company, Inc., 1986—(Circulation/Brochure).

"Turn your telephone into an efficient electronic "mailbox"", Western Union, Jan. 1984—(Brochure) "Western Union Voice Message Service User's Guide", Western Union, Jul. 1984—(Brochure).

"PSA's 24 hour reservation system", PSA, Sep. 1986—(Brochure).

"To Better Serve Your Business, We're On Call Days, Nights and Weekends.", Maryland Business Assistance Center—(Brochure).

"Voice Response: Breaks Trough Call Blockage.", *Business Week,* Aug. 26, 1985—(Advertisement for Preception Technology Corporation).
"Tools for heavy hitters", *Forbes,* May 6, 1985.
"The Fidelity Automated Service Telephone", Fidelity Group—(Manual/Brochure).
"Stockquote Hotline", Norwest Brokerage Services—(Brochure) "All You Need To Get The Stock Quotes And News You Want." Dowphone, 1984—(Advertisement).
"The Most Respected Name In Telemarketing", West Interactive Corporation—(2 Brochures).
Bell Labs News, vol. 21, No. 40, Oct. 5, 1981 (A21710762).
Bell Labs News, vol. 25, No. 36, Sep. 30, 1985 (A21724662).
Bell Labs News, vol. 26, No. 31, Aug. 18, 1986 (A21706398).
Bell Labs News, vol. 27, No. 33, Aug. 17, 1989 (A21710741).
Bell of Pennsylvania Press Release, Mar. 13, 1984 (A21725876).
Dorros, Irwin et al., "Reaching into the Future with Stored Program Control," Bell Laboratories Record, Dec. 1980, pp. 387–393 (A21710507).
Voice News, vol. 4, No. 9, Oct. 1984 (A21708913).
Voice News, vol. 6, No. 7, Jul./Aug. 1986 (A21706303).
Voice News, vol. 7, No. 2, Feb. 1987 (A21707730).
Voice News, vol. 7, No. 3, Mar. 1987 (A21707834).
Voice News, vol. 7, No. 5, May 1987 (A21714110).
Voice News, vol. 7, No. 10, Oct. 1987 (A21724749).
"Network Communications Applications and Services," AT&T Communications Consultant Liaison Program, Issue 1, Jun. 1984.
Dial Info Articles (various articles with various dates) (R0016101–R0016188).
Svigals, J., "Security Method For Remote Telephone Banking," IBM Technical Disclosure Bulletin, vol. 23, No. 12, May 1981, pp. 5306–5307 (pb424).
AT&T Conversant Voice Response Systems Historical Overview, Jan. 1988 (FD 023585–FD023596).
"All About Automated Attendant Systems," Datapro Research Corporation, Mar. 1987 (SM 1000682–SM 1000691).
"New Product—Dytel's Automated Switchboard Attendant," reprinted from Business Communications Review, Mar.–Apr. 1984, pp. 39–41 (SM10006976–SM1000699).
Arbogast, James G. et al., "Home Diabetes Monitoring Through Touch–Tone Computer Data Entry and Voice Synthesizer Response," Annual Symposium on Computer Applications in Medical Care 8th Care Proceedings—Eighth Annual Symposium on Computer Applications in Medical Care, 1984 (MMI 020731).
Perdue, Robert J., et al., "AT&T Voice Processing System Architectures," AT&T Technical Journal, Sep./Oct. 1990, pp. 52–60 (MMI 024142–MMI 024151).
Sable, E.G., et al., "AT&T Network Services Architecture Capabilities, Administration and Performance," AT&T Technical Papers, International Switching Symposium—ISS '87, AT&T Network Systems, Mar. 15, 1987.
"The Stored Program Controlled Network" The Bell System Technical Journal, Sep. 1982.
The World's Telephones, a Statistical Compilation as of Jan. 1980, AT&T Long Lines, 1981 (Book).
Engineering and Operations in the Bell System, AT&T Bell Laboratories, 1983 (Book).

Joel, A.E., "A History of Engineering and Science in the Bell System, Switching Technology (1925–1975)," Bell Telephone Laboratories, 1982 (Book).
"ISDN—Proceedings of the conference held in San Francisco, Nov. 1986," OnLine, New York: London.
Raack, G.A., et al., "Customer Control of Network Services," IEEE Communications Magazine, Oct. 1984 (A21717089) also ISS 84, Florence, Italy, May 1984.
Soderberg, J.H., "Machines at your Fingertips," Bell Laboratories Record, Jul. 1969 (A2177175).
Gawrys, G.W. et al., "A New Protocol for Call Handling Functions for the SPC Network," Globecrom '82 Conference Record, Nov./Dec. 1982.
Buss, C.M., "Tuning the Human/Machine Interface for AT&T Advanced–800 Service," IEEE, Jul. 1985.
Asmuth, R.L., et al., "Transaction Capabilities for Network Services," Globecom '85 IEEE Global Telecommunications Conference, New Orleans, Dec. 1985.
Mahood, Gerald K., "Human Factors in Touch–Tone Data Systems," Bell Laboratories Record, Dec. 1971 (A21717170).
"4 ESS System Evolution," Bell System Technical Journal, Aug. 1981.
Inquiry Letter To The F.C.C., From Attorneys For the Prior Title Holder Seeking Rulings That A Particular Game wold Not Be Considered a Lottery Under F.C.C. Reply Letter From The F.C.C. To The Inquiry Letter Stating The Requested Rulings.
Reply Letter From The F.C.C. To The Inquiry Letter Stating The Requested Rulings.
A page (p. 7) from literature on the Charles Schwab corporation, which is not dated nor identified.
A page (p. 4) from an annual report dated Mar. 1, 1989, though the actual date on which the report was distributed to the public is unknown.
An early brochure based on a Mar., 1989, survey by Charles Schwab & Co., Inc.
A trademark scan (U.S. Federal) indicating a first date of use for Telebroker in Jun. 18, 1988.
Bulfer, Andrew F., "AT&T's Pay–Per–View Television Trial", published in AT&T Technical Journal, May/Jun. 1987.
Friedes, A., et al., "ISDN opportunities for large business— 800 service customers," IEEE International Conference on Communications '86, Jun. 22–25, 19086, vol. 1, pp. 28–32.
Allyn, Mark R. et al., "Planning for people: Human factors in the design of a new service," Bell Laboratories Record, May 1980, pp. 155–161.
Hanson, Bruce L., et al., "No. 1A VSS New custom calling services," Bell Laboratories Record, Jun. 1980, pp. 174–180.
Aarons, D., "The Voice of the 80's," PC Magazine, vol. 4, No. 5, Mar. 5, 1985, p. 114 (A21707135).
"ACD 'Magic' from AT&T's Merlin," Telecommunications Product Review, vol. 13, No. 4, Apr. 1986 (A21708371).
"Actor Promotes Phone Services," Hammond Louisiana Star, Aug. 23, 1984 (A21708860).
Allerbeck, M., "Experience with the Voice Mail System EMS 2000 Info—Results of an Acceptance Study," ISS '84 Florence, May 1984, Session 14 A, Paper 6, p. 1.
Allyn, Mark R., et al., "Human Factors in the Design of a New Service," Bell Laboratories Record, vol. 58, No. 8, May 1980 (A21709530).

Amano, Fumio, et al., "Imagephone!!: Integrated Voice/Data Terminal With Hand–Drawing Man—Machine Interface," IEEE, 1985 (A03701430).

Ambrosio, Johanna, "Electronic and Voice Mail; They're No Match for Each Other—Yet," Computerworld, May 19, 1986, p. 53 (A21708461).

"American–Network: Files Complaint Against Pacific Northwest Bell," Business Wire, Jun. 4, 1986 (A21708495).

"American–Network: Signs Letter of Intent to Merge L D Communications Long Distance Service into the Company," Business Wire, Aug. 14, 1984 (A21708856).

Andrews, Edmund L., "Patents: Computer System Lets TV Audience Join Show," The New York Times, Dec. 24, 1988 (A01331146).

Arnst, Catherine, Untitled Article, Reuters, Sep. 16, 1984 (A21708908).

"AT&T Announces Major Additions to Telemarketing Products and Services," Telephone News, Dec. 14, 1987 (A21723927).

"AT&T; AT&T Announces New Software Enhancements," Business Wire, Feb. 10, 1987 (A21707782).

"AT&T Announces New Software Enhancements for its PBX," PR Newswire, Feb. 10, 1987 (A21707779).

"AT&T Computer System Will Be Produced here," The Columbus Dispatch, Sep. 9, 1985 (A01354694).

"AT&T CPU Puts Voice Recog on Any Phone," Article Source Unknown (A01354681).

"AT&T Conversant Voice Response System," Information Packet, Date Unknown.

"AT&T's Digital Merlin," Telecommunications Product Review, vol. 13, No. 7, Jul. 1987 (A21724743).

"AT&Ts Flagship System 75: A Comprehensive Analysis of the System 85's 'Little Cousin,'" Telecommunications Product Review, vol. 11, No. 7, Jul. 1984 (A21724612).

"AT&T Forms Unit to Sell Synthetic Speech Systems," Wall Street Journal, Sep. 10, 1985 (A01354689).

"AT&T Plans Computer Unit," The New York Times, Sep. 10, 1985 (A01354690).

"AT&T; Showtime's Viewer's Choice, Viacom Cable and AT&T to Test Pay–Per–View Ordering System," Business Wire, Dec. 5, 1985 (A21708103).

"AT&T Sports Service," PR Newswire, Sep. 24, 1980 (A21710432).

"The AT&T System 25," Telecommunications Product Review, vol. 13, No. 8, Aug. 1986 (A21706368).

Press Release, PR Newswire, Nov. 1, 1984 (A21708963).

AT&T Technical Journal—The 5ESS Switching System, vol. 64, No. 6, Part 2, Jul.–Aug. 1985 (A21723626).

Excerpt from AT&T Technical Journal, Sep.–Oct. 1990, pp. 53–60 (A21723942).

"Automated Switchboard Attendant Helps Insurance Company Control Net Expenses," Communications News, Jul. 1985 (A21726011).

Aversano, Nina, "The Telephone as Computer," Review of Business, Fall 1989, p. 5 (A21723928).

Ayres, Paul, "Voice Response Pay–By–Phone Matures," Computerworld, Nov. 9, 1979, p. 47 (A21725960).

Baker, Janet M., "Voice–Store–And–Forward: The Voice Message Medium," Speech Technology, Aug.–Sep. 1984 (A21724633).

Bakke, Bruce B., "Electronic Voice Mailbox: Potential for Fast Growth," BC Cycle, Jun. 29, 1984 (A21708785).

Bakke, Bruce B., "GTE's 'Voice Mailboxes' Page the World," U.P.I., Apr. 11, 1983 (A21713359).

Barbetta, Frank, "AT&T Offers Digital PBX Enhancements," Electronic News, vol. 30,, Nov. 5, 1984, p. 69 (A21708967).

Barbetta, Frank, "Custom Functions Offered in New AT&T Co. Package," Article Source Unknown (A21726008).

Barkauskas, B. J., et al., "Network Services Complex: A Generalized Customer Interface to the Telephone Network," IEEE International Conference on Communications, Conference Record, vol. 2, Jun. 1983, p. 805 (A21725715).

Barlin, David, "Switch–Hitter: A Data Man's Guide to the World of Voice," Data Communications, Oct. 1984, p. 114 (A21708926).

Basso, Richard J., et al., "Expanding the Capabilities of the ? Traffic Service Position System," Bell Laboratories Record, Feb. 1983, pp. 22–27 (A21724556).

Belcher, Jerry, "Earthquakes in Mexico; U. S. Relief Includes Hardware, Experts; Cash Aid Suggested," Los Angeles Times, Sep. 22, 1985 (A21708026).

"Bell Files Tariffs on CO–Based Switching System in PA.," Communications, Date Unknown (A21725944).

Bell Laboratories Record, Aug. 1984, Cover Page and Table of Contents (A21708811).

The Bell System Technical Journal, May–Jun. 1982 (A21709814).

Excerpt from The Bell System Technical Journal; Oct. 1980, pp. 1384–1395.

Bertoglio, O., et al., "An Interactive Procedure for Voice Messaging Services in a Traditional Network," CSELT Technical Reports, vol. 12, Supplement 10, No. 3, Jun. 1984 (A21708755).

Bingham, Sanford, "Groceries By Phone," Inbound/Outbound, Aug. 1988 (A21725728).

"Some Tips on Integration," Inbound/Outbound, Aug. 1988 (A21725731).

Black, Philip, "How ISDN Services Could Make or Break the Big Network," Data Communications, Jun. 1984, p. 247 (A21708771).

"'Blast' from Data Systems Runs Under DG's AOS/VS," Computerworld, May 3, 1982, p. 38 (A21724423).

Booker, Ellis, "How to Save Big Bucks on Phone Calls," Computer Decisions, vol. 16, Nov. 15, 1984, p. 16 (A21708983).

Borchering, J. W., et al., "Customized Switching Systems," ISS '84 Florence, May 1984, Session 14 A, Paper 4, pp. 1–5 (A21725533).

Bowling, Tom, "Pay TV: A Pay–Per–Minute System Prototype," Television: Journal of the Royal Television Society, Mar.–Apr. 1984, pp. 79–83 (A21724588).

Brady, Erik, "Players, Fans Get Back in the Swing," USA Today, Date Unknown (A21706710).

Brady, Erik, "Resentful Fans Verbally Strike Back," USA Today, Date Unknown (A21706709).

Brooke, Jill, "A Hi–Tech Interactive TV Service is Planned," New York Post, Jan. 20, 1989 (A01331148).

Brown, Jim, "Contracts; Rolm Wins College Bid," Network World, Mar. 9, 1987, p. 4 (A21707859).

Brown, Jim, et al., "ICA Preview; AT&T May Steal Show," Network World, May 26, 1986, p. 1 (A21708473).

Brown, Jim, "PBX Market; Rolm Beefs up CBX Line Capacity," Network World, Feb. 9, 1987, p. 4 (A21707777).

Brown, Jim, "VMX 5000 Series; Voice Messager Debuts," Network World, Oct. 13, 1986, p. 6 (A21706653).

Brown, Jim, "Voice Mail; Rolm to Accounce New Low–Cost Phonemail," Network World, Feb. 2, 1987 (A21707763).

Buckhout, Wayne, "Columbus–Born AT&T Computer Listens, Talks and Shows Promise," Article Source Unknown, Sep. 10, 1985 (A01354692).

Bulfer, Andrew F., et al., "A Trial of a National Pay–Per–View Ordering and Billing System," NCTA, 1986 (A21724669).

Burstyn, H. Paris, "Phone Features: The Next Wave," High Technology, Jun. 1986 (A21726009).

Capital Cities/ABC Video Enterprises, Inc. Teams with FDR Interactive Technologies to Explore Applications for New Telephone Technology, Capital Cities/ABC, Inc. Broadcast Group, Jan. 19, 1989 (A01331147).

Carlson, Rolf, et al., "Text–To–Speech conversion in Telecommunications," Proceedings of the Tenth International Symposium on Human Factors in Telecommunications, Jun. 1983, pp. 239–245 (A21725801).

Press Release, PR Newswire, Dec. 5, 1985 (A21708106).

Chapin, Dwight, "A Kids' Game," Article Source Unknown (A21706674).

Charlish, Geoffrey, "Telephone Message that Failed to Get Across to the U. K.," Financial Times, Jan. 16, 1986 (A21708203).

Collins, Francis R., "Reality of Equal Access: Implementation Problems," Telephone Engineer & Management, vol. 88, Sep. 1, 1984, p. 128 (A21708884).

"Company News: Phone Service to be Tested," The New York Times, Jan. 20, 1989 (A01331395).

"Components," Electronic News, 1984 (A21726007).

"Computerized Telecommunications Switching Systems," Article Source Unknown.

Connolly, James, "Republican Convention Set to Test Telecommunications," Computerworld, Jul. 9, 1984, p. 17 (A21708804).

Conroy, Cathryn, "Audiotex Arrives," Monitor, Date Unknown (W71189).

"Corporate Preoccupation with Costs Spurs Telephone Management Sales," Computerworld Focus, May 14, 1986, p. 13 (A21708457).

Cox, John D., "Talk Into Telephone, Command a Computer," The Sacramento Bee, Sep. 10, 2985 (A01354683).

"CPU, PBX Vendors Drawing Alliances," Computerworld, Apr. 23, 1984, p. 15 (A21708674).

Crawford, K. E., et al., "4A Toll Crossbar Application," The Bell System Technical Journal, vol. 57, No. 2, Feb. 1978, pp. 283–323 (A21716223).

Croxall, L. M., et al., "Operational Experience with the 5ESS™ Switch," ISS Florence, Session 42 A, Paper 4, May 1984 (A21725550).

Cummings, Steve, "Voice–Mail Systems Attract Tentative Interest," PC Week, vol. 3, No. 49, Dec. 9, 1986, p. 140 (A21707565).

Curtis, Janice, "At a Turning Point, VMX Makes Moves to Boost Voice Messaging Business," Dallas Business Courier, vol. 2, No. 13, Section 1, Jul. 14, 1986, p. 19 (A21706328).

Daniel, Heidi C., "Inventor Battles Computer Giants," South Florida Business Journal, Aug. 12, 1985 (A21707969).

Press Release, Communications Daily, vol. 4, No. 177, Sep. 11, 1984, p. 7 (A21708903).

Danner, Patrick, "Dial Info Charges Electronics Disconnected Deal," San Francisco Business Times, vol. 2, No. 33, Apr. 18, 1988 (A21724767).

Excerpt from Data Communications, Sep. 1985, pp. 399–410 (A21707991).

Davis, Judith R., "Voice Messaging Systems," Patricia Seybold's Office Computing Report, vol. 10, No. 9, p. 1–28 (A21716964).

Day, J. F., et al., "Networking Voice and Data with a Digital PBX," AT&T Technology, Date Unknown (A21707584).

Whitten, W. B., II, "Advanced Interfaces Speed Delivery of Services," AT&T Technology, Date Unknown (A21707593).

"Definity Announcement Includes Other New Products," Telecommunications Product Review, vol. 16, No. 3, Mar. 1989 (A21712758).

DeLessio, N. X., et al., "An Integrated Operator Services Capability for the 5ESS System," ISS '84 Florence, May 1984, Session 22 C, Paper 3, p. 1–5 (A21725538).

Desmond, Paul, "Patented Call–Routing Tool Boon for Retail Industry; Instalink Will Use ISDN for Automatic Number ID," Network World, Aug. 1, 1988 (A21712653).

"Dial–A–Drill," The New York Times, Jan. 20, 1969 (A21725951).

"Dialing for Pennies," California Living Magazine, Aug. 12, 1984 (A21708855).

"Distributed Data Processing and Messaging Systems," Data Communications, May 1986, p. 105 (A21708428).

Dix, John, "AT&T Breathes New Life into its Switch–and–Wire Beast," Network World, Oct. 27, 1986, p. 1 (A21706662).

Dix, John, "AT&T Tries Different Tack," Computerworld, Nov. 25, 1985, p. 19 (A21708097).

Dix, John, "AT&T Unleashes 'Gazelle,'" Computerworld, Apr. 30, 1984, p. 2 (A21708710).

Dix, John, "Enhancements Out for AT&T's High–End PBX," Computerworld, Nov. 12, 1984, p. 99 (A21708970).

Brown, Jim, "VMX 5000 Series: Voice Messager Debuts," Network World, Oct. 13, 1986, p. 6 (A21706653).

Dix, John, "Ford Motor Co.; Driving Down Costs with Voice Mailboxes," Network World, Jul. 14, 1986, p. 32 (A21706326).

Dix, John, "'Hello, This is a Voice Mail Recording.,'" Network World, Jul. 14, 1986, p. 1 (A21706331).

Dix, John, "Rolm; Long–Awaited Redwood to Debut at ICA Today," Network World, Jun. 2, 1986, p. 4 (A21708493).

Dix, John, "Switch Management: DEC Tools Debut at ICA," Network World, Jun. 9, 1986, p. 8 (A21708497).

Dix, John, "Unified Messaging; AT&T Reveals New Message Blueprint," Network World, Sep. 22, 1986, p. 1 (A21706473).

Dix, John, "Voice/Data PBXs: More than Today's Users Need?," Computerworld, Apr. 23, 1984, p. 13 (A21708669).

"Dollars from Dialing," Fortune, Mar. 16, 1987, p. 10 (A21707648).

Dorros, Irwin, "Evolving Capabilities of the Public Switched Telecommunications Network," Business Communications Review, Jan.–Feb. 1981 (A21725652).

Dowd, Ann Reilly, et al., "Dollars from Dialing," Fortune, Mar. 16, 1987, p. 10 (A21707869).

Drinkwater, Larry, "Voice Processing: An Emerging Computer ? Technology," Speech Technology, Aug.–Sep. 1984, pp. 50–54 (A21708826) (illegible).

Edwards, M., "Digital PBXs Zero in on the Key Role as Hub of Office," Communications News, vol. 21, No. 12, Dec. 1984, p. 44 (A21708992).

Egly, Diana G., et al., "Mnemonic Aids for Telephone–Based Interfaces," Proceedings of the Eleventh International Symposium on Human Factors in Telecommunications, Sep. 1985 (A21725818).

Eichenwald, Kurt, "Just a Phone Call Away: More Dial–It Services," The New York Times, Apr. 16, 1988 (A21725852).

Excerpt from Electrical Communication Facilities (in Japanese), vol. 33, No. 9, 1981 (A21724248).

"Electronic Switching: Digital Central Office Systems of the World," Edited by Amos E. Joel, Jr., IEEE Press, 1982 (A21716673).

"Electronic Voice Mail Revolutionizing Communications," Tulsa Business Chronicle, vol. 5, No. 26, Jun. 30, 1986 (A21708510).

Press Release, PR Newswire, Mar. 20, 1984 (A21708647).

Elliot, Thomas R., "A Voice in the Wilderness," Computerworld, Jun. 13, 1984, p. 76 (A21708779).

Emerson, Jim, "Catalog Business," DM News, Dec. 15, 1985 (A21708115).

Emerson, Jim, "Eliminating Live Operators," DM News, Dec. 15, 1985 (A21708114).

Engelbardt, Robert M., "Island Paradise Gets System Update," Telephone Engineer & Management, vol. 88, Sep. 15, 1984, p. 104 (A21708904).

Evans, S. A., et al., "Talking and Listening to the Conversant 1 Voice System," AT&T Technology, Date Unknown (A21710392).

Exacom Model ASM–200 Answering Service Monitor System, General Description Installation and Operation Manual, Issue 1, Dec. 19, 1987 (W11483).

Fantel, Hans, "Video: Movies Hot Off the Tube," The New York Times, Mar. 29, 1987 (A21707890).

"The Father of Voice Messaging," Network World, Nov. 1984, p. 57 (A21708942).

Feldman, Robert, "New AT&T Packages Designed to Spruce up Systems 75/85," MIS Week, Jun. 2, 1986, p. 30 (A21725895).

Fine, Happy, "Tavern on the Bluegrass," Eastern Basketball, Date Unknown (A21706749).

"Firm Created After Patent Suit Against First Data," Reuters, Oct. 17, 1984 (A01331388).

Fischell, David R., et al., "Interactive Voice Technology Applications," AT&T Technical Journal, Sep.–Oct. 1990 (A34100164).

Foster, Robin Harris, "In the Forefront with Integrated Call Centers," AT&T Technology, vol. 7, No. 4, 1992 (A21712913).

Froelich, F. E., et al., "The Switched Network Transaction Telephone System," The Bell System Technical Journal, vol. 57, No. 10, Dec. 1978, pp. 3475–3485 (A21725995).

Froelich, Leopold, "Are Smart Buildings a Dumb Idea? If They're Going to Prosper, Shared Service Providers Will Have to Move from Telephony into Office Automation," Datamation, vol. 31, Oct. 1, 1985, p. 101 (A21708046).

Gates, G. W., et al., "Software," The Bell System Technical Journal, vol. 61, No. 5, May–Jun. 1982, pp. 863–883 (A21725913).

Gawron, L. J., et al., "Scanned–Image Technologies Bring New Ways to Conduct Business," AT&T Technology, vol. 6, No. 4, 1991 (A21713611).

Gawronski, Jane Donnelly, et al., "Audio Response System to Practice Mental Computation Skills," Proceedings of the Digital Equipment Computer Users Society, vol. 1, No. 2, Fall 1974, pp. 633–636 (A21725979).

Gawrys, G. W., "ISDN: Integrated Network/Premises Solutions for Customer Needs," IEEE, 1986, pp. 1.1.1–1.1.5 (A21725555).

Gaylord, D. M., "Better Health for Hospitals with Dimension 2000 PBX," Bell Laboratories Record, Jul.–Aug. 1981, pp. 170–173 (A21724371).

Gerald, Jeannette A., "A Voice Response System for General Aviation Pilots," Article Source Unknown (A21708877).

Gibson, Stanley, "Audix Upgrades Include Messaging, Billing, Management," Computerworld, Dec. 15, 1986, p. 29 (A21707568).

Gibson, Stanley, "Octel Links Voice Mail System to Rolm PBX," Computerworld, Dec. 8, 1986, p. 42 (A21707564).

Gillon, A. C., et al., "Voice Power Gives You Voice Messaging—And Then Some," AT&T Technology, vol. 4, No. 2, 1989 (A21712712) repeated (A21724818).

Gitten, L. J., et al., "5ESS System Evolution," ISS Florence, Session 41 A, Paper 1, May 1984 (A21725543).

Goecke, D., et al., "A Software Engineering Approach Applied to the Complete Design and Production Process of Large Communication Systems Software," ISS '84 Florence, Session 13 C, Paper 1, May 1984.

Goldstein, Mark L., "Send A Message. Now! New Digital Networks Can Give Companies a Competitive Edge," Industry Week, Jul. 21, 1986, p. 43 (A21706347).

"Gotcha!," Edited by John A. Conway, Forbes, Mar. 10, 1986, p. 9 (A21708345).

Gottlieb, Dan, "Does the Bell Toll for Voice/Data Independents?," Purchasing, Dec. 13, 1984, pp. 103–108 (A21724641).

Grau, Jeff, "IBM Hints at Entering Voice Response Market in 1992," Article Source Unknown, Dec. 11, 1990 (A01346366).

Greene, James E., et al., "Voice Response System Sticks to the Script and Saves Time, Money and Tempers for University Students and Administrators," Communication Age, Jan. 1986 (A21724080).

Grumhaus, Audrey, "What's New in Telephone Service: Some Bad News for Nuisance Callers," The New York Times, Nov. 16, 1986 (A21725855) repeated (A21725857).

Grunbaum, Rami, "Genesis Electronics Heeds the Voice Mail Calling," The Business Journal, Supplement to vol. 2, No. 49, Mar. 10, 1986 (A21708341).

Gunderson, Gary W., "Computer Consoles; Can Your Community Save Lives when Seconds Count?," Business Wire, Feb. 4, 1987 (A21707772).

Hafner, Katherine, "Hello Voice Mail, Goodbye Message Slips," Business Week, Jun. 16, 1986 (A21708507).

Hafner, Katherine, "System 85 Targets Leading–Edge Users: NBI," Computerworld, Sep. 5, 1983, p. 53 (A21724580).

Hafner, Katherine, "Temporary Telephones," Network World, May 2, 1984 (A21708739).

Hafner, Katherine, "The Venture Capital Adventure," Network World, Aug. 1, 1984 (A21708837).

Hamel, Bob, "Voice Messaging; VMX Gives Firm Edge," Network World, Mar. 16, 1987 (A21707864).

Hanson, Robert J., "The DSC–200 VoiceServer System," Speech Technology, Aug.–Sep. 1984, pp. 55–65 (A21708818).

Herits, E., et al., "A New Look for the White Pages," Bell Laboratories Record, Jun. 1980 (A21709547).

Hardy, James O., et al., "Handling Coin Toll Calls—Automatically," Bell Laboratories Record, Sep. 1980, pp. 256–262 (A21710422).

Harrar, George, "Interview: Ed Landry; Making Office Connections at John Hancock," Computerworld, Apr. 14, 1986, p. 63 (A21708404).

Hausui, Kouya, et al., "Man—Machine Interfaces in Office Communication Systems," IEEE Communications Magazine, vol. 24, No. 7, Jul. 1986, pp. 18–23 (A03701435).

Coover, Edwin, R., "Voice–Data Integration in the Office: A PBX Approach," IEEE Communications Magazine, vol. 24, No. 7, Jul. 1986, pp. 24–29 (A03701442).

Haszto, E. D., et al., "Alliance Teleconferencing Services Boost Business Efficiency," AT&T Technology, vol. 3, No. 1, 1988 (A21724796).

Heberle, W., "Accumulation of the Signals when Using the Pushbutton Telephone for Data Entry," Proceedings of the 5$^{th}$ International Symposium on Human Factors in Telecommunications, Sep. 1970 (A21725766).

Heffron, W. G., et al., "Transaction Network Service," The Bell System Technical Journal, vol. 57, No. 10, Dec. 1978, pp. 3331–3347 (A21725986).

Henricks, Mark, "DSC Makes Japanese Connection," Dallas–Fort Worth Business Journal, vol. 9, No. 30, Mar. 17, 1986 (A21708347).

Hillhouse, Joseph, "PABX, the Hub: Keeping Communications on Track," Computer Decisions, vol. 16, Nov. 15, 1984, p. 84 (A21708974).

Hindlin, Eric, "PBXs Becoming Practical Alternative to LANs," PC Week, vol. 4, Mar. 17, 1987, p. C16 (A21707870).

Hird, E. V., "Party Line Cost Cutters," Telephone Engineer & Management, vol. 90, May 1, 1986, p. 51 (A21708442).

Hollitz, John, "Giving Information without Human Intervention," The Business Journal—Sacramento, vol. 3, No. 26, Section 1, Sep. 29, 1986, p. 25 (A21706505).

"Home Shopping Network Halts Talks," The Washington Post, Feb. 19, 1987 (A21707804).

"The Horizon Call Management System Tackles High Call Volume Demands," Telecommunications Product Review, Jan. 1983 (A21724553).

Horton, L. A., et al., "AT& T Systems Link the University of Maryland," AT&T Technology, vol. 7, No. 2, 1992 (A21712897) repeated (A21725512).

Horwitt, Elisabeth, "AT&T Enhancements Fill Gaps in System 75 Digital PBX," Computerworld, Jun. 16, 1986 (A21708505).

Horwitt, Elisabeth, "Rolm to Unveil Low–End PBX: Digital System Bucks Feature–Rich Trend," Computerworld, Jun. 2, 1986, p. 8 (A21708489).

Howitt, Doran, "Boom For Voice Mail Systems," InfoWorld, Oct. 19, 1984, pp. 37–38 (A21708940).

Hubbard, Thomas Leo, "Richardson: High–Tech Prosperity," Dallas Magazine, vol. 66, No. 2, Feb. 1987 (A21707741).

Huber, K. M., et al., "Getting the Message with UMS," AT&T Technology, vol. 1, No. 1, 1986 (A21708123).

Swann, L., "Universal Operations Systems—Integrated Building Blocks," AT&T Technology, vol. 1, No. 1, 1986 (A21708141).

Hunter, John J., "Telephone Tag Alternative: Voice Messaging Unshackles Users from Traditional Telephone Limitations," Network World, Jul. 13, 1987 (A21714278).

Hutchins, Dexter, "The Legal Battles Over Voice Messaging," Fortune, Oct. 28, 1985 p. 104 (A21708066).

"IBM Gives Voice to PS/2, RS/5000 Platforms," Voice Processing Newsletter, vol. 10, No. 22, Aug. 1, 1991 (A01346371).

"IBM Introduces 2 Phone Systems," The New York Times, Date Unknown (A01346365).

"IBM, Inventor Reach Patent Agreement," The Washington Post, Aug. 30, 1985 (A21707976).

"IBM Reaches Patent Agreement with Inventor," U.P.I., Aug. 29, 1985 (A21707974).

"IBM–Rolm Eye CBX–SNA Link," Computerworld, Jan. 5, 1987 (A21707572).

"IBM Says New Line of Big Computers is Faster than Promised," Wall Street Journal, Date Unknown (A01346364).

"ICA Slates Huge Meeting, Exhibit; Includes Program and List of Exhibitors," Telephone Engineer & Management, vol. 88, Apr. 15, 1984, p. 96 (A21708657).

IEEE Transactions on Consumer Electronics, vol. CE–25, No. 3, Jul. 1979 (A21725141).

"Index to Theses," Edited by Geoffrey M. Paterson, et al., vol. XXVI, Part 1, 1977 (A21718028).

"Industry Leaders License Katz Interactive Technology Patents," PR Newswire, Sep. 25, 1995 (A01331383).

Jerman, Max, et al., "A CAI Program for the Home," Educational Technology, Dec. 1971, p. 49 (A21729984).

Johnson, Eric, "Analysts Say that Voice–Message Will Talk up $1 Billion," Data Communications, Jan. 1984, p. 50 (A21708551).

Johnson, J. W., et al., "Integrated Digital Services on the 5ESS™ System," ISS '84 Florence, May 1984, Session 14 A, Paper 3, pp. 1–8 (A21725525).

Johnston, David, "'Pay Radio' Tunes in Charities, Turns off Some Consumer Groups," Los Angeles Times, Part 6, Aug. 24, 1986, p. 1 (A21706399).

Excerpt from Journal of Information Processing Society of Japan (in Japanese), vol. 23, 1981 (A21724246).

Excerpt from Journal of the Institute of Electronics and Communication Engineers of Japan (in Japanese), vol. 60, No. 10, 1977 (A21725080).

Kaplan, Jeffrey M., "4$^{th}$ Generation: Lacking," Network World, Oct. 6, 1986, p. 38 (A21706646).

Kaplan, Jeff, "The Uncertain Future of Centrex," Network World, Mar. 14, 1984, p. 17 (A21708640).

Karpinski, Richard, "IBM Offers Voice Processing Line," Telephony, Aug. 5, 1991 (A01346377).

"Katz Scratch Fever," Telemedia News and Views, Date Unknown (A01331216).

Katzel, Jeanine, "Selecting and Installing a Plant PBX System," Plant Engineering, vol. 37, Mar. 3, 1983 (A21713341).

Kawakami, Tokuhiro, et al., "Speaker Independent Speech Recognition and Audio Response System and Facsimile Response System," NEC Technical Journal, vol. 39, No. 7, 1986, pp. 54–79 (A21708159).

Kelleher, Joanne, "Users; Mastering DEC," Computerworld Extra!, Sep. 24, 1986, p. 61 (A21706475).

Press Release, Communications Daily, vol. 5, No. 126, Jun. 28, 1985, p. 5 (A21724661).

"Inside an Internetworking Voice–Mail Processor," Data Communications, Oct. 1986, p. 158 (A21706523).

"Integratec's Niche is Collecting on Delinquent Bank Card Accounts," American Banker, Aug. 10, 1988, p. 22 (A21724771).

"Card Titan Sees Gold in Electronic Commerce," Financial Service Online, Jul. 1996, p. 8 (A21724775).

"International Communications Network Service Installed by Commercial Cable," The Magazine of Bank Management, Jun. 1984, p. 126 (A21708770).

"International Information Network Acquisition," PR Newswire, Nov. 7, 1985 (A21708093).

"International Information Network Agreement," PR Newswire, Dec. 16, 1985 (A21708117).

"International Information Network Announces Agreements," PR Newswire, Feb. 12, 1986 (A21708309).

International Information Network Contract, Article Source Unknown, Feb. 25, 1986 (A21708312).

"International Information Network Earnings," PR Newswire, Dec. 9, 1985 (A21708110).

"International Information Sets Financing Program," PR Newswire, Oct. 22, 1985 (A21708064).

Press Release, Communications Daily, vol. 6, No. 41, Mar. 3, 1986, p. 11 (A21708337) repeated (A21706387).

"Megaphone Intl Wins Calif. Lottery Contract," PR Newswire, Aug. 4, 1986 (A21706387).

"Introducing Voice Quote," The Washington Post, Oct. 9, 1986 (A21707805).

Press Release, Communications Daily, vol. 6, No. 189, Sep. 30, 1986, p. 7 (A21706510).

Press Release, Communications Daily, vol. 6, No. 189, Sep. 30, 1986 (A21706511).

Jenkins, Avery, "Iowa State Launching Campus Wide Network," PC Week, vol. 4, Feb. 3, 1987, p. C14 (A21707767).

Kemezis, Paul, "The Shared Tenant–Services Debacle and Lessons from It" Data Communications, Sep. 1986, p. 94 (A21706444).

Koike, H., et al., "An Office–Use Voice Storage System with Elaborate User's Operativity," Proceedings of the Tenth International Symposium on Human Factors in Telecommunications, Jun. 1983, pp. 197–203 (A21725793).

Koike, Tsunehiko, et al., "Parcor–Type Audio Response Unit (in Japanese)," Article Source Unknown (A21724841).

"Kokusai Voicemail to Start International Voicemail Service," Comline Daily News Telecommunications, Mar. 10, 1987 (A21707861).

Kolodziej, Stan, "Where is the Electronic Messaging Explosion?," Computer World, Oct. 16, 1985, p. 21 (A21708056).

Korzeniowski, Paul, "Voice Messaging; ETS Demise Hits Rolm, Octel Users," Network World, Aug. 4, 1986, p. 1 (A21706390).

Kylin, J. C. et al., "Benefits of Integrating Data Bases into the SPC Network," ICC '79 Conference Record, vol. 1, Jun. 1979 (A21726001).

Lawson, Michael, "AT&T Leaves 'Super–PBX' money on the table for Northern Telecom," Data Communications, Sep. 1987 (A21712210).

Lazarus, George, "Pepsi Also Won the Super Bowl," Chicago Tribune, Jan. 30, 1987 (A21707647).

Lee, Linda, et al., "Meridian SL Information Services," Telesis, 1985, pp. 13–19.

Leibowitz, Ed, "The Wonder Years: Intriguing ACD Trends for the 1990s," Teleconnect, vol. 8, No. 4, Apr. 1990, p. 84 (A21712064).

Levin, David, "Private Branch Exchanges: The Best Time to Shop Might Be Right Now," Data Communications, Aug. 1987, p. 100 (A21714315).

Lineback, J. Robert, "VMX Girds for a Fight in Market it Pioneered," Electronics, May 12, 1986 pp. 55–56 (A21708453).

Lukeson, David R., "CLASS: The Smart Local Telephone Network," Proceedings of the International Congress on Technology and Technology Exchange, Oct. 1984, pp. 100–103 (A21725864).

"The LUMA Visual Telephone," Telecommunications Product Review, vol. 13, No. 7, Jul. 1986 (A21706313).

Lyman, Guy C., III, "Voice Messaging Comes of Age," Speech Technology, Aug.–Sep. 1984; pp. 45–49 (A21724634).

Mankin, Eric, "Playing TV Telephone: New System Opens Door for Audience Participation," Electronic Media, Apr. 24, 1989 (A01331389).

Marino, P. J., et al., "AT&T Communications ISDN Plans," IEEE, 1985, pp. 247–251 (A21723894) repeated (A21725560).

"Marubeni to Install Voice–Box–Mail System," Japan Economic Journal, Mar. 13, 1984, p. 9 (A21708639).

Mason, G. C. W., "Use of Recorded Announcements for Guidance of Users of Telecommunications Networks," Proceedings of the Eighth International Symposium on Human Factors in Telecommunications, Sep. 1977, pp. 257–262 (A21725784).

Massey, David K., "Voicetek Hears Sweet Success with Market Strategy," Boston Business Journal, vol. 7, No. 21, Section 1, Jul. 20, 1987, p. 6 (A21714290).

"The Master of Trivia," The Sporting News, Aug. 19, 1985 (A21706671).

Matheson, David, "ISDN: The Technology has Discovered Its Purpose," Telemarketing, May 1990 (A40002414).

Maxemchuk, N. F., "An Experimental Speech Storage and Editing Facility," The Bell System Technical Journal, vol. 59, No. 8, Oct. 1980 (A21724241).

Mearns, Allison B., et al., "Calling Card—Don't Tell It—Dial It," Bell Laboratories Record, May–Jun. 1982, pp. 117–119 (A21709811) repeated (A21709808).

Michaelson, Marlene, "Business, Services Use 'Dial A' Formats," Contra Costa Times, Sep. 8, 1986 (A21707858).

Mier, Edwin E., "A Big Bonanza in Little Switches," Data Communications, Jun. 1984, p. 68 (A21708764).

Miles, J. B., "AT&T System Upstages its FTS Rivals at Shows; The FTS 2000 Telecommunications Contract," Government Computer News, vol. 6, No. 4, Feb. 27, 1987, p. 1 (A21707808).

Miles, J. B., "Bypass Starts to Soar; More Businesses are Avoiding the Public Phone Network as New Technologies Surface and Telecomm Costs Rise," Computer Decisions, vol. 17, Nov. 5, 1985, p. 82 (A21708087).

Miles, J. B., "Network Control Under Control; Corporations Seeking Unified Network Management Systems May Find Hope in Several New Offerings," Computer Decisions, vol. 18, Jul. 15, 1986, p. 70 (A21706340).

Moore, Steve, "Project Management; Anatomy of a Cutover, Part 1" Network World, Aug. 25, 1986, p. 26 (A21706408).

Moore, Steve, "Project Management; Anatomy of a Cutover, Part 2" Network World, Sep. 1, 1986, p. 35 (A21706447).

Press Release, Data Communications, Aug. 1984, p. 58 (A21708825).

"MTV–Networks Signs with American Express Affiliate FDR Interactive Technologies," Business Wire, Mar. 28, 1989 (A01331393).
"NAB in the 'Big D.,'" Broadcasting, vol. 112, Mar. 30, 1987, p. 83 (A21707892).
"National Railways'Seat Reservation System by Touch Tone Telephone," Electrical Communication Facilities, vol. 38, No. 339, 1975 (A21724984).
"Newly Formed company Assigned Several Interactive Technology Patents Following the Settlement of Multimillion Dollar Patent Lawsuit," Business Wire, Oct. 17, 1994 (A01331386).
"New AT&T Device Made in Columbus," Columbus Citizen Journal, Sep. 7, 1985 (A01354693).
"New Products Telecommunications," Sound & Communications, vol. 28, No. 12, Apr. 1983, pp. 84–85 (A21713354).
"New Systems Stem Losses from Credit Card Debt; Technology Streamlines Phone Contacts," American Banker, Aug. 10, 1988 (A21724777).
"New Voice Processing Products Mean Improved Customer Service," Article Source Unknown, (A01346357).
Newton, Harry, "AT&T Information Systems One Year Later," Office Administration and Automation, vol. 45, Jan. 1984, p. 37 (A21708557).
Newton, Harry, "Dumb Smart Switches," Teleconnect, May 1991, pp. 14–18.
Newton, Harry, et al., "Send Us Your Pre–1989 Brochures," Computer Telephony, Oct. 1996, pp. 16–26 (A01331210).
Nishikado, Iwamasa, et al., "Voice Storage System for Centralized Extension System," Review of the Electrical Communications Laboratories, vol. 32, No. 6, 1984, pp. 1010–1018 (A21725924).
Press Release, The American Banker, Oct. 20, 1986, p. 13 ((A21706658).
"Northern–Telecom–2; (NT) Northern Telecom Announces Software Feature Package," Business Wire, Feb. 18, 1987 (A21707802).
"No. Telecom Upgrades Digital PBX," Electronic News, vol. 30, Apr. 30, 1984, p. 63 (A21708708).
Nowogrocki, Jim, "City, County Spend About $1 Million on 911," St. Louis Business Journal, vol. 6, No. 43, Section 3, Aug. 4, 1986, p. 1C (A21706393).
"Office Automation Advances 'White Collar' Productivity," Dun's Business Month, vol. 126, Mar. 1986, p. 59 (A21708336).
The Official Proceedings of Speech Tech '85, Media Dimensions, Inc., Apr. 1985, Cover and General Information Pages.
Excerpt in Japanese, Article Reference Unknown (A21724849).
Press Release, PR Newswire, May 9, 1986 (A21708451).
Paznik, Megan Jill, "Voice Mail: Pitfalls and Promises," Administrative Management, vol. 48, Mar. 1987, p. 16 (A21707849).
"The PBX Marketplace; Private Branch Exchanges," Administrative Management, vol. 47, Jan. 1986, p. 45 (A21708194).
"Peek at Future of 'General Hospital'" Times–Picayune, Date Unknown (A21708536).
Pelline, Jeff, "AT&T System Links Voice to Computer," San Francisco Chronicle, Sep. 10, 1985 (A01354691).
"Perception Technology; (PCEP) Perception Technology Announces ANI, DID Enhancements," Business Wire, Feb. 27, 1987 (A21707811).

Petit J. C., et al., "Galaxie: Toward Adaptive Distributed Control Systems," ISS '84 Florence, May 1984, Session 41 A, Paper 3.
Petrosky, Mary, "Interactive Speech System From AT&T's Business Unit," Infoworld, vol. 7, Issue 38, Sep. 23, 1986 (A21708029).
Pfister, George M., "The PBX: What Matters, What Doesn't," Datamation, vol. 30, Aug. 1, 1984, p. 121 (A21708831).
Plakias, Mark, "The Katz that Ate the Canary," Telemedia News and Views, vol. 2, No. 11, Nov. 1994 (A01331037).
Pollack, Andrew, "Audiotex: Data By Telephone," The New York Times, Jan. 5, 1984 (A21725850).
Portantiere, Nick, "AT&T Introduces System 25 Digital PBX," Electronic News, Jul. 7, 1986, p. 34 (A21706324).
Power of Attorney for U.S. patent application 5,109,404, Inventor Ronald A. Katz.
Prell, E. M., et al., "The Changing Role of the Operator," International Switching Symposium, May 1979, pp. 697–703 (A21725933).
Prince, Terry, et al., "A Telephone for the 'Checkless' Society," Bell Laboratories Record, Sep. 1972, pp. 249–253 (A21725647).
"Profit from Impulse Pay–Per–View," Advertisement for Science Dynamics Corporation, Telephony, Jul. 14, 1986 (A21706337).
"Prudential Insurance Mortgage by Phone Program," PR Newswire, Feb. 19, 1986 (A21708310) repeated (A21708311).
Pulford, Jack, "Aurora System is Built to Grow," Telephone Engineer & Management, vol. 88, Aug. 1, 1984, p. 78 (A21708841).
Putnam, Jane, "Winners," Contra Costa Sun, Aug. 14, 1985 (A21706705).
"Putting an End to Telephone Tag," ABA Banking Journal, Feb. 1987, (A21707747).
Raack, G. A., et al., "Customer Control of Network Features," ISS '84 Florence, May 1984, Session 14 A, Paper 2 (A21725520) repeated (A21725717).
Raimondi, Donna, "AT&T Debuts Primary Rate for System 85," Computerworld, Feb. 23, 1987, p. 41 (A21707806).
Rappaport, David M., "Voice Mail: Key Tool or Costly Toy," Data Communications, Oct. 1986, p. 153 (A21706526).
"Redwood by Rolm," Telecommunications Product Review, vol. 13, No. 6, Jun. 1986 (A21708487).
Rees, Norm, "Flexible Voice Response Software Speeds Development for Resellers," Speech Technology, Mar.–Apr. 1988, pp. 46–49.
Results of Lexis Search Request "Call Interactive," Date of Search Aug. 5, 1996 (A01331399).
Rice, Valerie, "AT&T Enters Speech–Processing Business, Names First Customers," Investor's Daily, Sep. 10, 1985 (A01354684).
Riederer, S. A., "Conversant VIS Means Business," AT&T Technology, vol. 5, No. 4 (A21711986).
Rangnekar, S., et al., "AT&T Voice Mail Service," AT&T Technology, vol. 5, No. 4 (A21711992).
"Ring System: Provides District of Columbia with Automatic Number and Location Identification to Aid in Emergency Services Response," Business Wire, Aug. 7, 1986 (A21706396).
Press Release, PR Newswire, Mar. 3, 1986 (A21708338).
Rippeteau, Jane, "'Smart' Way to Get Message Across," Financial Times, Jun. 12, 1986 (A21708502).

Rogers, Thomas, et al., "Scouting—A Worthwhile Trivial Pursuit," The New York Times, Aug. 9, 1985 (A21707968).
"Rolm–Corp; Appoints Harvey and Zalisk as Vice President," Business Wire, May 21, 1986 (A21708472).
"Rolm–Corp; Introduces Redwood for Branch Offices and Small Businesses," Business Wire, Jun. 2, 1986 (A21708491).
"Rolm; Links PhoneMail to IBM VM Host," Business Wire, May 5, 1986 (A21708447).
"Rolm Releases Four–Channel Phonemail Voice Messaging Unit," Computerworld, Jan. 28, 1985.
"Rolm; Rolm Announces PhoneMail Network," Business Wire, Feb. 9, 1987 (A21707775).
"Rolm; Rolm Awarded Major contract by Columbia University," Business Wire, Mar. 2, 1987 (A21707855).
"Rolm; Rolm CBX II 9000AE Offers Abundant System Power for Applications Growth," Business Wire, Feb. 3, 1987 (A21707765).
"Rolm; 15–Node Rolm System to be Installed at University of Rochester," Business Wire, Nov. 11, 1985 (A21708096).
Roman, David R., "Building Up Your Personal Computer; Part II: Data–Input Devices," Computer Decisions, vol. 16, Mar. 1984, p. 110 (A21708630).
Rosenbaum, Art, "This 'Maniac' Spreads His Loot Around," San Francisco Chronicle, Jul. 24, 1986 (A21706875).
Rosinski, R. R., "Uses of AT&T Speech Processing Technology," AT&T Technology, vol. 5, No. 4, Date Unknown, pp. 4–5 (A21723940).
Ruhl, H. W., et al., "Sprein—A Voice I/O Mail Order System with Telephone Access," Article Source Unknown.
Salter, Stephanie, "When the 'Say Hey Kid' Met the 'Say How' Bunch," San Francisco Examiner, Date Unknown (A21706704).
Sanger, David E., "A Driving Force Leaves Rolm," The New York Times, Jan. 15, 1986 (A21708200).
Press Release, PR Newswire, Sep. 17, 1985 (A21708022).
Schindler, Paul E., Jr., "AT&T Talking up Conversant 1 Unit," Information Week, Sep. 16, 1985 (A21723912).
Schinke, David, "Speaker Independent Recognition Applied to Telephone Access Information Systems," Speech Tech '86, 1986 (A21718178).
Schulman, Henry, "AT&T Device: Talk to Computer By Phone," The Oakland Tribune, Sep. 10, 1985 (A01354685).
Schumaker, Robert M., Jr., "Phone–Based Interfaces: Research and Guidelines," Proceedings of the Human Factors Society 36th Annual Meeting, 1992, pp. 1051–1055.
Schwartz, Jeffrey, "IBM Enhances Voice Processing," Article Source Unknown (A01346375).
Schwartz, P., et al., "JISTEL 500—Time Division Exchange Including Voice and Data with Voice Messaging," ISS '84 Florence, May 1984, Session 21 A, Paper 6, pp. 1–4.
Scully, Sharon, "Product News; Saturn PBX Revamped," Network World, May 19, 1986, p. 4 (A21708470).
Seaman, John, "Voice Mail: Is Anybody Listening?," Computer Decisions, vol. 16, May 1984, p. 174 (A21708731).
"Select List of Telecommunications Providers," The Magazine of Bank Management, Aug. 1986, p. 32 (A21706373).
Semilof, Margie, "High–End Voice/Data PBXs: Voicing Doubts about Data," Network World, Mar. 31, 1986, p. 65 (A21708354).
"Senate Panel Meets Today; C&P Objects to House Decision Awarding Telephone Contract to AT&T–IS," Communications Daily, vol. 5, No. 238, Dec. 10, 1985, p. 4 (A21708112).

Session No. 13—Contemporary Developments in Addressability and Pay–Per–View Conference, Apr. 28, 1985, p. 21 (A21707196).
Sharma, Ranjana, "PBX Users Benefit from Vitality of ACD Market," Network World, Oct. 17, 1988 (A21712686).
Shaw, Peter, "The Need for BT's Managed Information Services," British Telecommunications Engineering, vol. 11, Apr. 1992, pp. 2–6.
Shepherd, John, et al., "Managed Recorded Information Services—An Overview," British Telecommunications Engineering, vol. 11, Apr. 1992, pp. 7–13.
Shimizu, Hiroshi, "Advanced Credit Call Service," Japan Telecommunications Review, Oct. 1986, pp. 247–250.
Press Release, PR Newswire, Dec. 5, 1985 (A21708108).
Siragusa, Gail, "Voice Mail Takes Off: Send and Receive Messages by Phone," Administrative Management, vol. 47, Apr. 1986, p. 43 (A21708393).
"Small Company Initial Public Offerings: Dec. 1983," Goldhirsch Group, Inc., Mar. 1984, p. 138 (A21708624).
Smith, Tom, "Production Use of ISDN Lives up to Expectations," Network World, Feb. 26, 1990 (A21712004).
Snow, Stephen A., "Consumers Show Strong Preference for Automated Telephone Call Processing," Business Wire, Oct. 19, 1988 (A21724781).
"AT&T to Offer New Service," Reuter Newswire, Nov. 21, 1988 (A21724788).
"Soap Opera Updates Now Available in Area," Contra Costa Times/TV, May 28, 1984, p. 4 (A21708748).
"Something for Everyone at NAB's Equipment Exhibition," Broadcasting, vol. 112, Mar. 23, 1987, p. 63 (A21707873).
Song, D, et al., "System 12 Line and Trunk Testing," ISS Florence, May 1984, Session 32 A, Paper 5, p. 1.
"Special Information Tones Provide Computer with Vital Call Data," Bell Laboratories Record, Nov. 1981 (A21710768).
Staehler, R. E., "Toward a More Automated Network—TSPS Enhancements Lead the Way," Telephony, Feb. 8, 1982, pp. 45–48 (A21725941).
"The Stamp of Approval for Voicemail," Article Source Unknown, (A21707760).
Stern, Aimee, "Cable Operators Fight Back; Pay–Per–View TV," Dun's Business Month, vol. 129, Feb. 1987 (A21707748).
Stewart, Alan, "Signaling Changes for Interconnects; NATA 86 Trade Show," Telephone Engineer and Management, vol. 90, Dec. 15, 1986, p. 72 (A21707569).
Stix, Gary, "Many Bands = Light Work," Computer Decisions, vol. 17, Sep. 10, 1985, p. 92 (A21708015).
Press Release, Communications Daily, vol. 5, No. 148, Jul. 31, 1985, p. 7 (A21708033) repeated (A21724666).
"International Information Network Earnings," PR Newswire, Sep. 30, 1985 (A21708033) repeated (A21724666).
"International Information Sets Financing Program," PR Newswire, Oct. 22, 1985 (A21708034) repeated (A21724667).
Stoffels, Bob, "REA Takes its Show on the Road: Engineering and Management Seminars," Telephone Engineer & Management, vol. 88, May 15, 1984, p. 129 (A21708746).
"Strike Three," S. F. Progress, Aug. 7, 1985 (A21706708).
Strom, David, "Telephone or MIS Managers: Who Flips the PBX Switch; Management and Use of New Communications Technology; Connectivity—Focus on LANs," PC Week, vol. 4, Feb. 17, 1987, p. C1 (A21707798).

Sullivan, Linda, "Ameritech Services Signs Leading National Information Provider as a Master Dealer," Business Wire, Sep. 25, 1989 (A21724794).
Susca, Paul, "Telemarketing: Reach Out and Sell Someone," Network World, May 4, 1987 (A21714122).
Swan, Gary E., "Gift to Kids Wasted if Ballplayers Strike," San Francisco Chronicle, Date Unknown (A21706673).
"System 85 Voice Messaging Due in '85," Data Communications, Dec. 1984, p. 204 (A21709005).
Tagg, Ed, "Automating Operator–Assisted Calls Using Voice Recognition," Speech Technology, Mar.–Apr. 1988, pp. 22–25.
Takahashi, Y., "Technique to Use Chinese Letters for the On–Line System in Marketing Business," Packaging Technology, vol. 19, No. 11, 1981 (A21724264).
Talmadge, Candace, "MetroCal Dumps Richards for K–C," Adweek, Jan. 5, 1987 (A21707728).
"Tech Deals," Phillips Business Information, vol. 7, No. 120, Jun. 25, 1996 (A01331382).
Telecommunication Technology, vol. 4, No. 4, Apr. 1986, p. 68 (A21724070).
"'Teleguide' Network Gives Tourists the Answers," ComputerData, Apr. 1983 (A21724569).
"Telephone Service Offers the Latest News on the Soaps," Augusta, GA Chronicle–Herald, Jul. 28, 1984 (A21724626).
Telephony, Sep. 29, 1980 (A21716447).
"Test Your Baseball I. Q. and Win Four Tickets to All–Star Workout Day," Contra Costa Times, Date Unknown (A21706787).
Tetschner, Walt, "P C–Based Voice Processing Software Tools," Speech Technology, Mar.–Apr. 1988, pp. 42–45.
Tetschner, Walt, "The Voicetek VTK 90 Voice Computer," Speech Technology, Mar.–Apr. 1987, pp. 102–106.
"They've Got Your Number in AT&T's first Primary–Rate Test," Data Communicaitons, Feb. 1988, p. 15 (A21712494).
"Toshiba Telecom Introduces Universal Instrumentation for Entire–Line of Key and PBX Systems," Telecommunications Product Review, vol. 11, No. 2, Feb. 1984 (A21708573).
"Tracking the Trucks," Network World, Sep. 5, 1984, p. 55 (A21708897).
Excerpt from Transportation Technology (in Japanese), vol. 30, No. 7, 1975 (A21725045).
"Trivia Promo Chips Away for Frito–Lay," Advertising Age, Date Unknown (A21707650).
"Trivial Tickets," The Fort Wayne Journal–Gazette, Aug. 11, 1985 (A21706713).
"Two Firms Introduce FMS Products," Energy User News, vol. 9, Aug. 6, 1984, p. 12 (A21708848).
Tyson, David O., "Voice Mail Technology Streamlines Bank Telephone Messaging Services," The American Banker, Oct. 15, 1986, p. 12 (A21706655).
Upton, Molly, "No Clear Winner in War of Mails," Computerworld, May 19, 1986, p. 60 (A21708459).
Vanandel, M. A., "While You're Away, Audix Will Answer," AT&T Technology, vol. 3, No. 3, 1988 (A21724808).
"Vendor Support Eases GOP Costs," Computerworld, Aug. 27, 1984 (A21708865).
"View from Silicon Valley: Silicon Valley Companies Battle for Advantage, Compatibility," Communications Daily, vol. 4, No. 90, May 8, 1984, p. 1 (A21708743).

Virzi, Robet A., "Skip and Scan Telephone Menus: User Performance as a Function of Experience," Proceedings of the Human Factors Society $36^{th}$ Annual Meeting—1992, p. 211–215.
Vizcarrondo, John, et al., "HOBIS: New Designs on Hotel Billing," Bell Laboratories Record, Jan. 1980 (A21709392).
"VMX Announces InfoLink: New capability in Voice Messaging Arena," Business Wire, Jun. 16, 1987 (A21714159).
"VMX/Honneywell; (VMXI) (HON) Take Voice Messaging 'Down Under' After Signing Distribution/OEM Agreement for Australia and Pacific Basin," Business Wire, Sep. 3, 1986 (A21724699) repeated (A21706451).
"VMX, Inc. Adds Internal Revenue Service to Voice Message (SM) Users," Southwest Newswire, Feb. 8, 1984 (A21708587).
"VMX, Inc. Announces Another Good Quarter," Southwest Newswire, Aug. 1, 1984 (A21708846).
"VMX, Inc. Announces First Quarter Results," Southwest Newswire, Oct. 18, 1985 (A21708063).
"VMX, Inc. Announces Landmark Approval of first Voice Message System in Japan," Southwest Newswire, Jun. 1, 1984 (A21708776).
"VMX; (VMXI) AT&T Tops List of Seven License Agreements Granted in Third Quarter," Business Wire, Sep. 9, 1986 (A21706457).
"VMX–Inc; (VMXI) Hosts First International Networking Seminar," Business Wire, Jul. 18, 1986 (A21706345).
"VMX, Inc. Provides First Voice Message (SM) Systems to Three Bell Companies," Southwest Newswire, Dec. 11, 1984 (A21709007).
"VMX, Inc. Releases Audited Fiscal 1984 Financials—It was a Very Good Year," Southwest Newswire, Aug. 7, 1984 (A21708852).
"VMX; (VMXI) Voice Messaging Leader VMX, Inc. Launches New Generation Technology with VMX(R) 5000 Series," Business Wire, Oct. 7, 1986 (A21706650).
"VMX; (VMXI) Voice Messaging Patent–Holder VMX Inc. Moves into France after Signaling Distribution Agreement with Jeumont–Schneider," Business Wire, Sep. 15, 1986 (A21706459).
"VMX; (VMXI) VMX 5000 Series Voice Messaging System Scores High Sales During First Quarter," Business Wire, Mar. 19, 1987 (A21707862).
Press Release, Communications Daily, vol. 4, No. 209, Oct. 26, 1984, p. 6 (A21708939).
Press Release, Computerworld, Oct. 7, 1985, p. 68 (A21708055).
Press Release, PR Newswire, Jan. 18, 1984 (A21708570).
Press Release, PR Newswire, Apr. 10, 1984 (A21708655).
Press Release, PR Newswire, Oct. 16, 1984 (A21708935).
Press Release, PR Newswire, Jan. 24, 1986 (A21708207).
Voice Mail Brochure, Radio–Suisse Ltd., Date Unknown (W70172).
Voice Mail User Instructions, Voicemail International, 1991 (W70211).
"Voice Messaging Capability from VMX," The Magazine of Bank Management, Oct. 1985, p. 86 (A21708037).
Voice Processing International Conference Program, Jul. 1986 (A21723351).
Voice Processing—The New Revolution, Proceedings of the International Conference, Jul. 1986 (A21722980).
"Voice System Tunes up Automaker's Communications," Computerworld, Nov. 12, 1984, p. 35 (A21708972).

"Voice '92" Conference Information and Program, 1992 (W11651).

Press Release, Communications Daily, vol. 4, No. 110, Jun. 6, 1984, p. 9 (A21708778).

"Votrax Announces Centrum 9000, Model 5," Source Unknown, Oct. 16, 1987 (A21724763).

Waite, Andrew J., "Applying IVR Systems," Inbound/Outbound, Sep. 1988, pp. 30–39 (A21725733).

Walker, Murt, "CCS7 Offers New Paths to Revenue Generating Services," AT&T Technology, vol. 6, No. 2, 1991, pp. 8–19 (A21713600).

Wallace, Bob, "All Voice Systems Are Not Alike," Network World, Sep. 14, 1987 (A21712240).

Wallace, Bob, "Comnet '87; AT&T Announces ISDN Interface for System 85," Feb. 16, 1987 (A21707796).

Walters, R. E., et al., "Voice Processing Systems in British Telecom," British Telecommunications Engineering, vol. 9, Jul. 1990, pp. 88–97.

Warner, Edward, "Bank's Speech Synthesizers Greet Financiers' Calls with Daily Balance," Computerworld, Oct. 22, 1984, p. 6 (A21708937).

Watt, Peggy, "Local Phone Companies Eyeing Market for Voice Mail Services," Computerworld, Mar. 24, 1986, p. 23 (A21708350).

Watt, Peggy, "Republicans Ready for High–Tech: GOP Convention will Feature Voice Message System," Infoworld, Aug. 27, 1984 (A21708862).

Weinstein, Bob, "Stock Exchange Gets News by Phone," Inbound/Outbound, Oct. 1988, pp. 39–46 (A21725744).

Weinstein, Bob, "Stopping the Broker's Bottleneck," Inbound/Outbound, Nov. 1988, pp. 22–23 (A21725753).

West Interactive Settles with FDR: Patent Suit Settlement Could Have major Industry Impact, Enterprise Communications, Nov. 1994 (A01331040).

Whalen, Bernie, "Marketers Expand Applications of Dial–It 900 Technology," Marketing News, Nov. 26, 1982, (A21725861).

"What's An 'Automated' Attendant," Inbound/Outbound, Jul. 1989, pp. 40–42 (A21724789).

"Whether to Answer the Phone," The Washington Post, Dec. 7, 1986 (A21707563).

Whitten, W. B., "Advanced Interfaces Speed Delivery of Services," AT&T Technologies, vol. 2, No. 3 (A21707593).

"Who Switches Data Along with Voice? PBX Users, Increasingly," Data Communications, Feb. 1987, p. 77 (A21707751).

Wilpon, Jay G., et al., "Speech Recognition: From the Laboratory to the Real World," AT&T Technical Journal, Sep.–Oct. 1990, pp. 14–24 (A21723481).

Wise, Deborah C. "This Computer Even Deciphers Noo Yawk Talk," Business Week, Sep. 23, 1985, pp. 40–42 (A01354687).

Witten, Ian H., "Making Computers Talk: An Introduction to Speech Synthesis," Prentice–Hall, 1986 (A21708148).

Wolfe, R. M., et al., "Telecommunications Data Base Application with the 3B™20 Processor," ISS '84 Florence, May 1984, Session 22 A, Paper 2 (A21725518).

Wollenberg, Skip, "American Express Affiliate Plans Interactive Phone Service," The Associated Press, Jan. 19, 1989 (A01331396).

Wong, Stephanie Lam, "Just a Phone Call Away," San Francisco Chronicle, Date Unknown (A21707649).

Wood, Lamont, "Stretching the Workday; Corporate Users Find that Voice Mail Saves them Time in Transmitting Important Messages," Computer Decisions, vol. 18, Dec. 2, 1986, p. 44 (A21707561).

Wood, Lamont, "Will New Alliances Forge Better Links? Private Branch Exchange Vendors Merge with Computer Firms," Computer Decisions, vol. 18, Jul. 29, 1986, p. 40 (A21706353).

Worrall, D. P., "New Custom Calling Services," The Bell System Technical Journal, vol. 61, No. 5, May–Jun. 1982 pp. 821–839 (A21725897).

"Worthwhile Trivia," The New York Times, Date Unknown (A21706711).

"Yes! Songs For You," Advertisement, Source Unknown (W73764).

Youngs, E. A., "The Changing Role of Human Factors Work Supporting New Telecommunications Products and Service," Proceedings of the Tenth International Symposium on Human Factors in Telecommunications, Jun. 1983 (A21725809).

Youngs, E. A., "Effects of Automating Operator Services on Customers and Operators, Proceedings of the Eighth International Symposium on Human Factors in Telecommunications," Sep. 1977, pp. 251–255 (A21725776).

"Zenith; Centel Plans Zenith Phonevision Pay–Per–View Cable TV System," Business Wire, Dec. 5, 1985 (A21708105).

Zeno, Charlie, "Trivia Buff's Special Party for 678 Kids," Contra Costa Times, Date Unknown (A21706788).

Zuckerman, Steve, "Ogilvy & Mather/Dallas Looks for Partner to Go After Bigger Accounts," Dallas Business Courier, vol. 2, No. 21, Section 1, Sep. 8, 1986, p. 12 (A21706454).

Press Release, Communications Daily, vol. 6, No. 41, Mar. 3, 1996, p. 11 (A21708337) repeated (A21706387).

"Kokusai Voicemail to Start International Voicemail Service," Comline Daily News Telecommunications, Mar. 10, 1987 (A21707861).

Complete Issue of Bell Labs News, vol. 21, No. 40, Oct. 5, 1981 (A21710762).

Complete Issue of Bell Labs News, vol. 25, No. 36, Sep. 30, 1985 (A21724662).

Complete Issue of Bell Labs News, vol. 26, No. 31, Aug. 18, 1986 (A21706398).

Complete Issue of Bell Labs News, vol. 27, No. 33, Aug. 17, 1989 (A21710741).

Complete Issue of Voice News, vol. 4, No. 9, Oct. 1984 (A21708913).

Complete Issue of Voice News, vol. 6, No. 7, Jul./Aug. 1986 (A21706303).

Complete Issue of Voice News, vol. 7, No. 2, Feb. 1987 (A21707730).

Complete Issue of Voice News, vol. 7, No. 3, Mar. 1987 (A21707834).

Complete Issue of Voice News, vol. 7, No. 5, May 1987 (A21714110).

Complete Issue of Voice News, vol. 7, No. 10, Oct. 1987 (A21724749).

"DST DST Systems Inc. Mutual Fund System Audio Response System," DST Systems, Inc., 1985 (Manual).

"Tele–Account Voice Response System Enhancements Functional Specifications Mar. 18, 1985," Mar. 18, 1985 (Manual).

"Periphonics Project Management Review Meeting," Mar. 21, 1985 (Agenda).

Boni, D., "Call Coding Report," Apr. 11, 1985 (Memo).

Vollmer, H.D., "Periphonics Management Review," May 1, 1985 (Meeting Minutes).

"DST Conversion Flow," Apr. 12, 1985 (Chart).

"Tele–Account Audit Report," Source Unknown, Jul. 26, 1984.

"Tele–Account Problem Report," Source Unknown, Jul. 26, 1984.

"100 Cool Call Things," Callcenter, Oct. 5, 2000.

"100 Cool Call Things," Callcenter, Oct. 5, 2000.

* cited by examiner

VOICE-DATA TELEPHONIC INTERFACE CONTROL SYSTEM

This is a continuation of application Ser. No. 08/306,456, filed Sep. 4, 1994, and entitled "Voice-Data Telephonic Interface Control System", which is a continuation of application Ser. No. 08/058,452, filed May 7, 1993, and entitled "Voice-Data Telephonic Interface Control System", issued Oct. 25, 1994, as U.S. Pat. No. 5,359,645, which was a continuation of application Ser. No. 07/680,879, filed May 5, 1991, and entitled "Voice-Data Telephonic Interface Control System", issued Jun. 29, 1993, as U.S. Pat. No. 5,224,153, which is a continuation-in-part of application Ser. No. 07/481,403 filed Feb. 20, 1990 and entitled "Voice-Data Telephonic Control System" issued May 7, 1991, as U.S. Pat. No. 5,014,298 which was a continuation-in-part of application Ser. No. 07/312,792 filed Feb. 21, 1989 and entitled "Voice-Data Telephonic Control System", issued Dec. 17, 1991, as U.S. Pat. No. 5,073,929 which was a continuation-in-part of application Ser. No. 07/194,258 filed May 16, 1988 and entitled "Telephonic-Interface Statistical Analysis System", issued Jul. 4, 1989 as U.S. Pat. No. 4,845,739, which was a continuation-in-part of application Ser. No. 07/018,244 filed Feb. 24, 1987 and entitled "Statistical Analysis System For Use With Public Communication Facility", issued Dec. 20, 1988 as U.S. Pat. No. 4,792,968, which was a continuation-in-part of application Ser. No. 06/753,299 filed Jul. 10, 1985 and entitled "Statistical Analysis System For Use With Public Communication Facility", now abandoned.

Also, this application is a continuation-in-part of application Ser. No. 08/306,751, filed on Sep. 14, 1994, and entitled "MULTIPORT FORMAT TELEPHONIC INTERFACE CONTROL SYSTEM," which is a continuation of application Ser. No. 08/047,241, filed on Apr. 13, 1993, and entitled "MULTIPLE FORMAT TELEPHONIC INTERFACE CONTROL SYSTEM," now U.S. Pat. No. 5,351,285, which is a continuation of application Ser. No. 07/509,691, filed on Apr. 16, 1990, and entitled "MULTIPLE FORMAT TELEPHONIC INTERFACE CONTROL SYSTEM," now abandoned, which is a continuation-in-part of application Ser. No. 07/260,104, filed on Oct. 20, 1988, and entitled "TELEPHONIC INTERFACE CONTROL SYSTEM," now U.S. Pat. No. 4,930,150, which is a continuation-in-part of application Ser. No. 07/018,244, filed on Feb. 24, 1987, and entitled "STATISTICAL ANALYSIS SYSTEM FOR USE WITH PUBLIC COMMUNICATION FACILITY," now U.S. Pat. No. 4,792,968, which is a continuation-in-part of application Ser. No. 06/753,299, filed on Jul. 10, 1985, and entitled "STATISTICAL ANALYSIS SYSTEM FOR USE WITH PUBLIC COMMUNICATION FACILITY," now abandoned; and application Ser. No. 08/047,241, filed on Apr. 13, 1993, and entitled "MULTIPLE FORMAT TELEPHONIC INTERFACE CONTROL SYSTEM," now U.S. Pat. No. 5,351,285, is also a continuation-in-part of application Ser. No. 07/640,337, filed on Jan. 11, 1991, and entitled "TELEPHONIC-INTERFACE STATISTICAL ANALYSIS SYSTEM," which is a continuation of application Ser. No. 07/335,923, filed on Apr. 10, 1989, which is a continuation of Ser. No. 07/194,258, filed on May 16, 1988, and entitled "TELEPHONIC-INTERFACE STATISTICAL ANALYSIS SYSTEM," now U.S. Pat. No. 4,845,739, which is a continuation-in-part of application Ser. No. 07/018,244, filed on Feb. 24, 1987, and entitled "STATISTICAL ANALYSIS SYSTEM FOR USE WITH PUBLIC COMMUNICATION FACILITY," now U.S. Pat. No. 4,792,968, which is a continuation-in-part of application Ser. No. 06/753,299, filed on Jul. 10, 1985, and entitled "STATISTICAL ANALYSIS SYSTEM FOR USE WITH PUBLIC COMMUNICATION FACILITY," now abandoned.

BACKGROUND AND SUMMARY OF THE INVENTION

As the use of computer techniques has steadily grown, related telephonic communication techniques also have expanded. In that regard, telephone systems have been developed for effectively transmitting digital data in forms commonly utilized by computer apparatus. At a more personal level, the traditional push buttons of telephone instruments have been utilized to provide digital signals at a remote location for both data and control functions. Consequently, various operations have been performed.

In the typical operation of a telephone instrument as a digital input device, voice messages prompt callers to provide data and control signals by actuating the alphanumeric buttons on a conventional telephone. Detailed forms of such systems have been proposed in association with computers to provide various services, and one such system is disclosed in U.S. Pat. No. 4,792,968 issued Dec. 20, 1988, to Ronald A. Katz from an application Ser. No. 07/018,244 filed Feb. 24, 1987.

Although traditional systems for interfacing an individual person at a telephone terminal with a computer or data processor have been effective, such systems have been somewhat limited in application. In general, the present invention is based on recognizing the need in such systems to accommodate voice signals as to provide recorded audio data, as for subsequent use. Accordingly, the system of the present invention accommodates a caller to identify digital control signals, digital data signals and audio signals, all in an organized format as to accomplish a record for subsequent processing of use.

To consider a specific example, systems have been proposed in the past for interfacing individual telephone terminals with computers, as for sales applications. Individual callers might dial to accomplish a computer interface, then provide ordering data by actuating the telephone terminal buttons to specify goods or services. One such system is disclosed in a co-pending related patent application entitled "Telephone Interface Statistical Analysis System", filed May 16, 1988, and bearing a Ser. No. 07/194,258 (now U.S. Pat. No. 4,845,739) and a related prior application, now U.S. Pat. No. 4,792,968. In the use of such systems, the need is recognized for improved capability regarding audio data.

In general, the present invention comprises a telephone computer interface system accommodating digital and vocal telephonic communication, the system being expanded to accommodate and flag audio data distinct from digital data. In using the disclosed system, either outbound or inbound calling operations attain an interface with a central data processing system. Depending on the course of communication during the interface, various states are implemented for the central system to receive and identify: digital control signals, digital data signals and audio or voice signals. Somewhat conventional operation may involve automated vocal communications to cue the caller and keypad digital communications from the caller. Generally, data received from the caller is set in memory for subsequent use or processing. The data may be addressed as to cue a remote terminal or to isolate a set or subset. Callers may be qualified by automatic number identification (ANI) signals checked against an assigned consumable key number. Thus, the system accommodates flexible control and data accumulation (including cued audio) to accommodate any of various specific interface applications or formats.

BRIEF DESCRIPTION OF THE DRAWINGS

In the drawings, which constitute a part of this specification, an exemplary embodiment exhibiting various objectives and features hereof is set forth. Specifically.

DESCRIPTION OF THE ILLUSTRATIVE EMBODIMENT

As required, a detailed illustrative embodiment of the present invention is disclosed herein. However, physical communication systems, data formats and operating structures in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
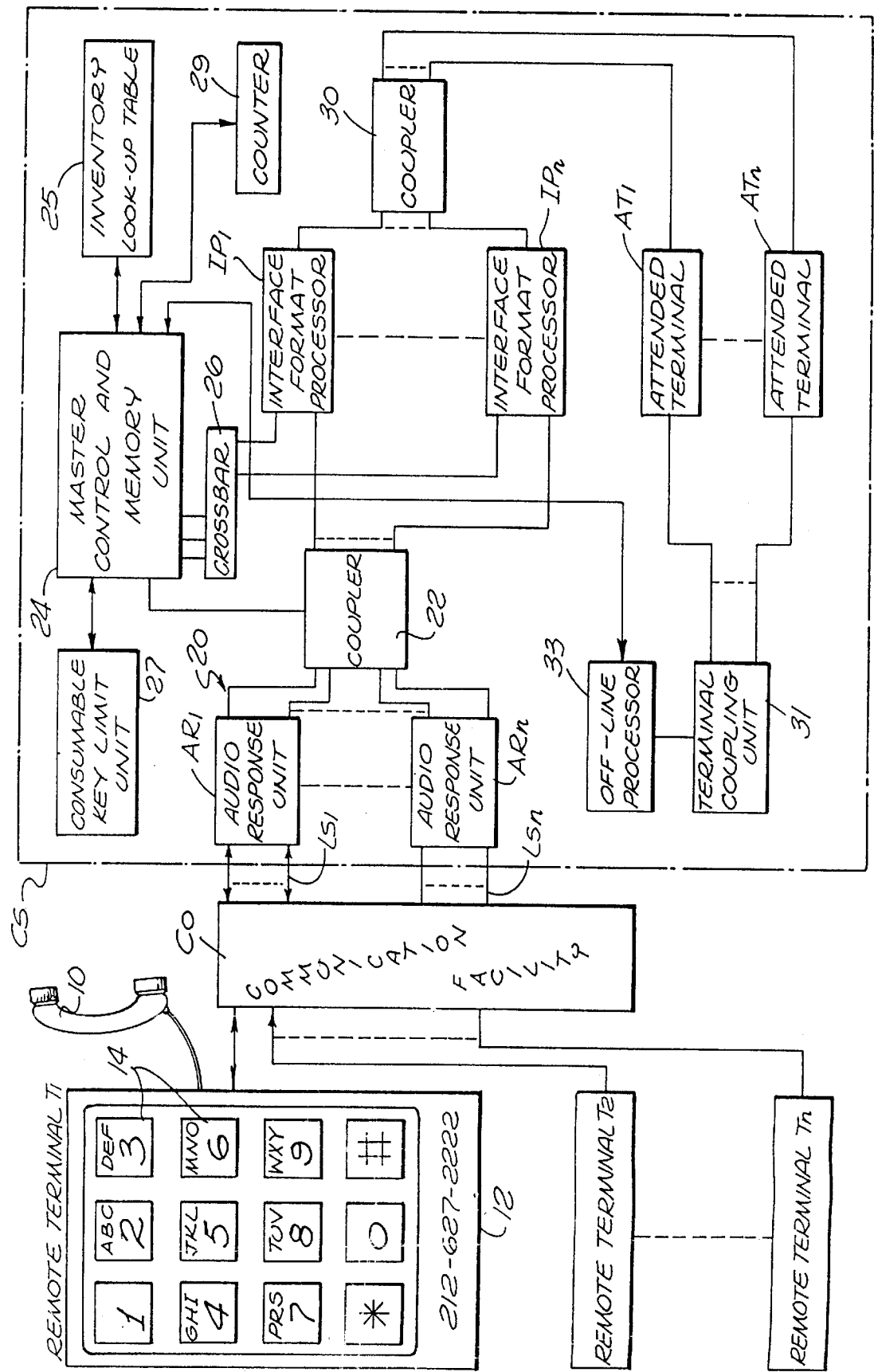
FIG. 1 is a block diagram of a system constructed in accordance with the present invention.

Referring initially to FIG. 1, a series of remote terminals T1–Th (telephone instruments) are represented (left). The terminals T1–Tn may be similar and accordingly only the terminal T1 is shown in any detail. The indicated terminals T1–Tn represent the multitude of telephone terminals existing in association with a communication facility CO which may comprise a comprehensive public telephone network.

The communication facility CO, accommodating the individual terminals T1–Tn, is coupled to a central processing station CS generally indicated by a dashed-line block. Within the station CS as illustrated, processors are provided to interface the terminals T1–Tn so as to accomplish a desired operating format, and accordingly accumulate data relating to individual callers.

Calls to and from the terminals T1–Tn are individually processed in accordance with a specific format to accomplish a data cell or packet. For example, the objective of a call may be to order an item of merchandise to implement a mail-order operation. Similarly, a service may be specified and ordered. Accordingly, the interface accomplishes data as a cell for processing the order. In other exemplary formats, the system may function for public polls, lotteries, auctions, promotions and games.

At any instant of time, the collective interface involving the communication system CO and the processing station CS may involve several thousand calls. Accordingly, the station CS may take the form of a sizeable computer or mainframe capable of simultaneously controlling smaller units or directly operating to process many calls involving individual interfaces. Although numerous possible configurations are available, for purposes of explanation, the central station CS of the disclosed embodiment includes a control unit functioning with a plurality of audio response units and associated individual processors and attended terminals.

Essentially, the system of the present invention accumulates data from the remote terminals T1–Tn in cells, which data may include audio data and digital data (numerical) flagged or otherwise distinguished for subsequent expedient processing. Accordingly, the system enables a person at a terminal (T1–Tn) to provide data in both audio and digital forms. For audio transmissions, the person utilizes the telephone handpiece (microphone) while for digital communications, the person utilizes the telephone push buttons (keypad).

Considering the exemplary telephone terminal T1 of FIG. 1 in greater detail, a handpiece 10 (microphone and earphone) is shown along with a panel 12 provided with a rectangular array of individual push buttons 14 in a conventional configuration. Of course, the handpiece 10 accommodates analog signals while the panel 12 is a digital apparatus. As disclosed in detail below, a person is informed or cued through the handpiece 10 (earphone) to provide data in accordance with a specific format. In accordance herewith, the person may provide signals utilizing either the buttons 14 or the handpiece 10 (microphone).

In conventional telephone structures, alphabetic and numeric designations are provided on the buttons 14. For example, several of the buttons 14 carry three letters along with a decimal digit. Specifically, the button designated with the numeral "2" also carries the letters "A", "B" and "C". Thus, the buttons 14 encompass: the numerals "0–9", the symbols "*" and "#" and the alphabet except for the letters "Q" and "Z".

At this stage, some specific aspects of the communication interface are noteworthy. Essentially, by telephonic dialing, the communication facility CO is coupled selectively to certain of the terminals T1–Tn through audio response units AR1–ARn. For example, as a result of dialing a specific telephone number at one of the remote terminal units T1–Tn, the communication facility CO couples the actuated terminal through one line of several sets of lines LS1–LSn to one of the audio response units AR1–ARn. Note that automatic call distributors may be utilized as well known in the art.

From the audio response units AR1–ARn, incoming lines 20 are received through a coupler 22 for communication with individual interface format processors IP1–IPn. Note that the interface processors IP1–IPn are illustrated as separate and distinct units; however, as mentioned above, it is to be recognized that various structural processing combinations may be used, based on time sharing, parallel processing, compiler techniques, bus technologies and other well known computer techniques to accomplish the objective processing as explained in detail below. In some instances, certain of the structure and functions of the processors IP1–IPn can be variously incorporated in the units AR1–ARn. Of course, specific arrangements and configurations will likely be implemented based on available hardware and software development.

The coupler 22 is also connected to a master control and memory unit 24 which is associatively coupled to a look-up table 25, a consumable key limit unit 27, a subset counter 29 and through a crossbar 26 to each of the processors IP1–IPn. Note that both the function and structure of crossbars for selectively interconnecting multiple parallel structures are well known in the computer arts. For a detailed description of crossbars, see the book, "High-Performance Computer Architecture" by Harold S. Stone, published by Addison-Wesley Publishing Company, 1987.

The coupler 22 essentially functions as a switch as well known in the prior art to establish line couplings from one line of an audio response unit (AR1–ARn) to one of the interface processors IP1–IPn. The operation of the coupler 22 is implemented in association with the control unit 24 which may be programmed to execute control and memory functions as detailed below. Again, the division of functions between the unit 24, the units AR1–ARn and the processors IP1–IPn may vary considerably depending on available structures and techniques. The disclosed system is merely exemplary in that regard.

Generally, in a sales format, the interface processors IP1–IPn receive basic record data from the unit 24 and order data from the terminals T1–Tn. In a multiple format configuration, program data may be stored in the processors IP1–IPn or supplied from the unit 24. In any event, in accordance with a program or format, a packet of data is collected in a processor IP1–IPn during an interface. After being organized in a cell and flagged, the data packet is returned from an interface processor IP1–IPn to the unit 24 for subsequent use or processing. For outbound operation, the unit 24 functions as an automatic dialer to attain desired connections through the units AR1–ARn in accordance with stored telephone numbers.

Again, considering a sales format, typically individual data cells or packets of data are organized and returned to the unit 24 for processing which ultimately involves performing a service or instructions for shipping merchandise and billing. In some formats, during the course of interfaces with certain callers, the need may arise for person-to-person oral communication. In accordance herewith, to accommodate that need, the interface processors IP1–IPn may be individually associated through a coupler 30 with an attached terminal AT1–ATn. For processing operations as mentioned above, the terminals AT1–ATn may be connected through a coupling unit 31 to an off-line processor 33, also connected to the control and memory unit 24.

Recapitulating to some extent, the general operation of the system of FIG. 1 involves the development and maintenance of individual data packets or cells drawn from the unit 24 to the individual processors IP1–IPn during interface communications with individual remote terminals T1–Tn. In the exemplary format as treated below, each data cell manifests a merchandise order identifying specific goods, a specific customer, a shipping destination and other related data. In accordance herewith, data in individual cells may include flagged audio data. In any event, the operation of the system involves the organized accumulation of mail-order data (some of which may be audio) in the unit 24 addressable for subsequent use by the processor 33, as to implement billing and delivery of services or merchandise.

Figure 2:
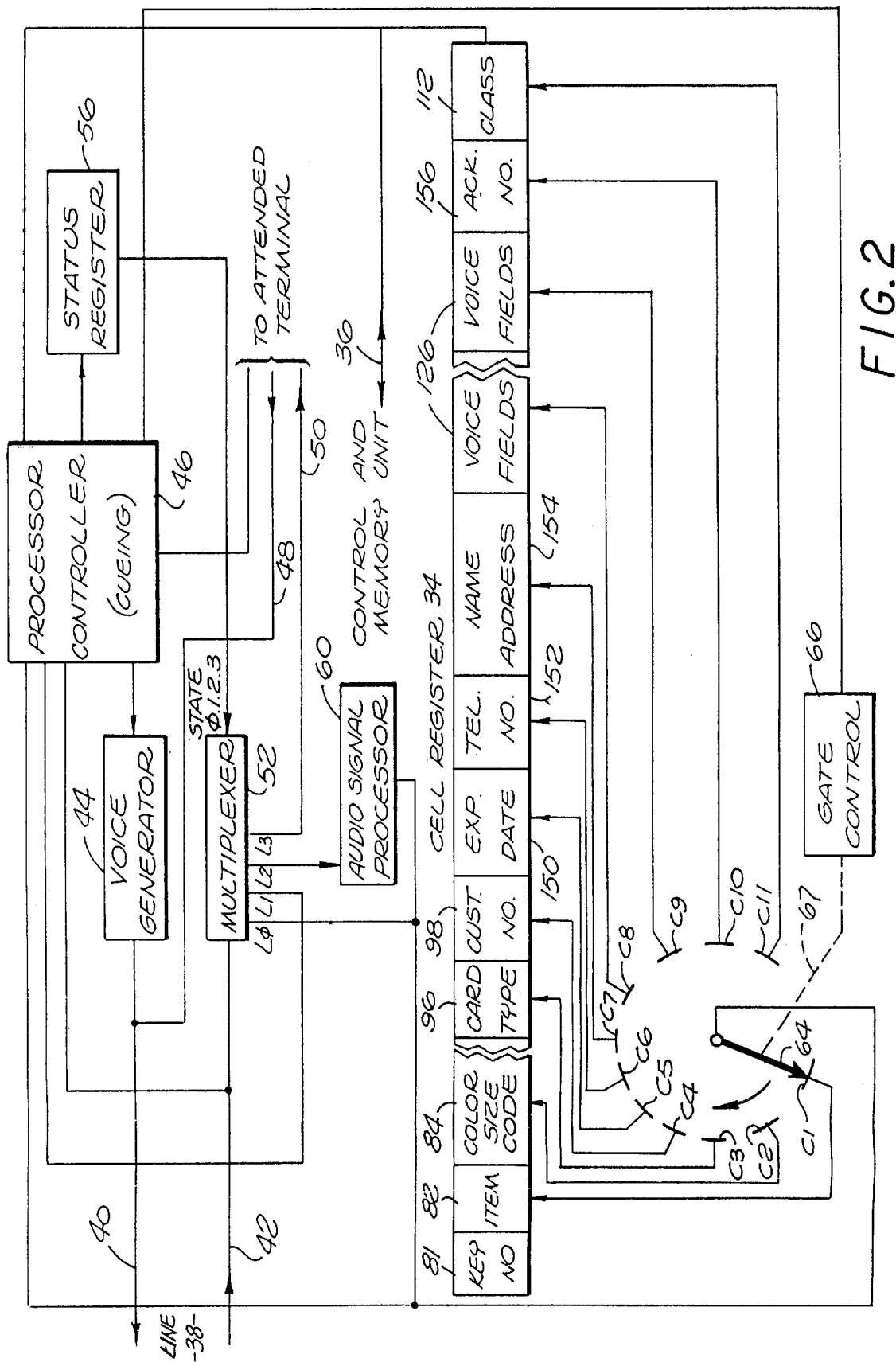
FIG. 2 is a block and schematic diagram of a component in the system of FIG. 1.

As explained in detail below, the data cells (manifesting individual orders) are developed in the individual processors IP1–IPn. Structural details of an exemplary processor are shown in FIG. 2 and will now be considered. A cell register 34 (FIG. 2, center) is divided into fields to illustrate an exemplary data format. Specifically, the cell register 34 defines several separate fields for data components manifesting an exemplary order. Record data for some of the fields may reside in the master control and memory unit 24 (FIG. 1) before the occurrence of any telephone interface. However, other fields are loaded or modified during the period of the interface with a caller at one of the remote terminals T1–Tn providing elements of the data.

Generally, variously accumulated record data is initially loaded into the cell register 34 from the control and memory unit 24 (FIG. 1) through a bus 36 (FIG. 2, right center) that is connected through the crossbar 26 (FIG. 1) to the unit 24. The same bus 36 accommodates movement of a completed or modified data cell to memory (in the unit 24).

As suggested above, some fields in the cell register 34, as those pertaining to a specific merchandise order, are always loaded by data resulting from the interface and received through a two-way line 38 (FIG. 2, upper left). That is, a caller is steered through the interface interval, being prompted or cued to provide responses selectively in the form of: (1) digital control signals, (2) digital data signals or (3) audio signals. Also, in certain applications digital ANI telephone signals may be received through the line 38 indicating the telephone dialing number of the caller. Specifically, ANI (automatic number identification) signals may be provided from the communication facility CO (FIG. 1) automatically indicating the telephone number for the calling terminal T1–Tn. The ANI signals may be treated either as control or data signals on being received through an audio response unit (AR1–ARn, FIG. 1), the coupler 22 and the line 38 (FIG. 2).

Generally, control signals in the line 38 are utilized for the controlled registration of digital data signals and audio signals as appropriate to each specific interface. Of course, the data and audio signals also are received through the line 38.

For convenience of illustration and explanation, the line 38, connected to the coupler 22 (FIG. 1) is shown to include two separate communication paths, specifically an outgoing path 40 (FIG. 2) and an incoming path 42. Of course in practice, the two paths would comprise a common two-way or bidirectional line. For outbound calls, the master control and memory unit 24 (FIG. 1) supplies dialing signals through the coupler 22 and a unit (AR1–ARn) to the facility CO. As indicated above, an automatic dialer structure is incorporated as well known in the art. On completion of a connection to a terminal T1–Tn, the unit 24 actuates a processor IP1–IPn through the crossbar 26. Thus, an addressed data packet is used to advise, inform or cue a person at a connected remote terminal (T1–Tn). In some cases, for example inbound calls, an audio response unit AR1–ARn may perform some preliminary operations, after which calls are referred to a processor IP1–IPn through the coupler. Usually, coupling a remote terminal T1–Tn to a processor IP1–IPn initiates an interface format.

During an interface operation, as with the processor IP1 for example, the connection through the coupler 22 and the audio response unit AR1–ARn remains active. For example, the outgoing communication path 40 (FIG. 2) is provided with voice signals from a voice generator 44 that is in turn controlled by a processor controller 46. Generally, the controller 46 may possess some substantial computing capability along with storage. Accordingly, it responds to an operating program is disclosed in detail below to accomplish an interface format.

The outgoing communication path 40 of the line 38 also is connected to one of the attended terminals AT1–ATn. The signal route in FIG. 2 is to the path 40 either from a line 48 or the voice generator 44. With respect to the incoming path 42, signals are provided through a multiplexer 52 to provide various lines L0, L1, L2 or L3 exclusively active. The line L3 or line 50 is coupled to an attended terminal AT1–ATn (FIG. 1). As indicated above and explained in detail below, under various circumstances, signals from persons at terminals are variously transferred, including transfer to an attended terminal (AT1–ATn, FIG. 1) Thus, the status of an interface may vary, one status or state designating an interconnection of one of the remote terminals T1–Tn with an attended terminal, that is, one of the terminals AT1–ATn.

The status of an interface with a caller is indicated by a status register 56 (FIG. 2, upper right) which is controlled by the process controller 46 and in turn controls the multiplexer 52. The status register 56 basically comprises a two-bit counter capable of indicating four states to control the lines L0–L3 from the multiplexer 52, as indicated below.

| State | Operation | Active Multiplexer Line |
|---|---|---|
| "0" | Cue data signals (digital) | L0 |
| "1" | Cue control signals (digital) | L1 |
| "2" | Cue audio signals | L2 |
| "3" | Actuate live interface | L3 |

The states "0", "1" and "2" indicate operations to prompt persons to provide signals digitally. Alternatively, any of the states may be used merely to inform a person where no response is to be received. As indicated above, in the state "3", the caller speaks directly with an operator to provide information in an audio form. The other states accommodate computer interface signals. Implementing the different states, the multiplexer 52 (controlled by the status register 56) selectively activates one of the four lines L0, L1, L2 or L3 to receive a specific class of signals from the path 42.

Generally, the control signals received in the line L1 are applied to actuate the controller 46. The data or information signals received in the lines L0 and L2 are provided to the cell register 34 through a gating network 62 (lower left). Several connections are involved. The line L3 is coupled to an attended terminal (AT1–ATn, FIG. 1) through a line 50.

The line L0 (digital data) is connected to the controller 46 and to a movable contact 64 of the gating network 62. The line L1 is connected only to the controller 46. The line L2 (audio) is connected through an audio processor 60 to the controller 46 and to the movable contact 64.

The gating network 62 is illustrated in an electromechanical form for ease of explanation with the movable contact 64 displaceable to engage each of the stationary contacts C1–C11 in sequence. However, in an actual embodiment, a well known analogous solid-state configuration would be employed.

In accordance with the symbolic representation of the gating network 62, the movable contact 64 is driven by a gate control 66 to sequentially encounter stationary contacts C1–C11 which are coupled to fields of the register 34. A mechanical drive connection is indicated by a dashed line 67, the gate control 66 being actuated by the process controller 46 as described in detail below. Somewhat more specifically, the operations directed by the controller 46 are illustrated in FIG. 3 and will now be considered in detail.

Figure 3:
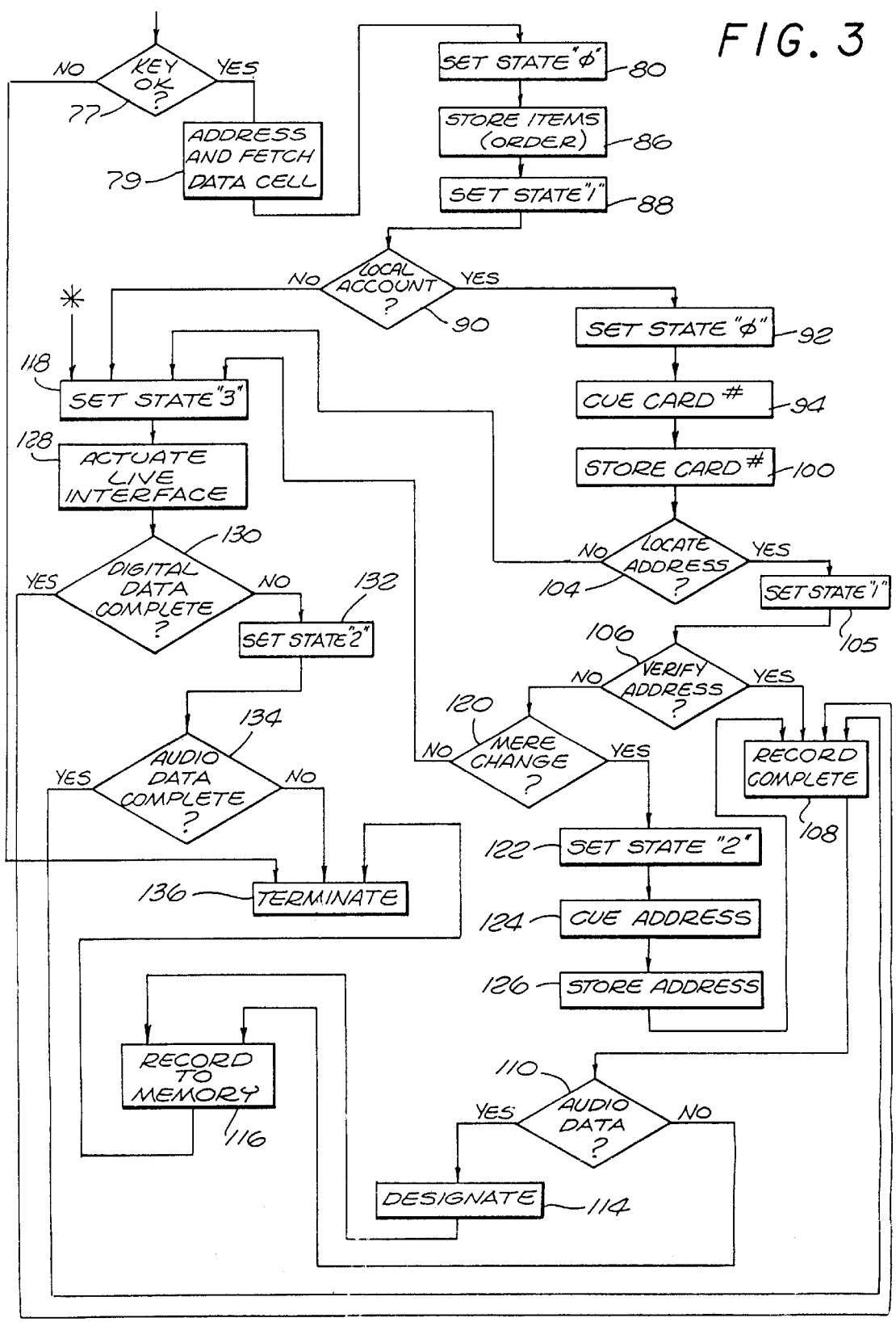
FIG. 3 is a flow diagram illustrating the operating process of the structure represented in FIG. 2.

The flow diagram of FIG. 3 implements an exemplary mail-order format for a sales organization with existing "local" customers of record (identified by telephone number, credit card number, etc.) acceptable for credit transactions. To pursue an example, customers are provided with a "special" catalog from which a single order may be placed for each telephone terminal. Thus, customers are assigned a consumable key of "one" to accordingly limit ordering.

Calls from customers are coupled through an audio response unit, e.g. unit AR1 (FIG. 1) and the coupler 22 to the master control unit 24. In one format, the customer is recognized by a telephone number manifest by automatic number identification (ANI) signals. Customer data is fetched to the consumable key limit unit 27 based on the calling telephone number. The call is then tested to proceed conditionally on the key not being previously used or consumed. The test is illustrated by a block 77 (FIG. 3) and is executed by the unit 27 with reference to a field 81 of the data packet as shown in the register 34 (FIG. 2). If there has been a previous call, the instant call is terminated as indicated. Otherwise, the data cell is fetched from the unit 24 to a cell register, e.g. register 34 (FIG. 2). The operation is indicated by the block 79 (FIG. 3). Thus, calls to a specific format number are limited to "one". Of course, consumable keys may be set to accomplish any desired limitation with respect to a specific format. Format interface operation follows approval of a call.

At the beginning of an interface operation, the processor involved, e.g. processor IP1 (FIG. 2) is set to state "0" as indicated by the block 80 (FIG. 3). That state, also indicated by the status register 56 (FIG. 2) controls the processor 46 so that a caller is cued for digital data signals to be formed by use of the buttons 14 at the caller's remote terminal. Specifically, the caller might be cued: "Please indicate your first item by keying in the three-digit catalog number." The audio is reproduced at the terminal.

As will be described in detail below, identification for an item is stored in a field 82 (FIG. 2) of the cell register 34. Similarly, color, size and code data for selected items are cued and stored in a field 84. Of course, other items may be ordered with the consequence that they are recorded in further of the fields 82 and 84 of the cell register 34. The operation also is represented by the block 86 in FIG. 3 and might be cued: "Please indicate your next item or push button '3' to indicate you are finished."

At the conclusion of the item ordering, the system sets state "1" (cue control) in the status register 56 (FIG. 2) as indicated by block 88 (FIG. 3). Note that the state "1" also may be attained by a period of silence from the caller. In any event, the subsequent operation involves a junction, as indicated by the block 90, a determination to be made by whether or not the caller is a customer of record, e.g. "local account?" As an example, the caller might be cued: "If you have a local account, please push button '1'; if not, please push button '2'." The resulting digital control signals set the course for subsequent operations as implemented by the controller 46. Of course, the indication may be confirmed or originated from the data packet.

If a caller has a local account, for example, implying that the caller's address is in the data packet, the system status is reset to state "0" (cue data) as indicated by block 92. In that event, the system resumes the accumulation of non-vocal digital data by cueing for the card number as indicated by the block 94. Note that with the indication of a local account, a designating code (customer I.D. number) is set in the field 98 of the cell register. Concurrently, the expiration date for the customer's account or card is stored in the field 150. These operations are indicated by the block 100 (FIG. 3).

Pursuing the example, the system is again set in state "1" to cue for control signals as indicated by the block 104 (FIG. 3). Specifically, as indicated by a junction block 104, a search is made for the customer's identification number. If the number is found, another control signal is cued. Specifically, as indicated by the block 106, the customer's address is verified. If the proper address is confirmed to be registered for the customer, the record is completed as indicated by the block 108. This operation, performed by the unit 46, may involve inventory verification or other internal operations as described in detail below.

Next, the system operation progresses to an internal decision block 110 to test whether or not audio data has been received. Essentially, the audio test simply queries whether or not the status register 56 has been set to manifest the existence of the states "2" or "3" to enter audio data. Control in that regard is by the controller 46 (FIG. 2).

In the example as treated to this point, neither states "2" nor "3" has occurred. However, depending on the determination, a field 112 (FIG. 2) of the cell register 34 is set with one of the two possibilities. If audio data had been entered, the block 114 would indicate a class designation of binary "1" in the field 112. Conversely, a class representative "0" is entered in the field 112 for orders involving no audio data. The operation next proceeds to record the loaded cell in memory as indicated by the block 116.

The operation as outlined to this point has covered routine orders, i.e. customers with local accounts placing others that can be processed entirely on the basis of digital control signals and digital data signals (no audio) entered digitally as outlined above. The accommodation of other orders involving audio communication will now be considered.

Generally, audio operations involve either the introduction of a person-to-person interface, as for example for a new customer, or audio signal interface, as for example to record a new address for an existing customer. During any format operation, these operations may be actuated variously in combination with digital data control and recording. Such operations may involve proceeding through a block 118 (FIG. 3, upper left); however, other possibilities exist. One such possibility occurs when a caller indicates that his record address is not correct. Specifically in that regard, the junction block 106 (FIG. 3, right center) queries "verify address?" The cue or prompt might take the form: "According to our records, you are Mr. John Henry with a billing and shipping address of 10 Beverly, Los Angeles, Calif." A "no" response results in another test as indicated by the block 120 questioning whether or not the present situation is merely a case of an altered address. If so, the system proceeds from a "yes" determination of the block 120 to obtain an audio record of the new address. As indicated by the block 122, state "2" is set and the caller is cued to state his new address as indicated by the block 124. The address is processed by the audio processor 60 (FIG. 2) and stored as audio data as indicated by the block 126 (FIG. 3). The operation then proceeds on the basis of a complete record as indicated by the block 108. Note that in this instance audio data is registered in the cell 34 (FIG. 2) specifically in voice fields 126 with the status register 56 (FIG. 2, upper left) indicating state "2". Consequently, the junction block 110 (FIG. 3, lower right) indicates the presence of audio data with the result that the cell register 34 stores a class "1" bit to indicate the order data includes audio data.

Returning to the block 118 (FIG. 3, upper left) the operation for the case of a complex address change involves setting the operating state "3", i.e. actuating a live interface. Other patterns also may lead to that operating sequence. For example, as suggested above, patterns for a line operator interface may include a non-local account or failure to locate account data. Also, throughout the interval of an interface, a caller may prompt a direct personal contact simply by depressing the telephone button designated "*". Accordingly, as indicated in FIG. 3 at block 118, the occurrence of an asterisk signal (*) sets state "3" with operation proceeding from block 118 to activate a live interface as indicated by the block 128. The controller also may initiate state "3" as when meaningless data is received.

It is noteworthy that in an operating system, at any specific time, the demand for operators may exceed the number of operators. In that event, callers who cannot be accommodated are cued to punch in their telephone numbers and/or other data, and/or record via audio or numeric signals such data as to return calls when operators are available. The logic of such an operation is embodied in the block 128, "actuate live interface."

When a live interface is actuated involuntarily for a caller in accordance with the system as described, an incentive is offered to keep the caller on the line. Specifically, the operation involves the step represented by the block 118 (FIG. 3) "set state '3'" and the counter 29 (FIG. 1, upper right). The master control unit 24 might actuate the unit AR1 to produce an audio message at the terminal T1 as follows: "You are being transferred to a live operator. Please stay on the line as you may win a valuable prize." Immediately, the unit 24 increments the counter 29. If a specified count is attained, e.g. "1000", the caller is awarded a premium.

In the example, if the caller is the thousandth to be transferred, the unit 24 actuates the unit AR1 to produce an announcement: "You have won a $100 credit for your next order. Please stand by."

If the caller is not the one-thousandth to be transferred, as the transfer is made, the caller is informed: "Sorry, no winner, but here is our operator." Essentially, transferred calls are a subset of callers, involuntarily transferred calls are a sub-subset and winners are still another subset.

Once an operator contact has been established several possibilities exist. One possibility is that the operator completes the contents of the cell register 34 (FIG. 2) without audio data. Essentially, an operator, active at one of the attached terminals, e.g. terminal AT1 (FIG. 1) has direct control of the cell register 34 (through the controller 46, FIG. 2) along with a data display and may be able to enter digital data manifesting the order. That possibility is indicated by the junction block 130 (FIG. 2), "digital data complete?"

If the data can be completed without audio record signals, the system operation proceeds to the block 108 (record complete). If the order record is not completed void of audio data, operation proceeds in state "3". Again, under control of a live operator, the system may follow different paths to produce an ultimate determination of whether or not the audio data provides a complete order as indicated by the decision block 134. In that regard, an operator may perfect an order record on the basis of a bank credit card or a new customer accommodation. In any event, if an order is not completed, the operation simply terminates as indicated by the block 136. Conversely, a completed order returns operation to block 108 indicating the record is complete.

Exemplary operating patterns of interfaces are treated in detail below; however, after addressing individual caller data, the disclosed embodiment reproduces audio messages at the connected remote terminal. As the interface proceeds, the system cues a remote terminal, as with voice instructions to prompt: (1) digital control signals, (2) digital data signals and (3) audio signals for digital recording. Depending on the control signals, and the format, various patterns are selected with the objective of completing data in the cell register for subsequently processing the individual order. Of course, the processing generally includes data for shipping merchandise and billing the customer.

Consider now a detailed exemplary operation with the attendant operations in the structures of FIGS. 1 and 2 to accomplish the process as illustrated in FIG. 3. Preliminarily, assume the system is programmed to process orders from XYZ COMPANY for items of merchandise identified to customers as from catalog, newspaper or other advertising. Established customers of the XYZ COMPANY are identified by customer number, telephone number, name and address in the master control and memory unit 24 (FIG. 1). Assume initially that such a customer actuates the telephone terminal T1 to accomplish an interface through: the communication system CO, one of the audio response units AR1–ARn and the coupler 22 with one of the interface format processors IP1–IPn.

Note that the initial phase of an inbound call may be variously implemented. For example, call signals provided to an audio response unit AR1–ARn may include representations of the caller's number and accordingly access a file on the caller. In accordance with automated number identification equipment designated ANI embodied in the communication facility CO, the caller's number may be provided in a digital form. The master control and memory unit 24 then accesses the caller's cell accordingly to address individual caller data. As described above, the data may be tested before transfer to the cell register 34 with the interface being conditioned on the test. That is, as indicated above, a customer may be limited to a specified number of order calls with regard to a particular catalog or offer. Thus, the interface may involve several tests, one of which is preliminary to setting the addressed customer data in the register 34. An example will illustrate.

An offering may be made to potential customers regarding goods or services in limited amounts. For example, customers might be offered one or two purchases, but no more. Accordingly, the data cells for such customers would be set to allow only one or two purchases as specified. Specifically, for example, the field 81 (key number) for each potential customer key number would be set at "one". Upon the occurrence of a call by a customer, an individual associated data cell would be addressed using the caller's telephone number provided by automatic number identification (ANI) equipment. From within the master control and memory unit 24, the field 81 (key number) of the cell would be checked by the consumable key limit unit 27. If the consumable key number had been reduced to "zero" or incremented to "one" as programmed to indicate a previous call, the call would be rejected by the active audio response unit AR1–ARn. Otherwise, the call would be accepted and the consumable key number would be incremented or decremented by the unit 27.

With the acceptance of the call, the data cell would be set in a cell register of a selected interface format processor, e.g. processor IP1, register 34 (FIG. 2). The direct interface would then proceed.

Recognizing the various possibilities, assume that at the outset of the direct interface, the voice generator 44 (FIG. 2, upper left) is actuated by the process controller 46 to greet the caller. For example, the voice generator 44 might cue the caller as follows: "Thank you for calling XYZ COMPANY telephone merchandise service. Please push three buttons on your telephone to identify your first item by catalog number."

Signals representative of three decimal digits identifying an item are supplied from the line 42 (FIG. 2, upper left) to the multiplexer 52. As the status register 56 is in the "0" state, the signals pass from the multiplexer 52 through the moving contact 64 and the stationary contact C1 to be registered in field 82, "item".

In the illustrative format, the customer next is prompted to digitally enter data indicating choices of color, size, special code and so on. For receiving such data, the gate control 66 actuates the gating network 62 in synchronism with the cue to the second position so that the item data is provided through the contact C2 to the field 84. Following a similar pattern, the caller may identify several item designations which are registered in the item fields 82 and 84 of the cell register 34. Note that items are checked in relation to inventory by the controller 46 acting through the unit 24 (FIG. 1) and the associated inventory look-up table 25.

When the caller indicates entry of the last item (as by an interval of silence or a signal) the voice generator 44 is actuated by the controller 46 to complete the interface as predetermined. In one format, the process controller 46 has the caller's telephone number from an ANI communication from the facility CO which addressed the caller's data record. Various information then may be confirmed or supplemented in the register 34. Note that the system as disclosed is adaptable to accommodate: first-time callers, callers of record and callers with out-dated records. Various payment arrangements for goods or services also are available.

As an alternative, consider a format using a customer's credit card number to access the file. Initially, the operation of the controller is to cue for the method of payment. Specifically, for example, the caller might be cued: "If you wish this order billed to your XYZ COMPANY credit card, please push '1'. Otherwise, push '2'." Accordingly, with a credit card confirmation, the process controller 46 sets the card type in the field 96 advancing the process of FIG. 3 to proceed from the decision block 90.

Assuming the caller possesses a credit card of XYZ COMPANY, the voice generator 44 (FIG. 2) states a request (cues) for the number. For example: "Please use your telephone buttons to key in your card number." In synchronism with the cue, the gating network 62 and the status register 56 are set. Accordingly, signals representative of the digits forming the card number are received through the line 42 (FIG. 2, upper left), the multiplexer 52 and the line L0 to the gating network 62 (lower left). As the gate control 66 is set by the process controller 46, the movable contact 64 dwells on the stationary contact C4, and the customer's number is stored in the field 98.

As an alternative to the caller's telephone number for addressing individual data, the customer's number may be utilized. In either event, individual data cells are addressed for record data to load other fields, e.g. fields 150, 152, 154, etc. Generally, if a record for the customer's card is located in the unit 24 (FIG. 1), the information is returned via the bus 36 (FIG. 2, right center) and registered in the cell register 34. Alternatively, the data may be confirmed by the caller and entered through the gating network 62.

In the disclosed embodiment, the data includes the expiration date of the card placed in field 150, the customer's telephone number set in field 152 and the customer's name and address set in the field 154. The telephone number may be useful if a live interface is prompted or, as indicated above, it may be used as an address to locate a particular file or data.

Considering the stage-by-stage confirming operation, the location of a customer's record prompts the controller 46 (FIG. 2) to actuate the gate control 66 setting the movable contact 64 to dwell in sequence at the contacts C5, C6 and C7. With confirmation, the customer's card expiration date, telephone number and address are supplied to the fields 150, 152 and 154. For example, the customer's address is supplied from the controller 46 to the voice generator 44. Consequently, as indicated above, the caller might be prompted as follows: "According to our records, you are Mr. John Henry with a billing and shipping address of 10 Beverly, Los Angeles, Calif. If our information is correct, please push '1'; if not, please push '2'." This operation is symbolized in FIG. 3 by the block 106 (right center).

Of course, the confirmation of a customer can be broken into even smaller communications if desired. Note that in cueing the caller for confirmation, the status register 56 is set to manifest state "1" indicating that control signals are being cued. Consequently, the response from the caller is passed through the multiplexer to line L1 and then to the process controller 46.

If the caller indicates the information is correct, the process controller 46 supplies the address data of record to the field 154.

If there are no voice fields, the controller 46 actuates the gate control 66 to set the movable contact 64 at the stationary contact C10. The operation of completing the record then involves providing an acknowledgement number through the contact C10 to the field. The acknowledgement number also may be communicated to the caller by the process controller actuating the voice generator 44. Specifically, an acknowledgement number is set in the field 156 and is vocalized to the caller. Of course, as with other data from storage, it may be confirmed, e.g. "Please repeat your acknowledgement number." Note that callers in a winning or other special set or subset may be identified by coded acknowledgement numbers.

As the final step in the sequence, the movable contact 64 is actuated to engage the stationary contact C11 through which the process controller 46 supplies a signal indicative of binary "0" manifesting that the order data does not include an audio component, i.e. the voice fields 126 are blank.

With the order complete, the contents of the cell register 34 is transferred through the bus 36 to the master control and memory unit 24. As indicated above, subsequent processing may involve subsequent operations to: place related calls, fill orders and bill charges. Specifically for example, referring to FIG. 1, the manually attended terminals AT1–ATn may be actuated to control the processor 33 through the coupling unit 31. The processor 33 is operated in cooperation with the unit 24 to process individual orders. Note that the audio data stored in cells is flagged for selection as explained in detail below.

To illustrate an alternate course in the process as generally described above, assume that the customer has a valid credit card record with the XYZ COMPANY; however, the address of record is incorrect. In processing an interface with such a customer, the operation would be as described above except that the junction represented by the block 106 (FIG. 3, right center) would determine an incorrect address. Consequently, with the system in state "1", a control signal manifesting an incorrect address is supplied through the line L1 to the process controller 46 setting up an alternate operation. Specifically, the next step involves determining whether the verification failure may be corrected by a mere change of address as indicated by the block 120 (FIG. 3). The implement the operation, the process controller 46 (FIG. 2) actuates the voice generator 44 to cue the caller for control signals. For example, the cue may be stated: "If it is simply a matter of correcting or changing your address, please push '1'. Otherwise, push '2'."

If the caller actuates the "1" button, a control signal is provided through the multiplexer 52 and the line L1 to the process controller 46 indicating a simple address correction. As a result, the process controller 46 sets the status register 56 to state "2" (see block 122, FIG. 3). As a consequence, in the system of FIG. 2, the input path 42 is coupled through the multiplexer 52 to the line L2 for supplying audio signals to the audio signal processor 60. Note that during this phase of operation, the process controller 46 actuates the gate controller 66 to set the movable contact 64 at the stationary contact C8 or C9 for recording audio data in the voice fields 126.

In the configuration as described, on cue, the oral statement of the caller's address is provided as an analog signal which may be variously transmitted through the communication facility CO (FIG. 1) to ultimately reach the line 38 (path 42) (FIG. 2, upper left). From the path 42, the representative analog signal is supplied through the multiplexer 52 and the line L2 to the audio signal processor 60 which may variously process the data and encodes the analog signals in a digital format. Accordingly, digital signals indicative of the caller's correct address are registered in the fields 126 of the cell register 34.

With the proper address stored, the customer's record is complete in the cell register 34 and the process proceeds to the operations represented by block 108 (FIG. 3, right center). Specifically, an acknowledgement number is revealed and stored in the field 156 of the cell register 34. As audio signals are involved, the field 112 registers a binary "1" indicative of that class of data cell (audio).

Note that data words stored in the cell register 34 may be variously segregated or processed based on their classification as registered in the field 112. For example, it may be desirable to segregate class "1" and class "0" orders for distinct off-line processing. In that regard, as class "0" orders have no audio data, they involve somewhat simpler process operations in that no human action is involved. Conversely, class "1" orders in the disclosed system are contemplated to involve human processing to convert spoken words to digital data.

To pursue another possible course of operation, assume that prompting or cueing a customer regarding his altered address does not involve a mere change. That is, assume the decision block 120 (FIG. 3, central) produced a control signal manifesting "no", i.e. more than a mere change is involved and a live contact interface is desirable. Upon such an occurrence, state "3" is set as indicated by the block 118 (FIG. 3). As indicated above, several other possibilities may set the operation of state "3". In any event, the status register 56 (FIG. 2) is set by the controller 46 to manifest state "3". Consequently, the status register 56 controls the multiplexer 52 actuating communication through the line L3 to the lines 48 and 50 coupled to one of the attended terminals AT1–ATn (FIG. 1).

In the configuration of state "3", the process controller 46 along with the lines 48 and 50 are linked to one of the attended terminals AT1–ATn enabling an operator to speak directly with a caller and concurrently set data into the data cell register 34 through the controller 46. Note that the attended terminals AT1–ATn include a display and, accordingly, the controller 46 cooperatively drives the display with the cell register to indicate the state of the interface and the caller's data. Thus, unconventional orders are processed with the system in state "3" as described above, the process flowing from the block 118 (FIG. 3, upper left).

Of course, numerous possibilities exist for completing an order with an attended terminal. In that regard, the contents and control of the cell register 34 is by the attended terminal and the problem may simply be one of communication in which case the order data may be completed either with or without audio data.

Recapitulating to some extent, a live interface is prompted from several situations. One case involves the caller depressing the "*" button. Also, if the caller does not have credit with the XYZ COMPANY (not a local account) a live interface is prompted. In that regard, an alternative credit card as a bank card may be employed. Accordingly, data is received in either an audio or non-audio form.

Consider a bank credit card order with reference to FIG. 2 in which the cell register 34 receives alternate information. In this situation, the field 96 may store an indication of an acceptable bank card. Specifically, fields 96, 98 and 150 respectively store a bank card type, the bank card number and the expiration date. It may be further advisable to store the caller's telephone number in field 152. The caller's name and address will be stored; and in that regard, either the field 154 may be utilized by the operator at an attended terminal or an audio record may be keyed for storage in one or more fields 126. If the order is completed by an operator, the system proceeds as explained above with the final steps of indicating an acknowledgement number and designating the class of the order. Thereafter, as in other examples, the contents of the cell register is returned to the master control and memory unit 24 (FIG. 1) for subsequent processing. Note, class "1" orders also may be stored, as in a processor IP1–IPn until completed (without audio data).

It may be seen that the system accomplishes telephonic interfaces utilizing various operations in accordance with control signals prompted by cues from a voice generator. That is, the system alternately may cue a caller to provide: digital data, control data or audio data. Concurrent with the cueing operations, the system assumes a state for compatibly processing responses. Specifically, if control signals are cued, the system is controlled accordingly. If data signals are cued, the system registers such data in either an audio or non-audio format. Furthermore, depending upon the detailed operation of the system, order data is developed as in individual cells for subsequent off-line processing. Individual packets or cells of such data are classified as disclosed above, and such classifications may be effectively utilized to segregate or perform various other processing operations.

In view of the above description, it will be apparent that the system of the present invention may be effectively used in telephonic interfaces to accommodate flexibility and control by a caller. Although the disclosed embodiment is directed to a sales operation, it will be apparent that the system may be variously embodied to accommodate any of a variety of telephonic interface operations, e.g. poll, game format, information service and so on. Furthermore, it will be apparent that while the disclosed embodiment comprises specific elements and configurations, any of a variety of structure might well be utilized. Accordingly, the scope hereof is deemed to be as set forth in the claims below.

What is claimed is:

1. A method for controlling voice-data communications for use with a communication facility including remote terminals for individual callers, wherein said remote terminals comprise a telephonic capability including a voice communication structure for providing audio response signals and a digital input structure for providing digital response signals, said method comprising the steps of:

cuing select ones of said remote terminals to prompt selective actuation by callers of said voice communication structure and said digital input structure to provide responsive signals;

selectively receiving said responsive signals from said select ones of said remote terminals as digital signals indicative of caller data, digital signals to control access to certain operations, and audio signals;

generating caller sequence data as digital data signals; and processing at least certain of said digital signals indicative of caller data or caller sequence data to isolate a subset of callers and storing said certain digital signals indicative of caller data and certain audio signals for subsequent processing.

2. A method for controlling voice-data communications according to claim 1, wherein the responsive signals indicative of caller data include caller customer number data.

3. A method for controlling voice-data communications according to claim 2, further comprising the step of:

verifying the caller customer number data against a negative list of unacceptable customer number data.

4. A method for controlling voice-data communications according to claim 1, further comprising the step of:

providing each of said individual callers with a computer generated number.

5. A method for controlling voice-data communications according to claim 1, further comprising the step of:

receiving individual callers' credit card numbers for billing purposes as digital signals indicative of caller data or digital signals to control access to certain operations or both.

6. A method according to claim 1, further comprising the step of:

receiving calling number identification data signals provided automatically from the communication facility; and utilizing the calling number identification data signals to control certain processing operations.

7. A method according to claim 1, further comprising the step of:

testing for a limit on use.

8. A method according to claim 1, further comprising the steps of:

receiving calling number identification data signals automatically provided by the communication facility.

9. A method according to claim 1, further comprising the step of:

utilizing at least certain of said calling number identification data to control at least part of the voice-data communications.

10. A method according to claim 1, wherein at least certain of said calling number identification data is utilized to preclude access to at least certain operations performed by an audio response unit.

11. A method according to claim 1, further comprising:

controlling voice-data communications based upon a specified limited amount of use available to said individual callers.

12. A method according to claim 1, wherein said specified limited amount of use is determined by incrementing to said amount of use.

13. A method according to claim 1, wherein said specified limited amount of use is one.

14. A method according to claim 1, further comprising the step of:

isolating a subset of said callers based at least in part upon said individual callers' calling order sequence.

15. A method for controlling voice-data communications according to claim 1, further comprising the step of:

recording said audio signals and reproducing recorded audio signals as caller voice data at a remote terminal.

16. A method for controlling voice-data communications according to claim 1, further comprising the step of:

providing said audio signals recorded in a digital format to a terminal via a coupling structure.

17. A method for controlling voice-data communications according to claim 1, wherein said audio signals recorded in a digital format are provided to said terminal via an autodialer.

18. A method for controlling voice-data communications according to claim 1, further comprising the step of:
 providing each of said individual callers with a computer generated number.

19. A method for controlling voice-data communications according to claim 1, further comprising the step of:
 receiving individual callers' credit card numbers for billing purposes.

20. A method for controlling voice-data communications according to claim 1, further comprising the step of:
 storing at least said audio signals for subsequent processing.

21. A method for controlling voice-data communications for use with a communication facility including remote terminals for individual callers, wherein said remote terminals comprise a telephonic capability including a voice communication structure for providing audio response signals and a digital input structure for providing digital response signals, said method comprising the steps of:
 cuing select ones of said remote terminals to prompt selective actuation by callers of said voice communication structure and said digital input structure to provide responsive signals;
 selectively receiving said responsive signals from said select ones of said remote terminals as digital signals indicative of caller data, digital signals to control access to certain operations, and audio signals;
 generating caller sequence data as digital data signals; and
 processing at least certain of said digital signals indicative of caller data or caller sequence data to isolate a subset of callers and storing said certain digital signals indicative of caller data and certain audio signals for subsequent processing and wherein said subset of callers is isolated based on a sequence of said individual callers.

22. A method according to claim 21, further comprising the step of receiving calling number identification data automatically provided by said communication facility.

23. A method according to claim 22, further comprising the step of:
 utilizing at least certain of said calling number identification data to control at least part of voice-data communications operations.

24. A method according to claim 22, wherein at least certain of said calling number identification data is utilized to preclude access to at least certain operations performed by an audio response unit.

25. A method according to claim 21, further comprising:
 controlling voice-data communications based upon a specified limited amount of use available to said individual callers.

26. A method according to claim 21, wherein said specified limited amount of use is determined by incrementing to said amount of use.

27. A method according to claim 21, wherein said specified limited amount of use is one.

28. A method according to claim 21, wherein the subset of callers is isolated based at least in part upon said individual callers' calling order sequence.

29. A method for controlling voice-data communications according to claim 31, further comprising the step of:
 recording said audio signals and reproducing recorded audio signals as caller voice data at a remote terminal.

30. A method for controlling voice-data communications according to claim 21, further comprising the step of:
 providing said audio signals recorded in a digital format to a terminal via a coupling structure.

31. A method for controlling voice-data communications according to claim 21, wherein said audio signals recorded in a digital format are provided to said terminal via an autodialer.

32. A method for controlling voice-data communications according to claim 21, further comprising the step of:
 providing each of said individual callers with a computer generated number.

33. A method for controlling voice-data communications according to claim 21, further comprising the step of:
 receiving individual callers' credit card numbers for billing purposes.

34. A method for controlling voice-data communications according to claim 21, further comprising the step of:
 storing at least said audio signals for subsequent processing.

35. A method for controlling voice-data communications for use with a communication facility including remote terminals for individual callers, wherein said remote terminals include a digital input device for providing digital responsive signals, said method comprising the steps of:
 cuing select ones of said remote terminals via a voice generator to prompt selective actuation by callers of said digital input device to provide responsive signals;
 receiving said responsive signals including signals indicative of a customer identification number for an individual caller that may be utilized to access a file for said individual caller and receiving said responsive signals including signals indicative of other data;
 testing at least a portion of said customer identification number for approval;
 processing the other data for the individual caller utilizing multiple comparative operations;
 confirming with said individual caller, via the voice generator, certain of said data stored in said file for said individual caller; and
 transferring a call from said individual caller to an attended terminal and displaying at least a portion of data stored in said file at said attended terminal under control of said responsive signals indicative of said customer identification number wherein said attended terminal has a capability for data to be entered to facilitate completion of the call from said individual caller.

36. A method according to claim 35 further comprising the step of:
 receiving caller number identification signals indicative of at least a portion of a caller's number from said communication facility.

37. A method according to claim 36 further comprising the step of:
 utilizing the caller number identification signals as additional data for the individual caller.

38. A method according to 35, wherein at least a part of the data stored in the file is audio data.

39. A method according 38 wherein the audio data is at least in part utilized to accomplish at least part of the confirming step via an audio response unit.

40. A method according to claim 35 wherein at least part of the data stored in the file is caller address data.

41. A method according to claim 35 wherein at least part of the data stored in the file is caller name data.

* * * * *